United States Patent
Yamagishi et al.

(10) Patent No.: US 6,511,184 B2
(45) Date of Patent: Jan. 28, 2003

(54) COLOR IMAGE DISPLAY APPARATUS

(75) Inventors: Shigekazu Yamagishi, Osaka (JP); Hiroshi Miyai, Hyogo (JP); Hitoshi Noda, Osaka (JP); Atsushi Hatakeyama, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 97 days.

(21) Appl. No.: 09/979,874

(22) PCT Filed: Mar. 29, 2001

(86) PCT No.: PCT/JP01/02698

§ 371 (c)(1),
(2), (4) Date: Nov. 27, 2001

(87) PCT Pub. No.: WO01/77737

PCT Pub. Date: Oct. 18, 2001

(65) Prior Publication Data

US 2002/0159036 A1 Oct. 31, 2002

(30) Foreign Application Priority Data

| Apr. 5, 2000 | (JP) | ................................ 2000-103041 |
| May 29, 2000 | (JP) | ................................ 2000-157767 |
| May 29, 2000 | (JP) | ................................ 2000-157782 |

(51) Int. Cl.⁷ ................ G03B 21/00; G03B 21/26; G02B 26/08

(52) U.S. Cl. ............... 353/31; 353/34; 353/37; 359/201; 359/204; 359/212; 359/216; 359/223

(58) Field of Search ............... 353/31, 34, 37, 353/7, 8, 9; 359/464, 462, 201, 204, 209, 212, 216, 211, 223; 349/7, 8, 5, 15; 348/744, 51, 55, 56, 54

(56) References Cited

U.S. PATENT DOCUMENTS

| 5,654,817 A | * | 8/1997 | De Loor ............. 359/201 |
| 5,845,981 A | * | 12/1998 | Bradley ............. 353/31 |
| 5,929,979 A | | 7/1999 | Okino et al. ............. 355/60 |
| 6,169,562 B1 | * | 1/2001 | Morimoto ............. 347/232 |
| 6,170,953 B1 | | 1/2001 | Lee et al. ............. 353/82 |
| 6,175,440 B1 | | 1/2001 | Conemac ............. 359/204 |
| 6,433,930 B1 | * | 8/2002 | Son ............. 359/464 |
| 2001/0038484 A1 | * | 11/2001 | Harada ............. 359/204 |

FOREIGN PATENT DOCUMENTS

| EP | 0 492 721 | 7/1992 | ............. H04N/9/31 |
| JP | 4-316296 | 11/1992 | ............. H04N/9/31 |
| JP | 6-148635 | 5/1994 | ............. G02F/1/1335 |
| JP | 7-318939 | 12/1995 | ............. G02F/1/1335 |
| JP | 9-512648 | 12/1997 | ............. G02B/27/18 |
| JP | 10-142548 | 5/1998 | ............. G02B/26/10 |
| JP | 11-24164 | 1/1999 | ............. G03B/21/00 |
| JP | 2000-28960 | 1/2000 | ............. G02B/27/18 |
| JP | 2000-207750 | 7/2000 | ............. G11B/7/085 |
| WO | WO 96/03842 | 2/1996 | ............. H04N/9/31 |

* cited by examiner

Primary Examiner—Russell Adams
Assistant Examiner—Melissa J Koval
(74) Attorney, Agent, or Firm—Merchant & Gould P.C.

(57) ABSTRACT

Three colors of light beams from a light source travel via a first optical system to strike a reflecting surface of a rotating polygon mirror, or mirrors, at different angles without overlapping. The rotating polygon mirror or mirrors reflect the light beams for scanning. The reflected light beams enter a second optical system at different angles to illuminate an image display panel at different portions. On the image display panel, belt-like regions illuminated by the light beams of individual colors are formed in parallel with each other, and these illuminated regions are moved continuously by scanning. A formed color image is magnified and projected by a projection optical system. With such a projection type image display apparatus, a display having high resolution and light efficiency that is also small, thin and inexpensive is achieved.

24 Claims, 33 Drawing Sheets

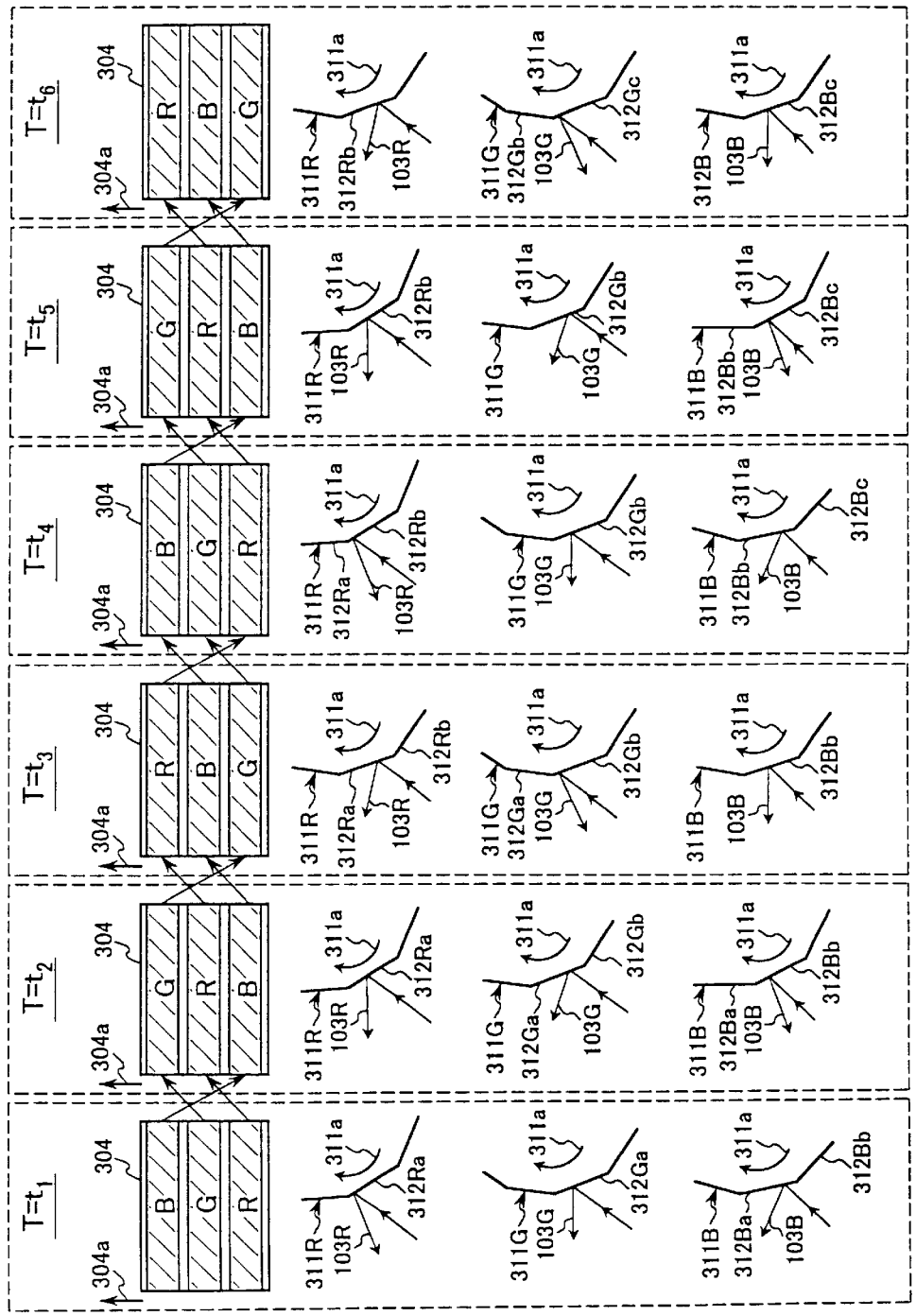



COLOR IMAGE DISPLAY APPARATUS

TECHNICAL FIELD

The present invention relates to a color image display device that displays a color image with one light valve as a light modulating member. Also, the present invention relates to a projection-type image display apparatus including such a color image display device.

BACKGROUND ART

A liquid crystal projector now part of the mainstream in the market of large-screen displays uses a light source lamp, a focusing lens and a projection lens to magnify and form an image of a liquid crystal panel (a light valve) onto a screen. Currently commercialized systems can be classified roughly into a three-plate system and a single-plate system.

In the former system of the three-plate liquid crystal projector, after a light beam from a white light source is separated into light beams of three primary colors of red, green and blue by a color separation optical system, these light beams are modulated by three monochrome liquid crystal panels so as to form images of the three primary colors. Thereafter, these images are combined by a color combination optical system so as to be projected onto a screen by one projection lens. Since the entire spectrum of the white light from the light source can be utilized, this system has a high efficiency of light utilization. However, because of the necessity of the three liquid crystal panels, the color separation optical system, the color combination optical system and a convergence adjusting mechanism between the liquid crystal panels, this system is relatively expensive.

On the other hand, a conventional single-plate system liquid crystal projector is compact and inexpensive because an image formed on a liquid crystal panel having a mosaic color filter simply is magnified and projected onto a screen. However, since this system obtains light with a desired color by absorbing light with an unwanted color out of white light from the light source by using the color filter as a color selection member, only one-third or less of the white light that has entered the liquid crystal panel is transmitted (or reflected). Accordingly, the efficiency of light utilization is low and high-brightness images cannot be obtained easily. When the light source is brightened, the brightness of the displayed image can be improved. However, there remain problems of heat generation and light resistance owing to light absorption by the color filter, making it very difficult to increase the brightness.

In recent years, as a way to eliminate light loss owing to the color filter in this single-plate system, a new configuration in which the efficiency of light utilization is raised by using dichroic mirrors and a microlens array instead of the color filter has been suggested and also commercialized.

A conventional single-plate projection-type image display apparatus, which improves the efficiency of light utilization using the dichroic mirrors and the microlens array, will now be described. FIG. 30 shows a schematic configuration thereof, and FIG. 31 shows a detailed cross-section of a light valve of the projection-type image display apparatus shown in FIG. 30.

A projection-type image display apparatus 900 has a light source portion 901, an illuminating device 903, a color separation optical system 907, a transmission-type light valve 902 and a projection lens 908. A white light beam from the light source portion 901 irradiates an effective region of the light valve 902 by means of the illuminating device 903. The color separation optical system 907 includes a red-reflecting dichroic mirror 904, a green-reflecting dichroic mirror 905 and a total reflection mirror 906 that are arranged obliquely. The white light beam that has passed through the illuminating device 903 enters the color separation optical system 907, thereby being separated horizontally into three light beams of primary colors of red, green and blue, so as to enter the light valve 902. The transmission-type light valve 902 has pixels that can modulate the incident light beams of the respective colors independently by an input signal corresponding to each of the red, green and blue light beams, with these pixels being arranged horizontally in one element.

The white light beam emitted from the light source portion 901 is led to the color separation optical system 907 by the illuminating device 903. A red light beam in the incident light is reflected by the red-reflecting dichroic mirror 904 placed obliquely with respect to the incident light so as to travel along an optical axis 909. A green light beam in the light transmitted by the red-reflecting dichroic mirror 904 is reflected by the green-reflecting dichroic mirror 905 placed obliquely with respect to the incident light so as to travel along an optical axis 910. A blue light beam transmitted by the green-reflecting dichroic mirror 905 enters the reflection mirror 906, and is then reflected so as to travel along an optical axis 911. The red light beam on the optical axis 909, the green light beam on the optical axis 910 and the blue light beam on the optical axis 911 pass through a condenser lens 912 and reach the transmission-type light valve 902.

As shown in FIG. 31, an entrance-side polarizing plate 913 is provided as a polarizer on the side of an entrance surface of the transmission-type light valve 902, and only the light beam having a predetermined polarization direction in the incident light is transmitted by this polarizing plate 913. The transmitted light enters a microlens array 918 including a group of microlenses 917 with their longitudinal direction being in a vertical direction. The horizontal width of the microlens 917 corresponds to the total horizontal widths of a pixel aperture for red 914, a pixel aperture for green 915 and a pixel aperture for blue 916. The red light beam that has traveled along the optical axis 909 and entered the microlens 917 obliquely at an incident angle of θ1 is focused on the pixel aperture for red 914. The green light beam that has traveled along the optical axis 910 and whose chief ray entered the microlens 917 at a right angle is focused on the pixel aperture for green 915. The blue light beam that has traveled along the optical axis 911 and entered the microlens 917 obliquely from the direction opposite to the red light at an incident angle of θ1 is focused on the pixel aperture for blue 916. The light beam of each color that has passed through the pixel aperture for each color enters an exit-side polarizing plate 919 provided on an exit surface of the transmission-type light valve 902. The exit-side polarizing plate 919 has a polarization axis arranged orthogonal to the polarization axis of the entrance-side polarizing plate 913. Since a light beam that has entered a pixel aperture to be displayed as white is emitted with its polarization direction being rotated by about 90° in a liquid crystal layer, it is transmitted by the exit-side polarizing plate 919 and reaches the projection lens 908. Since a light beam that has entered a pixel aperture to be displayed as black is emitted without being subjected to the rotation of its polarization direction in the liquid crystal layer, it is absorbed by the exit-side polarizing plate 919 and does not reach the projection lens 908. The transmission-type light valve 902 rotates the polarization direction of the incident light at every pixel so as to display an image.

In the single-plate projection-type image display apparatus with the new configuration in which the efficiency of light utilization is raised as described above, it is possible to achieve a high efficiency of light utilization close to that in the three-plate system without wasting the light from the light source.

However, in this configuration, a bright lens whose f-number is smaller than $1/(2 \sin (\theta 2+\theta 3))$ is required as the projection lens 908, where a half-angle of a cone of rays converging from the microlens 917 toward the pixel aperture is expressed by $\theta 2$ and an incident angle at which the chief ray of the red light or the blue light enters the pixel aperture is expressed by $\theta 3$ (An actual f-number is 1.0 to 1.5).

Accordingly, even when the single-plate system is adopted so as to use one display device, the size and the cost of the projection lens increase in practice. Thus, its advantage over the three-plate system is not readily apparent.

Furthermore, since a light beam of each color from the light source is led to the pixel of a corresponding color, the resolution of an image display panel (the transmission-type light valve 902) has to be three times as high as a necessary resolution in order to achieve high resolution. This increases the cost of the image display panel, and also lowers transmittance when the transmission-type light valve is used as the image display panel. Moreover, when the resolution of the image display panel is low, or when an image is magnified considerably, colors of red, green and blue appear separately, causing image quality deterioration such as convergence dislocation.

In response to the above problems, an image display apparatus is suggested in JP 4(1992)-316296 A. FIG. 32 shows a schematic configuration of this image display apparatus.

A white light beam emitted from a light source portion 920 is led to a color separation optical system 921. As shown in FIG. 33, the color separation optical system 921 includes dichroic mirrors 921a and 921b and two reflection mirrors 921c and 921d. The dichroic mirror 921a reflects blue light and transmits green light and red light. The dichroic mirror 921b reflects red light and transmits green light and blue light. These dichroic mirrors 921a and 921b are crossed. A blue light beam 932 out of a white light beam 931 from the light source portion 920 is reflected by the dichroic mirror 921a, reflected by the reflection mirror 921d and passes through an aperture 922b of an illumination portion 922. A red light beam 933 is reflected by the dichroic mirror 921b, reflected by the reflection mirror 921c and passes through an aperture 922r of the illumination portion 922. A green light beam 934 is transmitted by both the dichroic mirrors 921a and 921b and passes through an aperture 922g of the illumination portion 922. The apertures 922r, 922g and 922b of the illumination portion 922 are formed like a belt (a rectangle), and the light beams of red, green and blue are emitted adjacent to each other from these apertures.

The belt-like light beams of respective colors emitted from the illumination portion 922 pass through a scanning optical system 924, and then illuminate different regions of a single transmission-type light valve (a display panel) 923 in a belt-like manner. With an effect of a rotating prism 924a constituting the scanning optical system 924, the belt-like light beams of red, green and blue scan the light valve 923 from the bottom to the top. When a belt-like illuminated region of one of the light beams goes beyond the uppermost end of an effective region of the light valve 923, the belt-like illuminated region of this light beam appears at the lowermost end of the effective region of the light valve 923 again. In this manner, the light beams of red, green and blue can scan continuously over the entire effective region of the light valve 923. A light beam illuminating each row on the light valve 923 varies moment by moment, and a light valve driving device (not shown in this figure) drives each pixel by an information signal according to the color of the light beam that is illuminated. This means that each row of the light valve 923 is driven three times at every field of a video signal to be displayed. A driving signal inputted to each row is a color signal corresponding to the light beam illuminating this row among signals of the image to be displayed. The light beams of these colors that have been modulated by the light valve 923 are magnified and projected onto a screen (not shown in this figure) by a projection lens 925.

With the above configuration, the light beam from the white light source is separated into light beams of three primary colors, so that the light from the light source can be used with substantially no loss and the efficiency of light utilization can be increased. Also, since each of the pixels on the light valve displays red, green and blue sequentially, the color dislocation, which has been a problem in the three-plate system mentioned above, is not caused, making it possible to provide a high quality image.

However, in the above configuration, the light beams of these colors from the illumination portion 922 are not focused when transmitted by the rotating prism 924a. Since the size (the radius of gyration) of the rotating prism 924a has to be in accordance with a region illuminated by the light beam emitted from the illumination portion 922, the rotating prism 924a becomes large and heavy. This has made it difficult to reduce the size and weight of the apparatus.

Furthermore, a powerful motor for rotating the rotating prism 924a becomes necessary, causing an increase in the size and cost of the apparatus.

DISCLOSURE OF INVENTION

It is an object of the present invention to solve the above-described problems of the conventional image display apparatus and to provide a color image display device that is provided with a scanning optical system for scanning an illuminated portion (a light valve) sequentially with light beams of individual colors, thus achieving a high efficiency of light utilization, a reasonable price and a miniaturization of the apparatus.

In order to achieve the above-mentioned object, the present invention has the following configurations.

A first color image display device of the present invention includes a light source portion for emitting respective light beams of red, green and blue, a first optical system that the respective light beams from the light source portion enter, a rotating polygon mirror that the respective light beams having left the first optical system enter and that makes the respective light beams perform a scanning while reflecting the respective light beams, a second optical system for leading the respective light beams from the rotating polygon mirror to an illumination position, an image display panel that is arranged at the illumination position and provided with a plurality of pixels for modulating an incident light according to a color signal of red, green or blue, and an image display panel driving circuit for driving each of the pixels of the image display panel by a signal corresponding to a color of light entering this pixel. Belt-like regions illuminated by the respective light beams are formed substantially in parallel with each other on the image display panel and moved continuously by the scanning, thereby displaying a color image. Chief rays of the respective light beams enter a reflecting surface of the rotating polygon mirror so as not to overlap each other and at different angles from each other with respect to a rotation direction of the rotating polygon mirror. The chief rays of the respective light beams that have been reflected by the rotating polygon mirror enter the second optical system at different angles from each other and then enter different positions of the image display panel.

A second color image display device of the present invention includes a light source portion for emitting respective light beams of red, green and blue, a first optical system that the respective light beams from the light source portion enter, three rotating polygon mirrors that the respective light beams having left the first optical system respectively enter and that make the respective light beams perform a scanning while reflecting the respective light beams, a second optical system for leading the respective light beams from the rotating polygon mirrors to an illumination position, an image display panel that is arranged at the illumination position and provided with a plurality of pixels for modulating an incident light according to a color signal of red, green or blue, and an image display panel driving circuit for driving each of the pixels of the image display panel by a signal corresponding to a color of light entering this pixel. Belt-like regions illuminated by the respective light beams are formed substantially in parallel with each other on the image display panel and moved continuously by the scanning, thereby displaying a color image. The three rotating polygon mirrors are formed as one piece so as to match their rotation axes and have their phases in a rotation direction shifted from each other. Chief rays of the respective light beams that respectively have been reflected by the three rotating polygon mirrors enter the second optical system at different angles from each other and then enter different positions of the image display panel.

A third color image display device of the present invention includes a light source portion for emitting respective light beams of red, green and blue, a first optical system that the respective light beams from the light source portion enter, three rotating polygon mirrors that the respective light beams having left the first optical system respectively enter and that make the respective light beams perform a scanning while reflecting the respective light beams, a second optical system for leading the respective light beams from the rotating polygon mirrors to an illumination position, an image display panel that is arranged at the illumination position and provided with a plurality of pixels for modulating an incident light according to a color signal of red, green or blue, and an image display panel driving circuit for driving each of the pixels of the image display panel by a signal corresponding to a color of light entering this pixel. Belt-like regions illuminated by the respective light beams are formed substantially in parallel with each other on the image display panel and moved continuously by the scanning, thereby displaying a color image. The three rotating polygon mirrors respectively are rotated about rotation axes different from each other. Chief rays of the respective light beams that respectively have been reflected by the three rotating polygon mirrors enter the second optical system at different angles from each other and then enter different positions of the image display panel.

According to the first to third color image display devices described above, it becomes possible to display a color image by using a light valve that is not provided with pixels exclusively for the respective colors, without using a color filter. Thus, an image can be displayed with a high efficiency of light utilization and a high resolution. Furthermore, by providing a scanning optical system using the rotating polygon mirror, a small and low-cost image display device can be provided.

In the first to third color image display devices described above, it is preferable that the second optical system is an optical system in which a height of the light beams at the illumination position changes in proportion to an incident angle of the light beams. This makes it possible to move (scan) the illuminated regions on the image display panel easily.

In the first to third color image display devices described above, it is preferable that, when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror), the light beams that have entered the second optical system at an incident angle $\theta_P$ are focused at a position in which a height of the light beams is greatest in the scanning direction on the image display panel. This can raise the efficiency of light utilization.

Also, in the above-described first color image display device, it is preferable that, when the chief rays of the respective light beams entering the rotating polygon mirror respectively are called a first chief ray, a second chief ray and a third chief ray in an order of the rotation direction of the rotating polygon mirror, an angle at the rotation axis subtended by a line segment from an incident position of the first chief ray into the reflecting surface of the rotating polygon mirror to that of the second chief ray into the reflecting surface of the rotating polygon mirror and an angle at the rotation axis subtended by a line segment from the incident position of the second chief ray into the reflecting surface of the rotating polygon mirror to that of the third chief ray into the reflecting surface of the rotating polygon mirror are both about $\theta_P/3$. Accordingly, the chief rays of the respective colors meet a border of the reflecting surfaces of the rotating polygon mirror at an even time interval, allowing an image displayed with enhanced color uniformity and brightness uniformity and reduced flicker.

Furthermore, in the above-described first color image display device, it is preferable that, when an angle that the first chief ray forms with the second chief ray is expressed by $\theta_{C1}$ and an angle that the second chief ray forms with the third chief ray is expressed by $\theta_{C2}$, the following relationship is satisfied.

$$(\theta_{C1}+\theta_{C2}) \times 3/2 \leq 2 \times \theta_P$$

This makes it possible to use light from the light source portion for the illumination of the image display panel without wasting it.

Moreover, it is preferable that the angle $\theta_{C1}$ and the angle $\theta_{C2}$ are both about $2 \times \theta_P/3$.

Next, a fourth color image display device of the present invention includes a light source portion for emitting respective light beams of red, green and blue, a first optical system that the respective light beams from the light source portion enter, a rotating polygon mirror that the respective light beams having left the first optical system enter and that makes the respective light beams perform a scanning while reflecting the respective light beams, a second optical system for leading the respective light beams from the rotating polygon mirror to an illumination position, an image display panel that is arranged at the illumination position and provided with a plurality of pixels for modulating an incident light according to a color signal of red, green or blue, and an image display panel driving circuit for driving each of the pixels of the image display panel by a signal corresponding to a color of light entering this pixel. Belt-like regions illuminated by the respective light beams are formed substantially in parallel with each other on the image display panel and moved continuously by the scanning, thereby displaying a color image. An area of each of the belt-like regions illuminated by the respective light beams is substantially equivalent to one-third of an effective region of the image display panel. The second optical system is an optical system in which a height of the light beams at the illumination position changes in proportion to an incident angle of the light beams. When an angle at a rotation axis subtended by one reflecting surface of the rotating polygon mirror is expressed by $\theta_P$ ($\theta P=2\pi/n$, where n is the number of the reflecting surfaces provided in the rotating polygon mirror), the light beams that have entered the second optical system at an incident angle $\theta_P$ are focused at a position in which the height of the light beams is greatest in the scanning direction on the image display panel. When chief rays of the respective light beams entering the rotating polygon mirror respectively are called a first chief ray, a second chief ray and a third chief ray in an order of the rotation direction of the rotating polygon mirror, an angle at the rotation axis subtended by a line segment from an incident position of the first chief ray into the reflecting surface of the rotating polygon mirror to that of the second chief ray into the reflecting surface of the rotating polygon mirror and an angle at the rotation axis subtended by a line segment from the incident position of the second chief ray into the reflecting surface of the rotating polygon mirror to that of the third chief ray into the reflecting surface of the rotating polygon mirror are both about $\theta_P/3$. When an angle that the first chief ray forms with the second chief ray is expressed by $\theta_{C1}$ and an angle that the second chief ray forms with the third chief ray is expressed by $\theta_{C2}$, the angle $\theta_{C1}$ and the angle $\theta_{C2}$ are both about $2\times\theta_P/3$.

According to the fourth color image display device described above, it becomes possible to display a color image by using a light valve that is not provided with pixels exclusively for the respective colors, without using a color filter. Thus, an image can be displayed with a high efficiency of light utilization and a high resolution. Furthermore, by providing a scanning optical system using the rotating polygon mirror, a small and low-cost image display device can be provided.

In the first to fourth color image display devices described above, the light source portion may include a light source for emitting a white light beam including red, green and blue light beams and a color separation optical system for separating the white light beam into the red, green and blue light beams. By using the white light source and obtaining the red, green and blue light beams with the color separation optical system, it is possible to raise the efficiency of utilization of light from the light source.

In this case, it is preferable that an optical distance from an incident portion to an emitting portion in the color separation optical system is substantially the same for each color of the light beams. This can reduce the difference in size of the spots of the respective light beams that are formed on the reflecting surface of the rotating polygon mirror, thereby maintaining a focusing efficiency for each of the light beams at a high level.

Also, in the first to fourth color image display devices described above, it is preferable that the second optical system includes an fθ lens. This makes it possible to move (scan) the illuminated regions on the image display panel easily.

Furthermore, in the first to fourth color image display devices described above, the image display panel may be a transmission-type light valve. Alternatively, the image display panel may be a reflection-type light valve.

Moreover, in the first to fourth color image display devices described above, it is preferable that an illuminating f-number in the scanning direction is smaller than that in the direction orthogonal thereto in optical systems from the first optical system to the image display panel. The illuminating f-number in the scanning direction is made relatively smaller, thereby preventing the outline in the scanning direction of the illuminated regions from becoming vague on the image display panel so as to deteriorate color purity. In addition, the illuminating f-number in the direction orthogonal to the scanning direction is made relatively larger, thereby allowing the miniaturization of the apparatus.

Also, in the first to fourth color image display devices described above, it is preferable that the first optical system is provided with a stop having a rectangular aperture. This makes it possible to form spots with substantially uniform sizes on the reflecting surface of the rotating polygon mirror even when the length of optical path is different for each of the light beams.

Furthermore, in the first to fourth color image display devices described above, it is preferable that the light source portion includes an integrator optical system. This can secure the uniformity of illumination in the direction orthogonal to the scanning direction of the image display panel.

The above-mentioned integrator optical system can be configured such that the integrator optical system includes a first lens array and a second lens array, with the first lens array being a group of microlenses having identically-shaped rectangular apertures, and the second lens array being a group of microlenses corresponding to the microlenses of the first lens array on a one-to-one basis. The first optical system includes a first lens and a second lens. Incident light beams into the microlenses of the first lens array are focused on the corresponding microlenses of the second lens array, aperture shapes of the microlenses of the first lens array are superimposed on the first lens, and images of the aperture shapes of the microlenses of the first lens array that have been superimposed on the first lens are formed on the image display panel via the second optical system, thus forming the belt-like illuminated regions.

It is preferable that the first lens forms an image of the second lens array on the reflecting surface of the rotating polygon mirror via the second lens. This can reduce the size of the reflecting surface, allowing the miniaturization of the rotating polygon mirror, thus contributing to the miniaturization of the entire apparatus.

Also, it is preferable that an overall shape of the group of the microlenses of the second lens array is formed such that its image, when being formed on the reflecting surface of the rotating polygon mirror, has a dimension in a direction corresponding to the rotation direction smaller than that in a direction orthogonal thereto. This can reduce the dimension of the reflecting surface in the rotation direction, allowing the miniaturization of the rotating polygon mirror, thus contributing to the miniaturization of the entire apparatus.

It also is preferable that the first lens array includes a plurality of microlenses that are formed to have different centers of curvature with respect to an aperture center, so that the incident light beams into the microlenses of the first lens array are focused on the corresponding microlenses of the second lens array. This makes it possible to design the arrangement of the microlenses of the second lens array freely, so that the shape of the image to be formed on the reflecting surface of the rotating polygon mirror described above can be optimized, for example.

In addition, it is preferable that each size of apertures of the microlenses of the second lens array is designed according to a size of the corresponding images formed by the first lens array. This can minimize the size of the second lens array, while preventing a reduction in the efficiency of light utilization.

It is preferable that the light source portion further includes a light source for emitting a white light beam including red, green and blue light beams and a color separation optical system for separating the white light beam into the red, green and blue light beams, and the integrator optical system is provided between the light source and the color separation optical system. By using the white light source and obtaining the red, green and blue light beams with the color separation optical system, it is possible to raise the efficiency of utilization of light from the light source. In addition, even when using a discharge tube as the light source, it is possible to secure the uniformity of illumination in the direction orthogonal to the scanning direction of the image display panel.

In this case, it is preferable that an optical distance from an incident portion to an emitting portion in the color separation optical system is substantially the same for each color of the light beams. This can reduce the difference in size of the spots of the respective light beams that are formed on the reflecting surface of the rotating polygon mirror, thereby maintaining a focusing efficiency for each of the light beams at a high level.

In addition, a projection-type image display apparatus of the present invention includes any of the first to fourth color image display devices and a projection optical system for magnifying and projecting an image formed on the image display panel. Since any of the first to fourth color image display devices of the present invention is used, an image can be displayed with a high efficiency of light utilization and a high resolution, and a small and low-cost projection-type image display apparatus can be provided.

BRIEF DESCRIPTION OF DRAWINGS

FIGS. 14A to 14F are drawings showing how light reflected by the rotating polygon mirror changes and how light beams of individual colors illuminating the image display panel are scanned in the color image display device shown in FIGS. 12A to 12C.

BEST MODE FOR CARRYING OUT THE INVENTION

Embodiment 1-(1)

Figure 1:
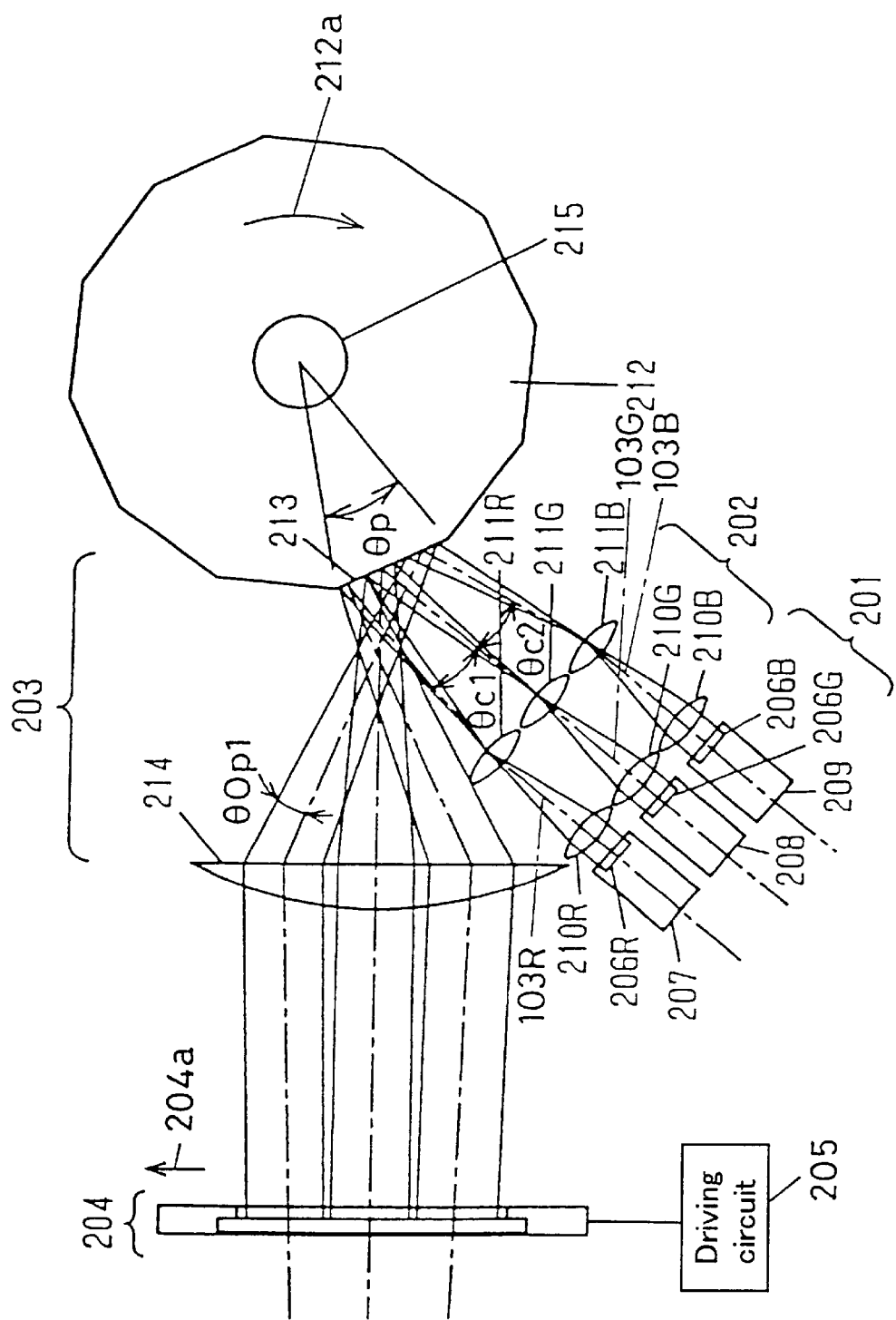
FIG. 1 is a schematic view showing a configuration of a color image display device according to Embodiment 1-(1) of the present invention.

FIG. 1 is a schematic view showing a configuration of a color image display device according to Embodiment 1-(1) of the present invention. The color image display device of the present embodiment includes a light source portion 201, a focusing system (a first optical system) 202, a rotating polygon mirror 212, a scanning optical system (a second optical system) 203, an image display panel 204 and an image display panel driving circuit 205.

The light source portion 201 has a light source portion for red light 207, a light source portion for green light 208 and a light source portion for blue light 209 that emit red, green and blue light beams respectively. The light source portion for red light 207, the light source portion for green light 208 and the light source portion for blue light 209 respectively are provided with rectangular light emitting portions 206R, 206G and 206B on their light emitting side. Light beams of respective colors emitted from the light emitting portions 206R, 206G and 206B enter first focusing lenses 210R, 210G and 210B provided for the respective colors in the focusing system 202. The incident light beams respectively leave the first focusing lenses 210R, 210G and 210B, pass through second focusing lenses 211R, 211G and 211B provided for the respective colors, are reflected by a reflecting surface 213 on a periphery of the rotating polygon mirror 212, travel via a scanning lens 214 in the scanning optical system 203, and then reach the image display panel 204.

Figure 2:
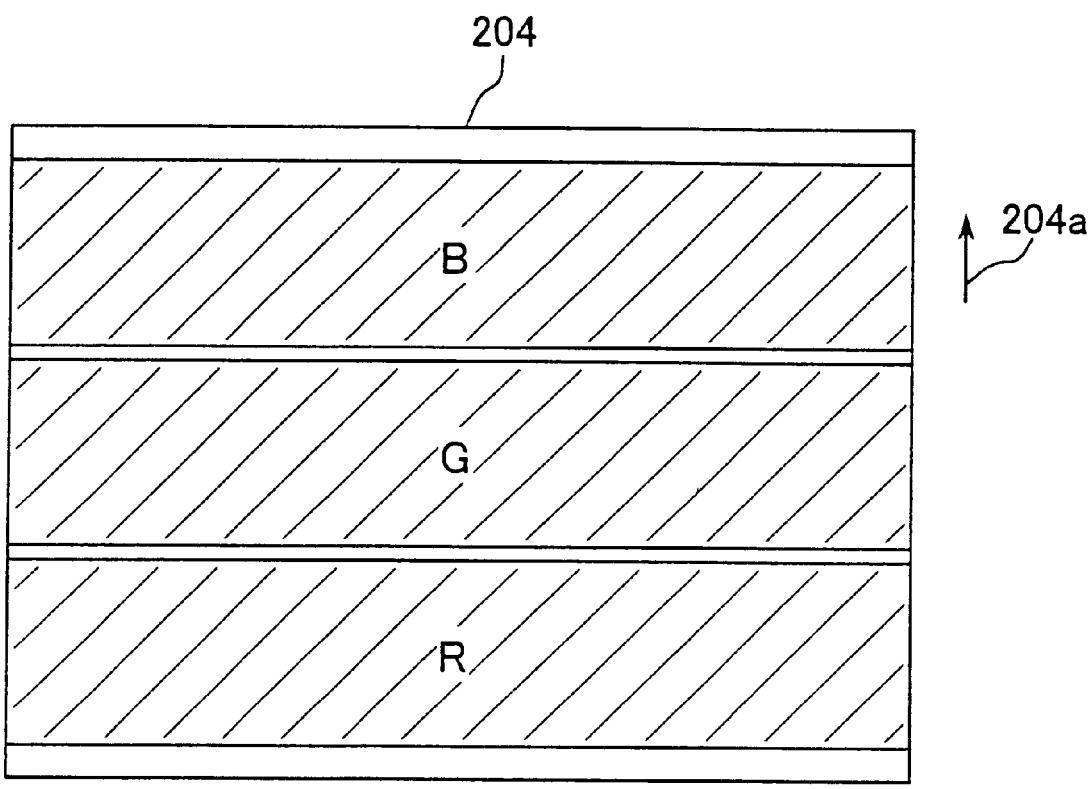
FIG. 2 is a front view showing an illumination state of an image display panel of the color image display device shown in FIG. 1.

FIG. 2 shows an example of an illumination state of the image display panel 204. The light beams of the respective colors emitted from the light source portion for red light 207, the light source portion for green light 208 and the light source portion for blue light 209 illuminate three strap-like (belt-like) regions obtained by substantially trisecting an effective aperture region of the image display panel 204 in a scanning direction 204a. In other words, as shown in FIG. 2, the blue, green and red light beams form a region illuminated by blue light (indicated by "B" in FIG. 2), a region illuminated by green light (indicated by "G" in FIG. 2) and a region illuminated by red light (indicated by "R" in FIG. 2) on the image display panel 204.

Figure 3:
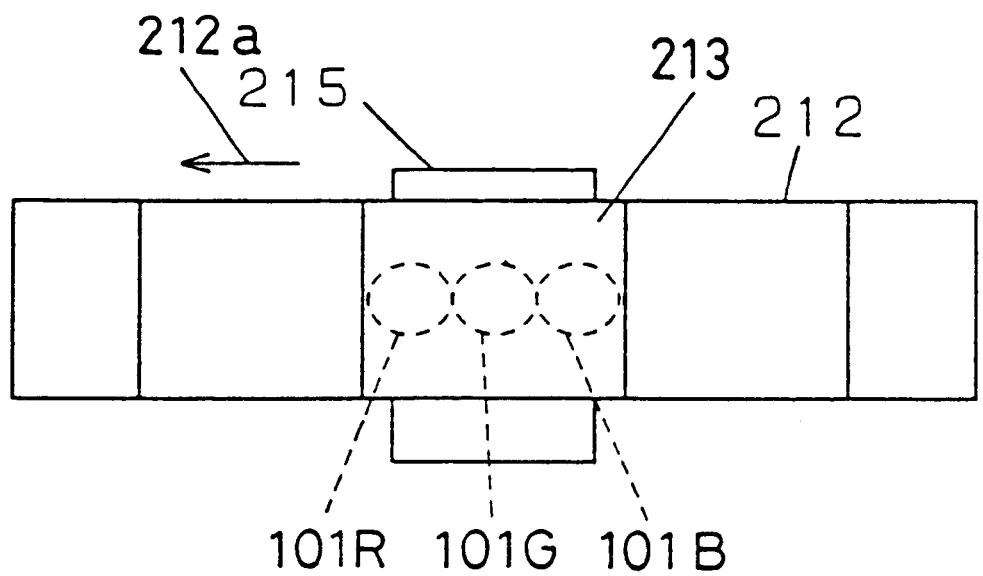
FIG. 3 is a side view showing how groups of red, green and blue lights are formed on a rotating polygon mirror of the color image display device shown in FIG. 1.
Figure 4:
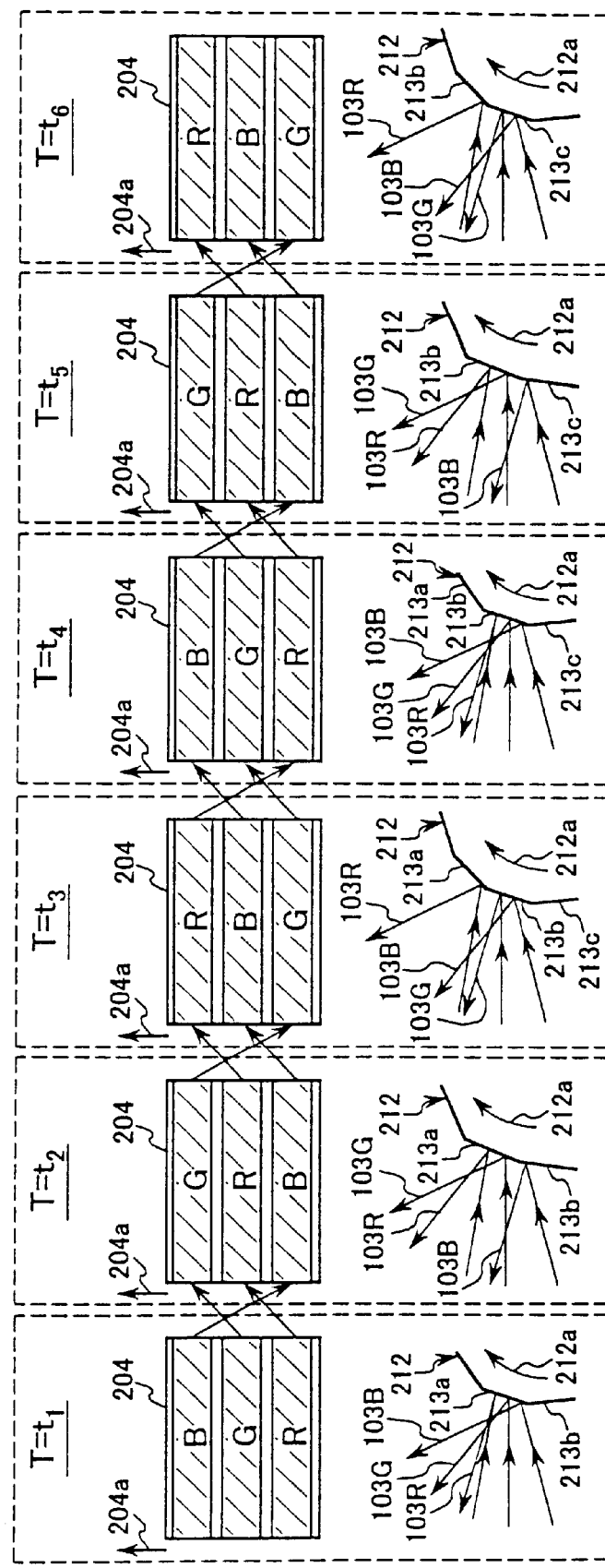
FIGS. 4A to 4F are drawings showing how light reflected by the rotating polygon mirror changes and how light beams of individual colors illuminating the image display panel are scanned in the color image display device shown in FIG. 1.

At a given moment during the rotation of the rotating polygon mirror 212, groups (spots) of red, green and blue lights 101R, 101G and 101B are formed on one reflecting surface 213 so as to be aligned along a rotation direction 212a such that their chief rays do not overlap each other, as shown in FIG. 3.

The rotating polygon mirror 212 is rotated in the rotation direction 212a about a rotation axis 215 by a motor, which is not shown in this figure.

The following is a description of how the light reflected by the reflecting surface 213 changes and how the light beams of individual colors illuminating the image display panel 204 are scanned during the rotation of the rotating polygon mirror 212, with reference to FIGS. 4A to 4F.

FIGS. 4A to 4F show the rotation of the rotating polygon mirror 212 and an accompanying change in the state of the image display panel 204 illuminated by the light beams of individual colors at a fixed time interval. The illumination states of the image display panel 204 are shown on the upper part of the figures, and R, G and B represent regions illuminated by the red light, the green light and the blue light respectively as in FIG. 2. The rotation of the rotating polygon mirror 212 and reflection states of the light beams of individual colors are shown on the lower part of the figures, and 103R, 103G and 103B indicate the chief rays of red light, green light and blue light respectively, and arrows indicate the traveling directions of these rays.

At time T=t1 (see FIG. 4A), the light beams of red, green and blue enter the same reflecting surface 213a of the rotating polygon mirror 212. As shown in the figure, the blue light beam is reflected at the largest angle in the direction in which the reflecting surface 213a moves (the rotation direction 212a), the green light beam is reflected at a slightly smaller angle than the blue light beam, and the red light beam is reflected at a still smaller angle than the green light beam. Thus, the light beams of these colors enter the scanning lens 214 of the scanning optical system 203 at different angles from each other. In the scanning optical system 203, a height of a light beam at an illumination position (the image display panel 204) is determined depending on the incident angle of the light beam. Therefore, the light beams of these colors form images of the first focusing lenses 210R, 210G and 210B provided for the respective colors at different positions on the image display panel 204 as indicated by the figure. In other words, the region illuminated by the blue light, the region illuminated by the green light and the region illuminated by the red light are formed on the image display panel 204 in this order from the top.

At time T=t2 (see FIG. 4B), which is the time the rotating polygon mirror 212 has been rotated by a predetermined angle from the position at time T=t1, the red light beam and the green light beam enter the same reflecting surface 213a of the rotating polygon mirror 212, while the blue light beam enters a reflecting surface 213b that has just arrived at this entering position. At this time, in particular, since the incident angle of the blue light beam into the reflecting surface 213b is small, its reflection angle in the rotation direction 212a is the smallest among the three light beams. Accordingly, the green light beam is reflected at the largest angle in the rotation direction 212a, the red light beam is reflected at a slightly smaller angle than the green light beam, and the blue light beam is reflected at a still smaller angle than the red light beam. Therefore, the light beams of the respective colors form images of the first focusing lenses 210R, 210G and 210B at different positions on the image display panel 204 as indicated by the figure. In other words, the region illuminated by the green light, the region illuminated by the red light and the region illuminated by the blue light are formed on the image display panel 204 in this order from the top.

At time T=t3 (see FIG. 4C), which is the time the rotating polygon mirror 212 has been further rotated by a predetermined angle from the position at time T=t2, only the red light beam enters the reflecting surface 213a, while the green light beam and the blue light beam enter the same reflecting surface 213b. At this time, in particular, since the incident angle of the green light beam into the reflecting surface 213b is small, its reflection angle in the rotation direction 212a is the smallest among the three light beams. Accordingly, the red light beam is reflected at the largest angle in the rotation direction 212a, the blue light beam is reflected at a slightly smaller angle than the red light beam, and the green light beam is reflected at a still smaller angle than the blue light beam. Therefore, the light beams of these colors form images of the first focusing lenses 210R, 210G and 210B provided for the respective colors at different positions on the image display panel 204 as indicated by the figure. In other words, the region illuminated by the red light, the region illuminated by the blue light and the region illuminated by the green light are formed on the image display panel 204 in this order from the top.

At time T=t4 (see FIG. 4D), which is the time the rotating polygon mirror 212 has been further rotated by a predetermined angle from the position at time T=t3, the light beams of red, green and blue enter the same reflecting surface 213b. At this time, the positional relationship is the same as that at time T=t1 (see FIG. 4A), and the state of the image display panel 204 illuminated by the light beams of these colors also is the same.

At time T=t5 (see FIG. 4E), which is the time the rotating polygon mirror 212 has been further rotated by a predetermined angle, the red light beam and the green light beam enter the same reflecting surface 213b, while the blue light beam enters a reflecting surface 213c that has just arrived at this entering position. At this time, the positional relationship is the same as that at time T=t2 (see FIG. 4B), and the state of the image display panel 204 illuminated by the light beams of these colors also is the same.

At time T=t6 (see FIG. 4F), which is the time the rotating polygon mirror 212 has been further rotated by a predetermined angle, the red light beam enters the reflecting surface 213b, while the green light beam and the blue light beam enter the same reflecting surface 213c. At this time, the positional relationship is the same as that at time T=t3 (see FIG. 4C), and the state of the image display panel 204 illuminated by the light beams of these colors also is the same.

As described above, the belt-like regions illuminated by the light beams of red, green and blue that are formed on the image display panel 204 move sequentially in a scanning direction 204a. Although FIGS. 4A to 4F showed only the specific points in time (time T=t1 to t6) in the above description, because of a continuous rotation of the rotating polygon mirror 212, each of the regions illuminated by the light beams of the individual colors moves (is scanned) on the image display panel 204 continuously upward (in the scanning direction 204a). When the region illuminated by the light beam reaches the upper end, it returns to the lower end and moves upward again. The times t1 to t6 described above are switched continuously at an even time interval, thereby allowing an illumination with enhanced color uniformity and brightness uniformity and reduced flicker.

The scanning optical system 203 is formed of an optical system provided with a function of the fθ lens and that of changing the magnification for forming an appropriate illuminated region on the image display panel 204. In the above configuration, the images of the first focusing lenses 210R, 210G and 210B provided for the respective colors are formed at the illumination position. At least in the scanning direction 204a, the images of the first focusing lenses 210R, 210G and 210B provided for the respective colors and the belt-like illuminated regions (color bands) at the illumination position are conjugated.

Figure 5:
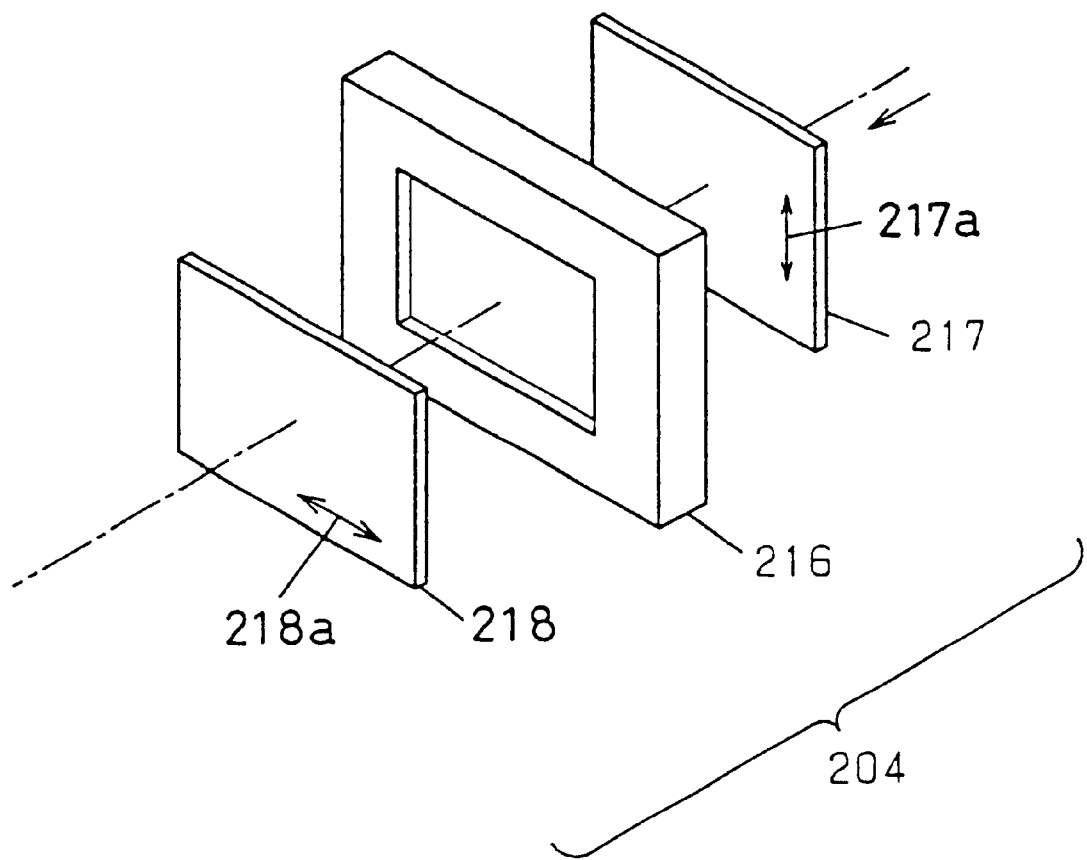
FIG. 5 is an exploded perspective view showing a configuration of a transmission-type image display panel used in the color image display device shown in FIG. 1.

As shown in FIG. 5, the image display panel 204 includes a transmission-type liquid crystal panel 216, an entrance-side polarizing plate 217 provided as a polarizer on the entrance side and an exit-side polarizing plate 218 provided as an analyzer on the exit side. The entrance-side polarizing plate 217 is designed, for example, to transmit light polarized in a shorter side direction 217a of its rectangular outline and to absorb light polarized in a direction orthogonal thereto. The light transmitted by the entrance-side polarizing plate 217 enters the liquid crystal panel 216. The liquid crystal panel 216 has many pixels formed and arranged therein and is capable of changing the polarization direction of the transmitted light at every pixel aperture by an external signal. In this configuration, the liquid crystal panel 216 transmits the incident light while rotating its polarization direction by 90° when the pixels are not driven, whereas it transmits the incident light without changing the polarization direction when the pixels are driven. The exit-side polarizing plate 218 has polarization characteristics in a direction orthogonal to the entrance-side polarizing plate 217. In other words, the exit-side polarizing plate 218 has a transmission axis in a longer side direction 218a of its rectangular outline and transmits light polarized in this direction. Thus, the light that has entered an undriven pixel of the liquid crystal panel 216 and been transmitted with its polarization direction rotated by 90° can pass through this exit-side polarizing plate 218 because it is polarized in a direction parallel with the transmission axis of the exit-side polarizing plate 218. On the other hand, the light that has entered a driven pixel of the liquid crystal panel 216 and been transmitted without being subjected to the change in its polarization direction is absorbed by this exit-side polarizing plate 218 because it is polarized in a direction orthogonal to the transmission axis of the exit-side polarizing plate 218.

With the use of the image display panel 204 configured as above, an image is formed by driving each pixel of the liquid crystal panel 216 by a signal corresponding to the color of illuminating light and modulating the light at every pixel. The light transmitted by the image display panel 204 reaches an observer. Since the scannings of the light beams of the individual colors shown in FIGS. 4A to 4F are carried out at a high speed (it is preferable that one unit encompassing FIGS. 4A to 4F is carried out at least once within one field period), images of individual colors are synthesized so as to be perceived by a retina of the observer as a color image that does not appear separately.

The configuration as described above (in which, namely, the light beams of individual colors enter the rotating polygon mirror 212 at different incident angles) makes it possible to display a color image even when using an image display panel that is not provided with a color selection member such as a color filter. In addition, since each pixel of the image display panel 204 displays the image according to the color of light illuminating this pixel, resolution is not deteriorated. Furthermore, since the light from the light source portion 201 always is led to the image display panel 204 effectively, it is possible to achieve a high efficiency of light utilization.

Figure 32:
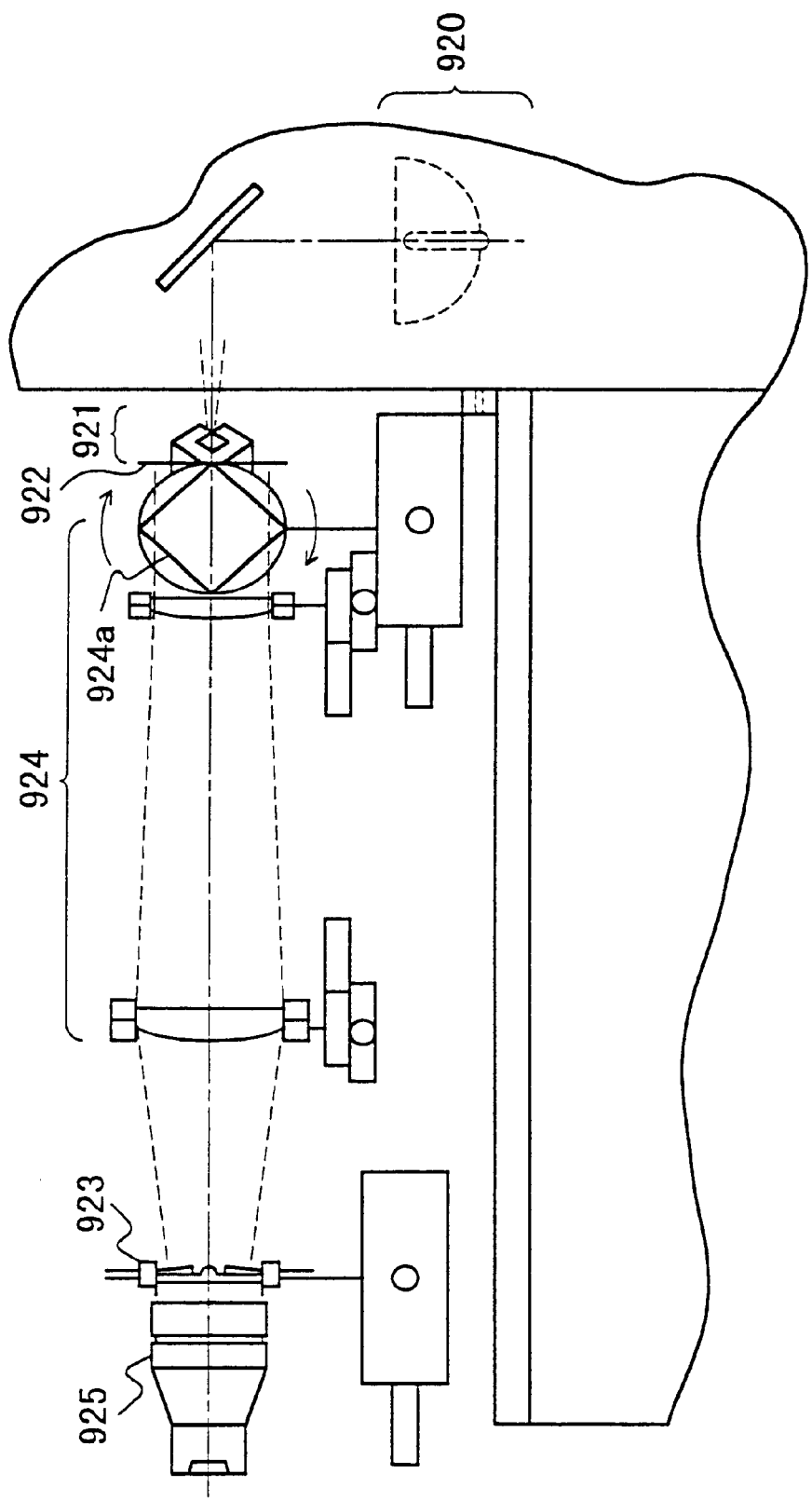
FIG. 32 is a schematic view showing a configuration of a conventional single-plate projection-type image display apparatus using a scanning optical system.
Figure 33:
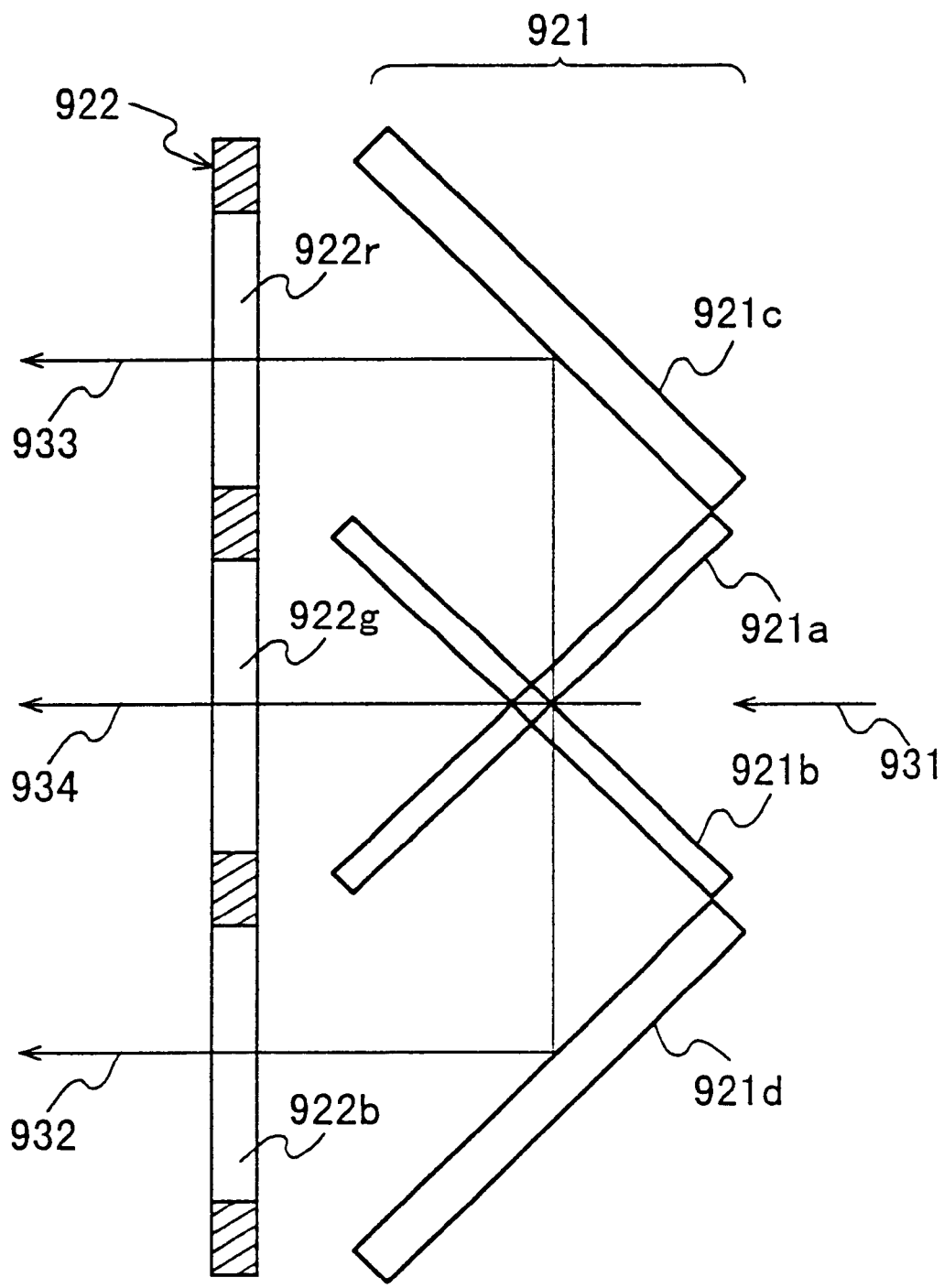
FIG. 33 is a sectional view showing a detail of a color separation optical system used in the image display apparatus of FIG. 32.

In the conventional display apparatus described in JP 4-316296 A mentioned above (see FIG. 32), the light beams of respective colors from the illumination portion pass through a rotating four-plane prism 924a. Accordingly, two planes of the prism 924a that are spaced away are needed for scanning the light beams of these colors, causing difficulty in reducing the cross-section of an effective light beam, so that the entire apparatus becomes larger. In the present embodiment, on the other hand, since the light beams of respective colors are scanned by using the rotating polygon mirror 212, which is a polygonal mirror, it is possible to reduce the cross-section of the effective light beam entering the reflecting surface 213, so that the reflecting surface 213 can be made smaller. Accordingly, it becomes possible to reduce the size of the rotating polygon mirror 212, allowing a smaller motor for rotating this rotating polygon mirror. As a result, it becomes possible to reduce the size, weight and cost of the entire apparatus.

Although a transmission-type liquid crystal system display device is used as the image display panel 204 in the above embodiment, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 203, in particular) in accordance with the display device to be used.

In the present embodiment, among the chief rays of the lights entering the rotating polygon mirror 212, when the angle that the chief ray of red light 103R forms with that of green light 103G is expressed by $\theta_{C1}$, the angle that the chief ray of green light 103G forms with that of blue light 103B is expressed by $\theta_{C2}$, and the angle at a rotation axis subtended by the width of one of the reflecting surfaces 213 of the rotating polygon mirror 212 along the rotation direction 212a (a central angle) is expressed by $\theta_P$ ($\theta_P = 2\pi/n$, where n is the number of the reflecting surfaces 213 provided in the rotating polygon mirror 212), as shown in FIG. 1, it is preferable that the following relationship is satisfied.

$$(\theta_{C1} + \theta_{C2}) \times 3/2 \leq 2 \times \theta_P$$

In this formula, the left side of the inequality sign indicates a diverging angle of the light beams reflected by the rotating polygon mirror 212. In this case, the interference of light beams (overlapping of light beams when the light beams are spread from their chief rays) is not considered. The right side of the inequality sign indicates an angle range in which the incident light is scanned by the rotating polygon mirror 212. The above formula indicates that the light beams that have entered the rotating polygon mirror 212 are present within the scanning range of the rotating polygon mirror 212, which means that there is no light loss.

Embodiment 1-(2)

Figure 6A:
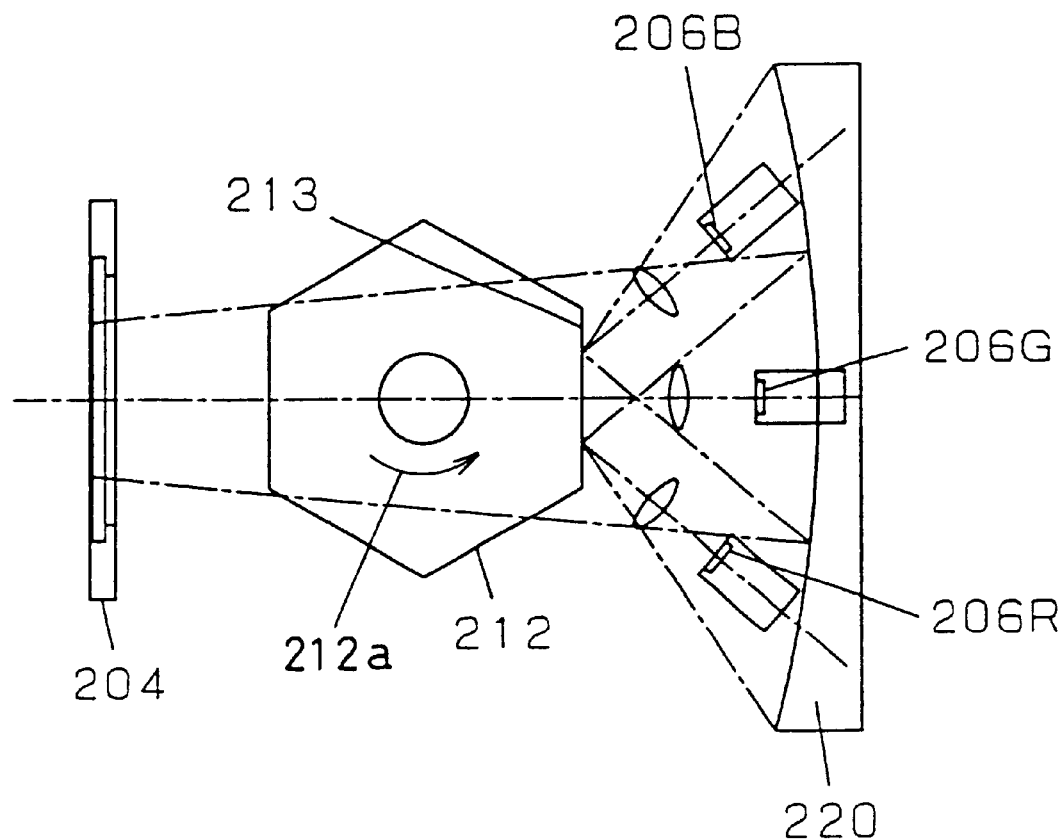
FIG. 6A is a plan view showing a schematic configuration of a color image display device according to Embodiment 1-(2) of the present invention.
Figure 6B:
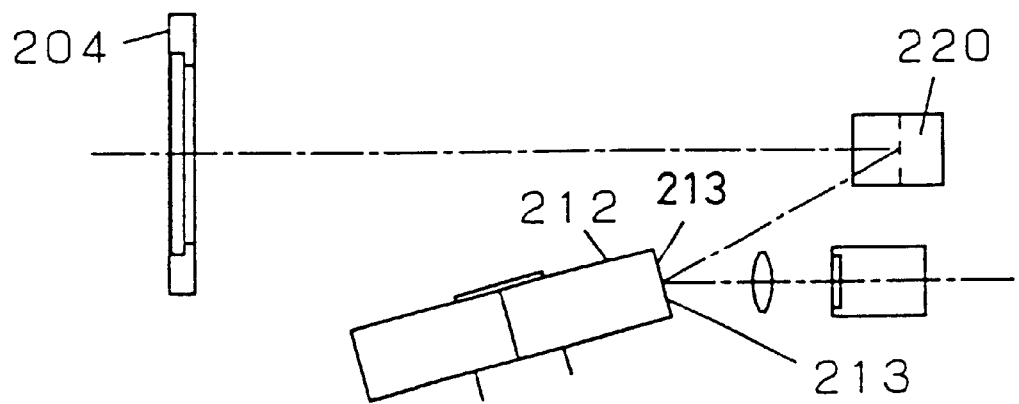
FIG. 6B is a side view thereof.
Figure 7A:
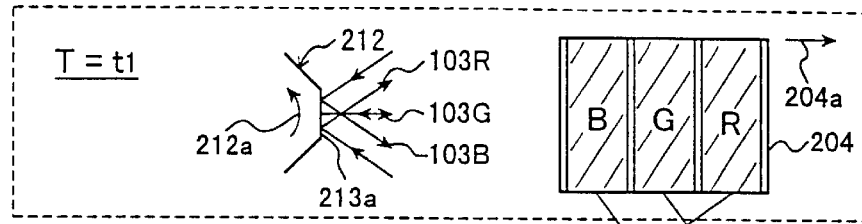
FIGS. 7A to 7F are drawings showing how light reflected by a rotating polygon mirror changes and how light beams of individual colors illuminating an image display panel are scanned in the color image display device shown in FIGS. 6A and 6B.
Figure 7B:
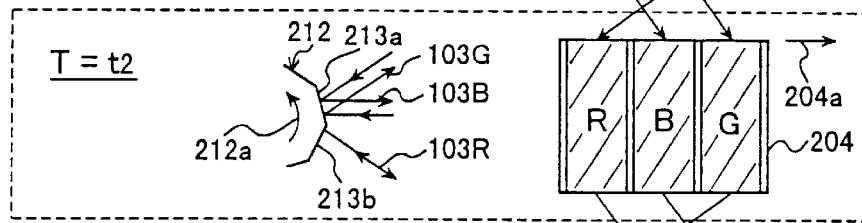
Figure 7C:
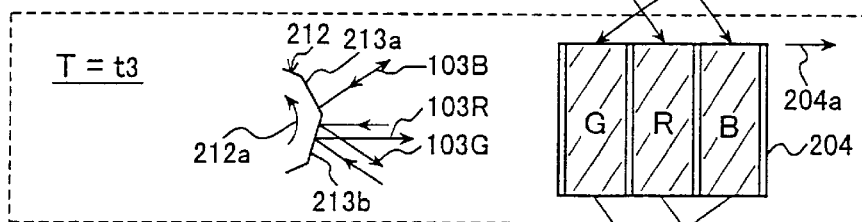
Figure 7D:
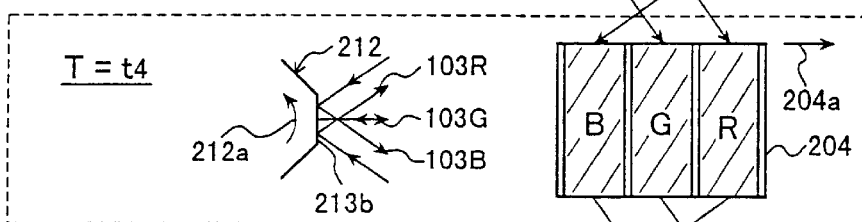
Figure 7E:
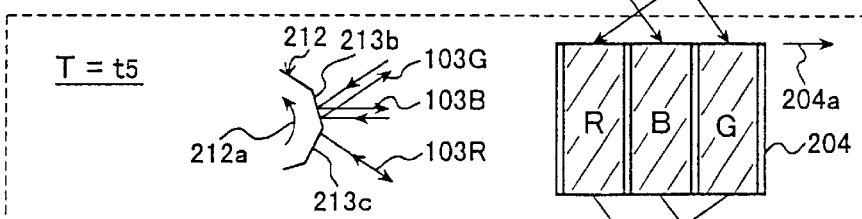
Figure 7F:
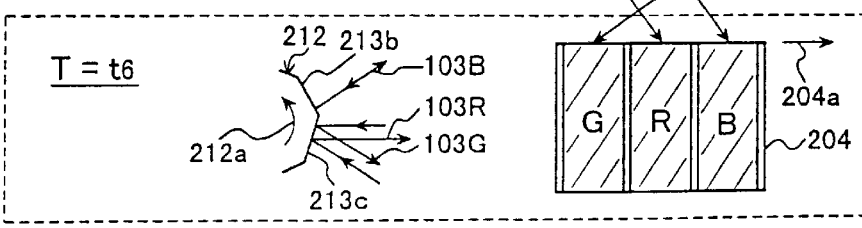

Although Embodiment 1-(1) described above has a configuration in which all the light beams from the light source portion obliquely enter the reflecting surface 213 of the rotating polygon mirror 212, it also is possible to constitute optical systems as in FIGS. 6A and 6B. FIG. 6A is a plan view and FIG. 6B is a side view. As shown in FIG. 6A, when seen from a direction substantially parallel with the rotation axis of the rotating polygon mirror 212, the central light beam out of the three light beams enters the rotating polygon mirror 212 so that its chief ray crosses the rotation axis of the rotating polygon mirror 212. On the other hand, as shown in FIG. 6B, in a plane including the rotation axis of the rotating polygon mirror 212 and the above-mentioned chief ray of the central light beam, the chief rays of the respective colors obliquely enter the reflecting surface 213 of the rotating polygon mirror 212 (in other words, the chief rays of the respective colors enter at a predetermined angle with respect to the rotation axis of the rotating polygon mirror 212). The light beams of respective colors reflected by the reflecting surface 213 are led to the image display panel 204 by a reflection-type scanning optical system 220.

The following is a description of how light beams of individual colors illuminating the image display panel 204 are scanned, with reference to FIGS. 7A to 7F.

FIGS. 7A to 7F show the rotation of the rotating polygon mirror 212 and an accompanying change in the state of the image display panel 204 illuminated by the light beams of individual colors at a fixed time interval. The illumination states of the image display panel 204 are shown on the right side of the figures, and R, G and B represent regions illuminated by the red light, the green light and the blue light respectively. The rotation of the rotating polygon mirror 212 and reflection states of the light beams of individual colors are shown on the left side of the figures, and 103R, 103G and 103B indicate chief rays of red light, green light and blue light respectively, and arrows indicate the traveling directions of these rays.

At time T=t1 (see FIG. 7A), the light beams of red, green and blue enter the same reflecting surface 213a of the rotating polygon mirror 212. As shown in the figure, the blue light beam is reflected in a direction opposite to the direction in which the reflecting surface 213a moves (the rotation direction 212a), the green light beam is reflected in a front direction of the scanning optical system 220, and the red light beam is reflected in the rotation direction 212a. Thus, the light beams of these colors enter the scanning optical system 220 at different angles from each other. Therefore, the light beams of the respective colors from the rectangular light emitting portions 206R, 206G and 206B form illuminated regions at different positions on the image display panel 204 as indicated by the figure. In other words, the region illuminated by the blue light, the region illuminated by the green light and the region illuminated by the red light are formed on the image display panel 204 in this order from the left.

At time T=t2 (see FIG. 7B), which is the time the rotating polygon mirror 212 has been rotated by a predetermined angle from the position at time T=t1, the blue light beam and the green light beam enter the same reflecting surface 213a of the rotating polygon mirror 212, while the red light beam enters a reflecting surface 213b that has just arrived at this entering position. At this time, the blue light beam is reflected in the front direction of the scanning optical system 220, the green light beam is reflected in the rotation direction 212a, and the red light beam is reflected in the direction opposite to the rotation direction 212a. Therefore, the light beams of the respective colors from the rectangular light emitting portions 206R, 206G and 206B form the illuminated regions at different positions on the image display panel 204 as indicated by the figure. In other words, the region illuminated by the red light, the region illuminated by the blue light and the region illuminated by the green light are formed on the image display panel 204 in this order from the left.

At time T=t3 (see FIG. 7C), which is the time the rotating polygon mirror 212 has been further rotated by a predetermined angle from the position at time T=t2, only the blue light beam enters the reflecting surface 213a, while the green light beam and the red light beam enter the same reflecting surface 213b. At this time, the blue light beam is reflected in the rotation direction 212a, the green light beam is reflected in the direction opposite to the rotation direction 212a, and the red light beam is reflected in the front direction of the scanning optical system 220. Therefore, the light beams of the respective colors from the rectangular light emitting portions 206R, 206G and 206B form the illuminated regions at different positions on the image display panel 204 as indicated by the figure. In other words, the region illuminated by the green light, the region illuminated by the red light and the region illuminated by the blue light are formed on the image display panel 204 in this order from the left.

At time T=t4 (see FIG. 7D), which is the time the rotating polygon mirror 212 has been further rotated by a predetermined angle from the position at time T=t3, the light beams of red, green and blue enter the same reflecting surface 213b. At this time, the positional relationship is the same as that at time T=t1 (see FIG. 7A), and the state of the image display panel 204 illuminated by the light beams of these colors also is the same.

At time T=t5 (see FIG. 7E), which is the time the rotating polygon mirror 212 has been further rotated by a predetermined angle, the blue light beam and the green light beam enter the same reflecting surface 213b, while the red light beam enters a reflecting surface 213c that has just arrived at this entering position. At this time, the positional relationship is the same as that at time T=t2 (see FIG. 7B), and the state of the image display panel 204 illuminated by the light beams of these colors also is the same.

At time T=t6 (see FIG. 7F), which is the time the rotating polygon mirror 212 has been further rotated by a predetermined angle, the blue light beam enters the reflecting surface 213b, while the green light beam and the red light beam enter the same reflecting surface 213c. At this time, the positional relationship is the same as that at time T=t3 (see FIG. 7C), and the state of the image display panel 204 illuminated by the light beams of these colors also is the same.

As described above, the belt-like regions illuminated by the light beams of red, green and blue that are formed on the image display panel 204 move sequentially in the scanning direction 204a. Although FIGS. 7A to 7F showed only the specific points in time (time T=t1 to t6) in the above description, because of a continuous rotation of the rotating polygon mirror 212, each of the regions illuminated by the light beams of the individual colors moves (is scanned) on the image display panel 204 continuously rightward (in the scanning direction 204a). When the region illuminated by the light beam reaches the right end, it returns to the left end and moves rightward again. The times t1 to t6 described above are switched continuously at an even time interval, thereby allowing an illumination with enhanced color uniformity and brightness uniformity and reduced flicker.

The height of the optical systems (the dimension in the direction substantially in parallel with the rotation axis of the rotating polygon mirror 212) in Embodiment 1-(2) is larger than that in Embodiment 1-(1). However, since a projecting area of the entire apparatus in this direction becomes smaller, this may be advantageous for the miniaturization of the entire apparatus. In terms of performance, since the distance from the second focusing lenses 211R, 211G and 211B to the reflecting surface 213 of the rotating polygon mirror 212 varies depending on the respective light beams in Embodiment 1-(1), the size of the spots formed on the reflecting surface 213 also varies depending on these light beams. In Embodiment 1-(2), on the other hand, since the difference of the optical paths of the respective light beams can be suppressed to a small amount, it is possible to minimize the difference in size of the spots formed on the reflecting surface 213, thus maintaining a high focusing efficiency.

Embodiment 1-(3)

The following is a description of Embodiment 1-(3), which allows still higher image quality in Embodiment 1-(2) described above.

Figure 8A:
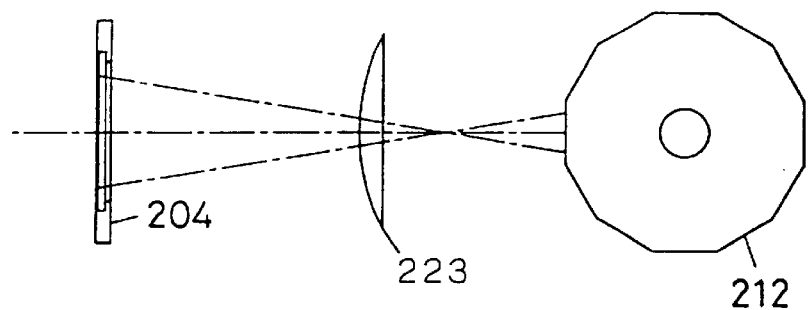
FIG. 8A is a side view showing a configuration from a rotating polygon mirror to an image display panel of a color image display device according to Embodiment 1-(3) of the present invention.
Figure 8B:
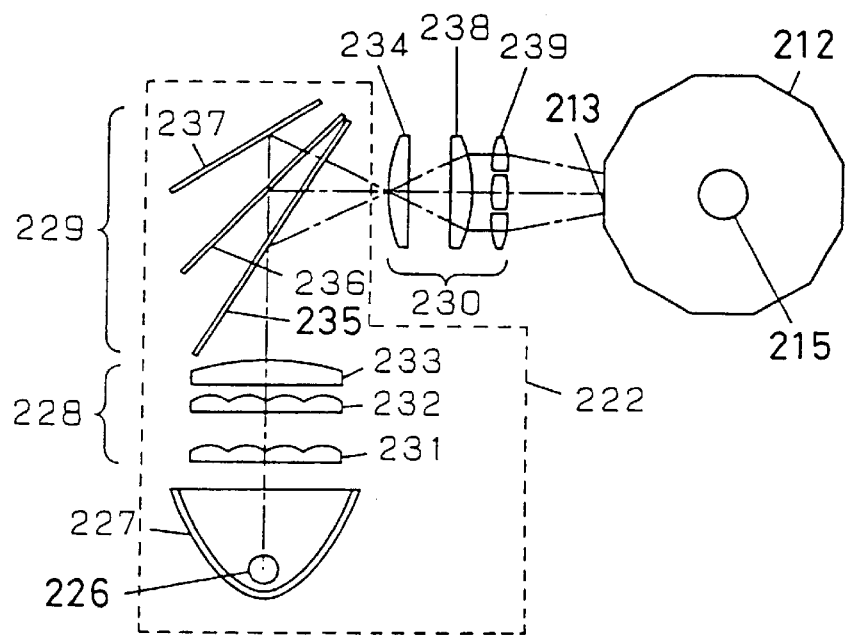
FIG. 8B is a side view showing a configuration from a light source to the rotating polygon mirror thereof.
Figure 8C:
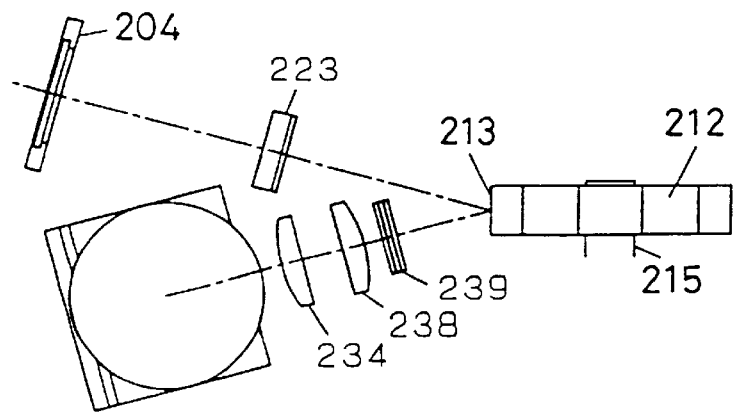
FIG. 8C is a plan view showing an entire configuration thereof.

FIGS. 8A to 8C show a schematic configuration of a color image display device of Embodiment 1-(3), with FIG. 8A being a side view showing the configuration from a rotating polygon mirror 212 to an image display panel 204, FIG. 8B being a side view showing the configuration from a light source 226 to the rotating polygon mirror 212, and FIG. 8C being a plan view showing an entire configuration. The color image display device of the present embodiment includes a light source portion 222, a focusing optical system (a first optical system) 230 for light beams of different colors, a rotating polygon mirror 212, a scanning optical system (a second optical system) 223, an image display panel 204 and an image display panel driving circuit, which is not shown in this figure.

The light source portion 222 is provided with a light source 226 for forming an arc by a discharge between electrodes, generating a white light beam and emitting it and a reflector 227 for reflecting the light beam from the light source 226 in one direction on its axis of rotational symmetry. The light beam from the light source 226 passes through an integrator optical system 228, a color separation optical system 229 and the focusing optical system 230 for light beams of different colors sequentially and then enters the rotating polygon mirror 212.

The integrator optical system 228 includes a first lens array 231, which is a group of identically-shaped microlenses, a second lens array 232 that has the same shape as the first lens array 231, and a focusing lens 233. The integrator optical system 228 superimposes an image of the microlenses on the first lens array 231 onto a first focusing lens 234 constituting the focusing optical system 230 for light beams of different colors, allowing a uniform illumination.

The white light beam from the integrator optical system 228 enters the color separation optical system 229 before reaching the first focusing lens 234. The color separation optical system 229 includes a blue-reflecting dichroic mirror 235, a red-transmitting dichroic mirror 236 and a reflection mirror 237 that are arranged obliquely with respect to the incident light. The white light beam that has entered the color separation optical system 229 is separated into blue, green and red light beams as shown in FIG. 8B and then superimposed on the first focusing lens 234 of the focusing optical system 230 for light beams of respective colors.

The focusing optical system 230 for light beams of respective colors includes the first focusing lens 234, a second focusing lens 238 and a third focusing lens 239. The light beams of respective colors that have left the first focusing lens 234 are focused at different positions on the second focusing lens 238. The third focusing lens 239 refracts optical paths of these focused light beams, so that these light beams enter the reflecting surface 213 of the rotating polygon mirror 212 at desired incident angles. The rotating polygon mirror 212 is rotated about a rotation axis 215 by a motor, which is not shown in this figure. The light beams of respective colors that have entered the rotating polygon mirror 212 scan the image display panel 204 similarly to Embodiments 1-(1) and 1-(2) described above. Since the description thereafter would be the same, it is omitted here.

As described above, according to Embodiment 1-(3), the color separation optical system 229 is provided, thereby separating a light beam from the white light source such as a metal halide lamp or a high-pressure mercury lamp into red, green and blue light beams efficiently so as to use them similarly to Embodiments 1-(1) and 1-(2).

Also, with the configuration of the present invention, since the belt-like illuminated regions are scanned on the image display panel 204, a uniform illumination can be achieved constantly in the scanning direction. However, with respect to the direction orthogonal to the scanning direction, although there is no problem when a light source with an excellent brightness uniformity in the center and the periphery is used as the light source as in the optical system of Embodiments 1-(1) and 1-(2), the periphery becomes darker than the center when the discharge-tube-type light source such as the metal halide lamp or the high-pressure mercury lamp mentioned above is used. This is because, when such a discharge-tube-type light source is used, a light beam having a distribution in which the center is bright and the periphery is dark is emitted from the reflector 227. According to Embodiment 1-(3), an image having uniform brightness is formed using the integrator optical system 228 and then projected, so it is possible to produce an excellent image without any brightness decrease in the periphery even in the direction orthogonal to the scanning direction of the image display panel 204.

Embodiment 1-(4))

Figure 9:
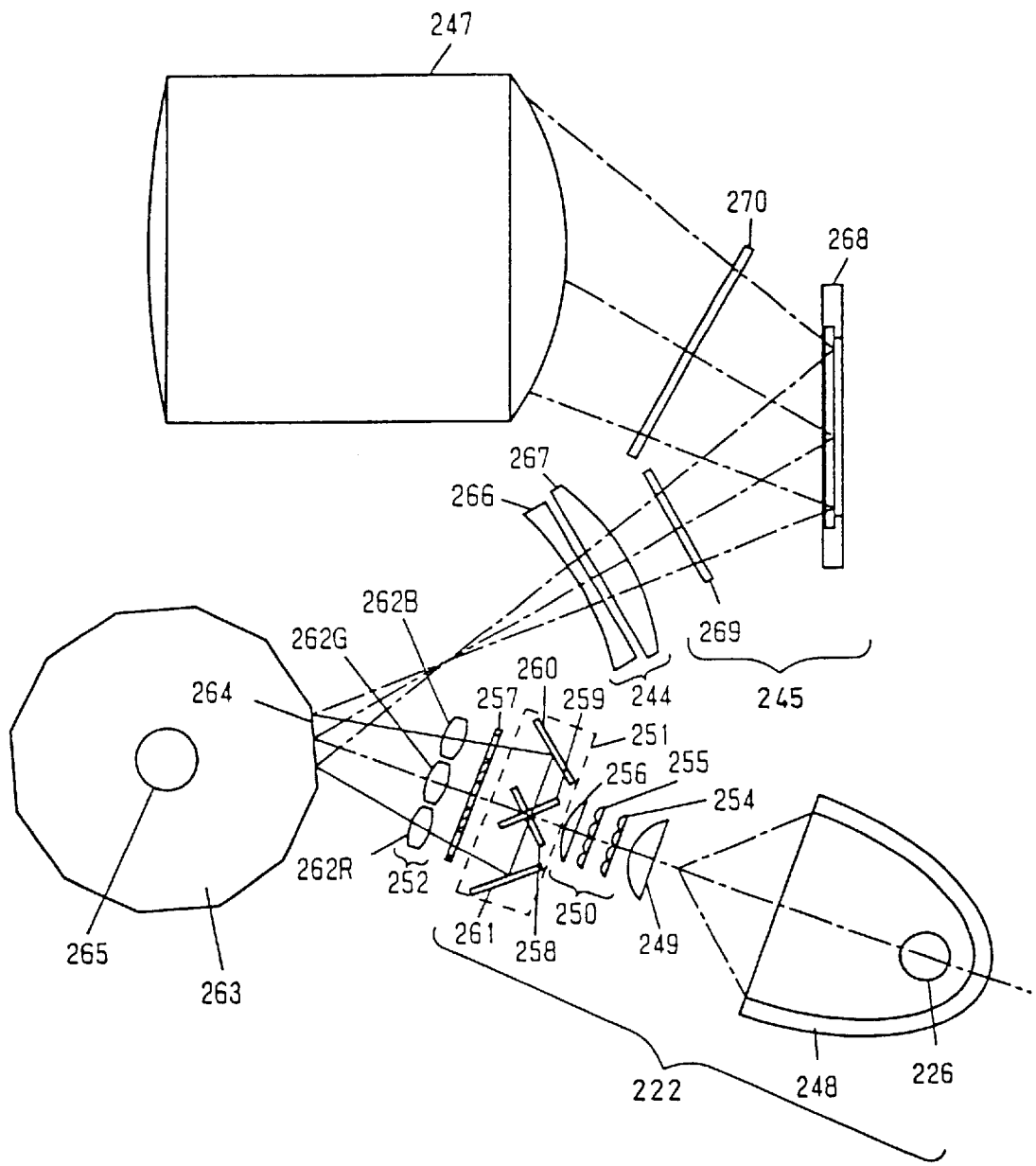
FIG. 9 is a schematic view showing a configuration of a projection-type image display apparatus according to Embodiment 1-(4) of the present invention.

FIG. 9 is a schematic view showing a configuration of a projection-type image display apparatus according to Embodiment 1-(4). The projection-type image display apparatus of the present embodiment includes a light source portion 222, a focusing optical system (a first optical system) 252 for light beams of different colors and a rotating polygon mirror 263, a scanning optical system (a second optical system) 244, an image display panel 245, a projection optical system 247 and an image display panel driving circuit, which is not shown in this figure.

The light source portion 222 is provided with a light source 226 for forming an arc by a discharge between electrodes, generating a white light beam and emitting it and a reflector 248 having an elliptical reflecting surface. The reflector 248 focuses the light beam from the light source 226 onto one point ahead on an opening side on an axis of rotational symmetry of the reflecting surface (a focal position).

The light source portion 222 further includes a collimator optical system 249, an integrator optical system 250 and a color separation optical system 251.

The collimator optical system 249 includes a collimator lens for turning the light beam focused by the reflector 248 into a substantially parallel light beam (in other words, a collimator lens having a focal length that is equivalent to the distance to the focusing position).

The parallel light beam that has passed through the collimator optical system 249 enters the integrator optical system 250. The integrator optical system 250 has a configuration similar to that in Embodiment 1-(3) and includes a first lens array 254, which is a group of identically-shaped microlenses, a second lens array 255 that has the same shape as the first lens array 254, and a focusing lens 256. The integrator optical system 250 superimposes an image of the microlenses on the first lens array 254 onto a stop 257, allowing a uniform illumination.

The white light beam from the integrator optical system 250 enters the color separation optical system 251 before reaching the stop 257. The color separation optical system 251 includes a blue-reflecting dichroic mirror 258 and a red-reflecting dichroic mirror 259 that are arranged obliquely with respect to the incident light and cross each other, and total reflection mirrors 260 and 261 that are arranged obliquely with respect to the incident light. The white light beam that has entered the color separation optical system 251 is separated into blue, green and red light beams as shown in FIG. 9. These light beams enter apertures of corresponding colors on the stop 257 at different angles, and then reach the focusing optical system 252 for light beams of respective colors.

The focusing optical system 252 for light beams of respective colors includes a blue light focusing lens 262B, a green light focusing lens 262G and a red light focusing lens 262R. These focusing lenses 262B, 262G and 262R are decentered appropriately with respect to the apertures on the stop 257. Thus, the light beams of the respective colors emitted from the focusing lenses 262B, 262G and 262R enter a reflecting surface 264 of the rotating polygon mirror 263 at desired incident angles.

Figure 10:
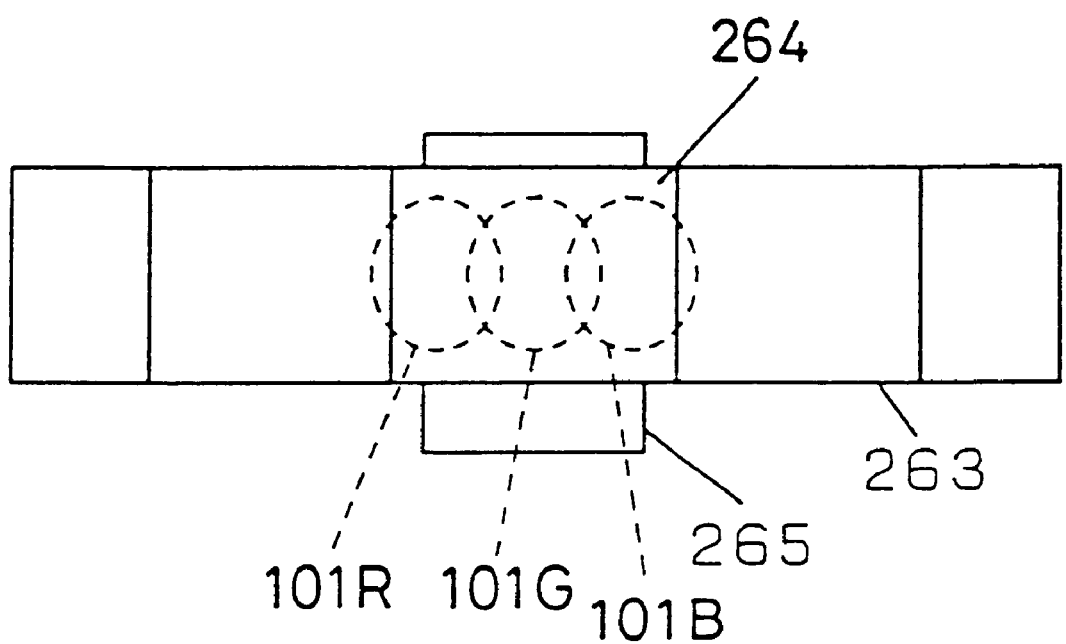
FIG. 10 is a side view showing how groups of red, green and blue lights are formed on a rotating polygon mirror of the projection-type image display apparatus shown in FIG. 9.

In this case, as shown in FIG. 10, although the light beams of respective colors on the reflecting surface 264 are arranged so as to have a predetermined space therebetween in the scanning direction so that their chief rays do not overlap each other, their focusing states (spots) 101R, 101G and 101B are superimposed partially unlike Embodiment 1-(1). Even when the light beams are superimposed on the reflecting surface 264, this relationship is not necessarily reflected directly on an illumination position (the image display panel). Since a scanning optical system 244, which will be described below, has a configuration in which a height of a light beam at the illumination position is determined depending on the incident angle of the light beam, even when light beams are superimposed on the reflecting surface 264, the light beams of respective colors will be separated at the illumination position as long as their incident angles into the scanning optical system 244 are different. By superimposing the spots of these light beams on the reflecting surface 264, the reflecting surface 264 can be made smaller, and therefore, the rotating polygon mirror 263 can be made smaller, thus contributing to the reduction in size and weight of the entire apparatus. However, since a part of the light beam that is far from the chief ray and superimposed on an adjacent light beam has such a large reflection angle that it cannot be taken into the scanning optical system 244, and thus is lost, the superimposing of the light beams desirably is small.

The rotating polygon mirror 263 is rotated about a rotation axis 265 by a motor, which is not shown in this figure.

The light beams of respective colors that have entered the rotating polygon mirror 263 are reflected similarly to Embodiments 1-(1) to 1-(3) described above and then reach the scanning optical system 244.

The scanning optical system 244 is formed of an fθ lens 266 for effectively covering the range of a scanning angle of the rotating polygon mirror 263 and focusing the incident light beams at different positions in a height direction of the image according to their incident angles and a magnification changing lens 267 for changing the light beams from the fθ lens 266 into a desired magnification.

In this manner, the light beams of respective colors that have been scanned by the rotating polygon mirror 263 scan over the reflection-type image display panel 245 by the scanning optical system 244. This scanning would be the same as that in Embodiment 1-(1), so the description thereof is omitted here.

Figure 11:
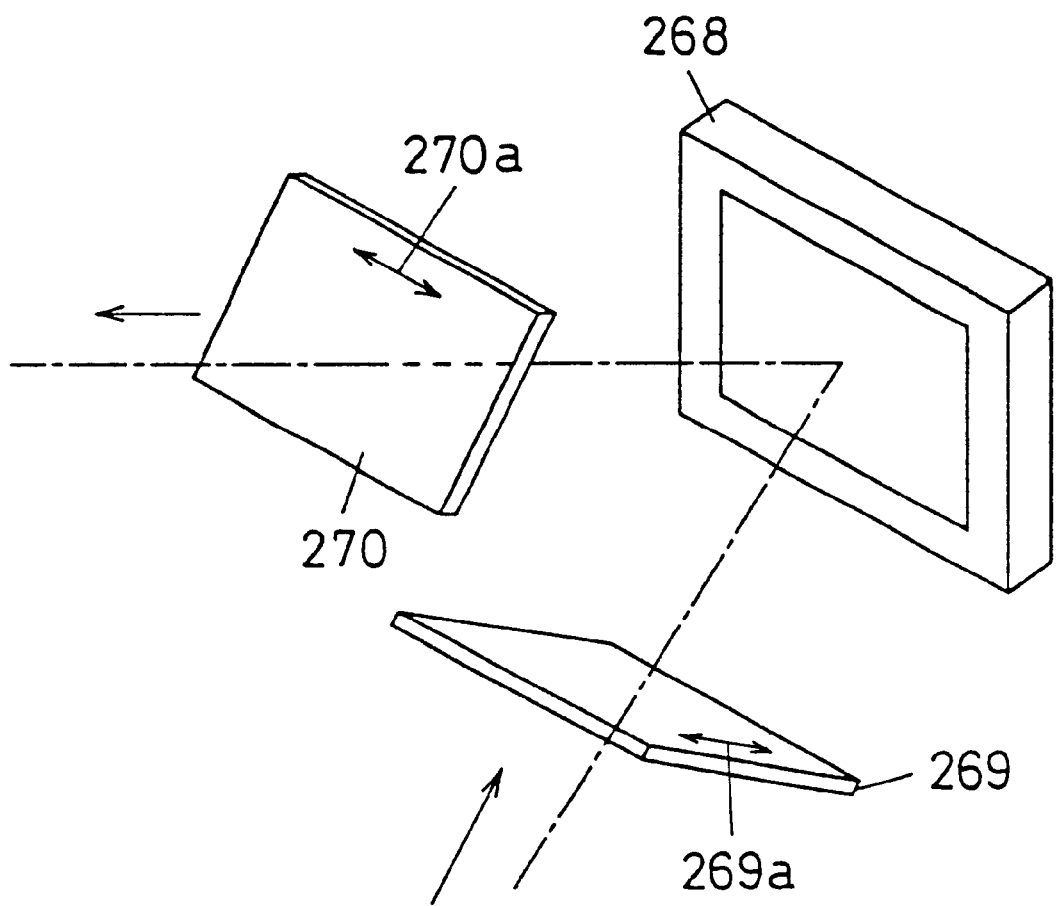
FIG. 11 is a perspective view showing a configuration of a reflection-type image display panel used in the projection-type image display apparatus shown in FIG. 9.

As shown in FIG. 11, the reflection-type image display panel 245 includes a reflection-type liquid crystal panel 268, an entrance-side polarizing plate 269 provided as a polarizer on an optical path of the incident light and an exit-side polarizing plate 270 provided as an analyzer on an optical path of the reflected light. The entrance-side polarizing plate 269 is designed, for example, to transmit light polarized in a shorter side direction 269a of its rectangular outline and to absorb light polarized in a direction orthogonal thereto. The light transmitted by the entrance-side polarizing plate 269 enters the reflection-type liquid crystal panel 268. The reflection-type liquid crystal panel 268 has many pixels formed and arranged therein and is capable of changing the polarization direction of the reflected light at every pixel aperture by an external signal. In this configuration, the reflection-type liquid crystal panel 268 reflects the incident light while rotating its polarization direction by 90° when the pixels are not driven, whereas it reflects the incident light without changing the polarization direction when the pixels are driven. The exit-side polarizing plate 270 has polarization characteristics in a direction orthogonal to the entrance-side polarizing plate 269. In other words, the exit-side polarizing plate 270 has a transmission axis in a longer side direction 270a of its rectangular outline and transmits light polarized in this direction. Thus, the light that has entered an undriven pixel of the reflection-type liquid crystal panel 268 and been reflected with its polarization direction rotated by 90° can pass through this exit-side polarizing plate 270 because it is polarized in a direction parallel with the transmission axis of the exit-side polarizing plate 270. On the other hand, the light that has entered a driven pixel of the reflection-type liquid crystal panel 268 and been transmitted without being subjected to the change in its polarization direction is absorbed by this exit-side polarizing plate 270 because it is polarized in a direction orthogonal to the transmission axis of the exit-side polarizing plate 270.

With the use of the reflection-type image display panel 245 configured as above, an image is formed by driving each pixel of the reflection-type liquid crystal panel 268 by a signal corresponding to the color of illuminating light and modulating the light at every pixel.

The light transmitted by the exit-side polarizing plate 270 enters a projection lens constituting the projection optical system 247 shown in FIG. 9, and then the image on the reflection-type liquid crystal panel 268 is magnified and projected onto a screen, which is not shown in this figure. In this case, since the light beams of the individual colors scan over the reflection-type liquid crystal panel 268 as in FIGS. 4A to 4F at a high speed (it is preferable that one unit encompassing FIGS. 4A to 4F is carried out at least once within one field period), the images of individual colors are synthesized and perceived by a retina of an observer as a color image that does not appear separately.

Although a reflection-type liquid crystal system display device is used as the image display panel 245 in the above embodiment, any device is appropriate as long as it is a display device that displays an image by modulating an incident light. Thus, it is possible to use a transmission-type liquid crystal system or a reflection-type mirror device. Needless to say, it has to be a display device capable of fast response. Moreover, it is necessary to optimize optical systems (the scanning optical system 244, in particular) in accordance with the display device to be used.

Embodiment 2

Figure 12A:
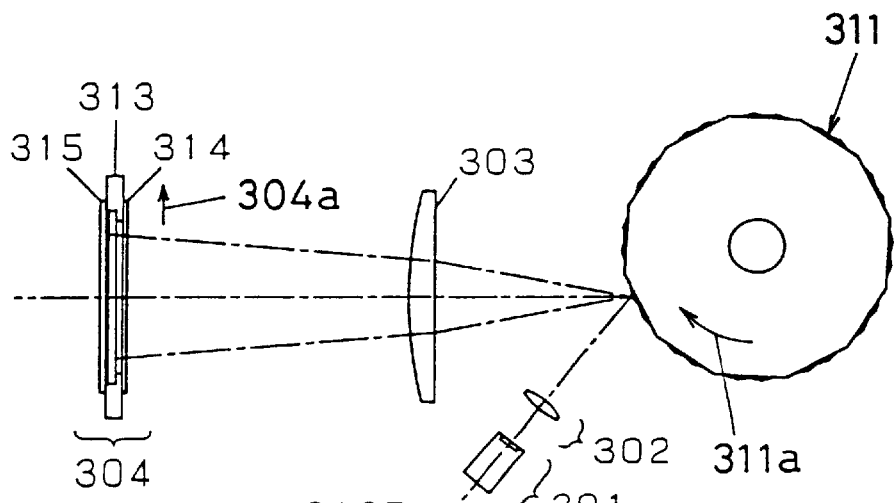
FIG. 12A is a plan view showing a configuration from a light source to an image display panel of a color image display device according to Embodiment 2 of the present invention.
Figure 12B:
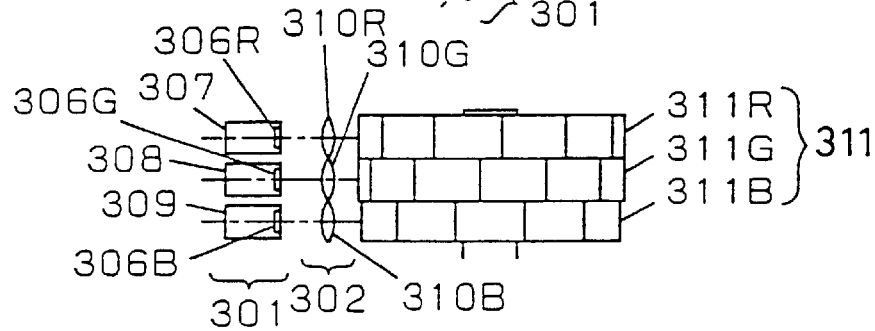
FIG. 12B is a side view showing a configuration from the light source to a rotating polygon mirror thereof.
Figure 12C:
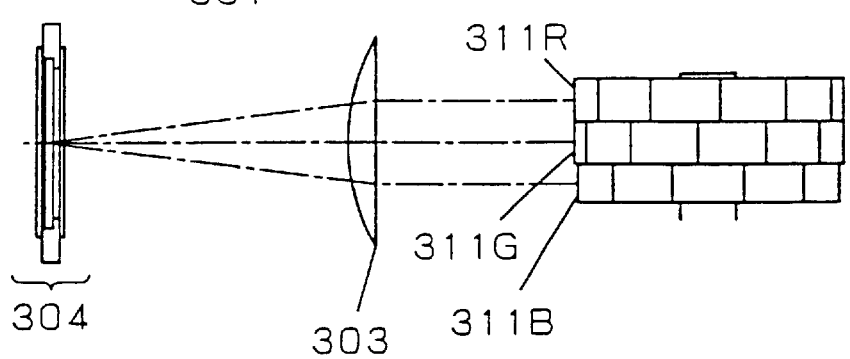
FIG. 12C is a side view showing a configuration from the rotating polygon mirror to the image display panel thereof

FIGS. 12A to 12C are schematic views showing a configuration of a color image display device of Embodiment 2. FIG. 12A is a plan view showing the configuration from a light source to an image display panel, FIG. 12B is a side view showing the configuration from the light source to a rotating polygon mirror, and FIG. 12C is a side view showing the configuration from the rotating polygon mirror to the image display panel. The color image display device of the present embodiment includes a light source portion 301, a focusing system (a first optical system) 302, a rotating polygon mirror 311, a scanning optical system (a second optical system) 303, an image display panel 304 and an image display panel driving circuit, which is not shown in this figure.

The light source portion 301 has a light source portion for red light 307, a light source portion for green light 308 and a light source portion for blue light 309 that emit red, green and blue light beams respectively. The light source portion for red light 307, the light source portion for green light 308 and the light source portion for blue light 309 respectively are provided with rectangular light emitting portions 306R, 306G and 306B on their light emitting side. Light beams of respective colors emitted from the light emitting portions 306R, 306G and 306B enter focusing lenses 310R, 310G and 310B provided for the respective colors in the focusing system 302. These incident light beams leave the focusing lenses 310R, 310G and 310B provided for the respective colors, and then enter the rotating polygon mirror 311.

The rotating polygon mirror 311 of Embodiment 2 is constituted by joining three identically-shaped rotating polygon mirrors 311R, 311G and 311B in one piece in such a manner as to match their rotation axes. When the angle at the rotation axis subtended by the width of one reflecting surface of each of the rotating polygon mirrors 311R, 311G and 311B along a rotation direction 311a (a central angle) is expressed by $\theta_P$ ($\theta_P = 2\pi/n$, where n is the number of the reflecting surfaces provided in the rotating polygon mirror), the three rotating polygon mirrors 311R, 311G and 311B are joined such that their phases are shifted by $\theta_P/3$ each around the rotation axis. The integrated rotating polygon mirror 311 is rotated by a motor, which is not shown in this figure.

Figure 13:
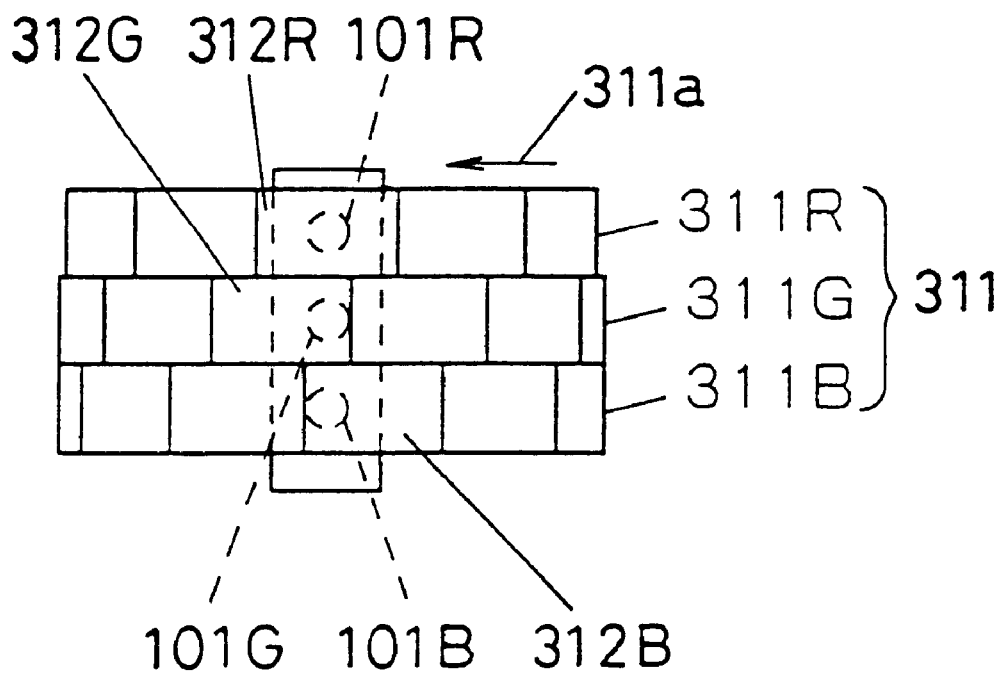
FIG. 13 is a side view showing how groups of red, green and blue lights are formed on the rotating polygon mirror of the color image display device shown in FIGS. 12A to 12C.

The red, green and blue light beams emitted from the focusing lenses 310R, 310G and 310B respectively enter the reflecting surfaces of the rotating polygon mirrors 311R, 311G and 311B of the rotating polygon mirror 311. At a given point during the rotation of the rotating polygon mirror 311, as shown in FIG. 13, groups (spots) of red, green and blue lights 101R, 101G and 101B are formed on reflecting surfaces 312R, 312G and 312B of the rotating polygon mirrors 311R, 311G and 311B so as to be aligned along a direction parallel with the rotation axis and not overlap each other.

The light beams of respective colors reflected by the reflecting surfaces 312R, 312G and 312B of the rotating polygon mirrors 311R, 311G and 311B pass through a scanning lens constituting the scanning optical system 303 and then reach the image display panel 304. As shown in FIG. 12C, the scanning optical system 303 has a focusing effect also in a direction orthogonal to the scanning direction and superimposes the light beams of respective colors, which enter at different heights, on the image display panel 304 within a plane orthogonal to the scanning direction.

The following is a description of how the reflected light changes and how the light beams of individual colors illuminating the image display panel 304 are scanned during the rotation of the rotating polygon mirror 311, with reference to FIGS. 14A to 14F.

FIGS. 14A to 14F show the rotation of the rotating polygon mirror 311 and an accompanying change in the state of the image display panel 304 illuminated by the light beams of individual colors at a fixed time interval. The illumination states of the image display panel 304 are shown on the uppermost part of the figures, and R, G and B represent regions illuminated by the red light, the green light and the blue light respectively. Although the longitudinal direction of the belt-like regions illuminated by these colors corresponds to a vertical direction in practice, the directions are rotated by 90° in these figures so that the scanning states can be understood easily. The reflection states of the light beams of individual colors in the rotating polygon mirrors 311R, 311G and 311B are shown in this order from the top in the lower part of the figures, 103R, 103G and 103B indicate chief rays of red light, green light and blue light respectively, and arrows indicate the traveling directions of these rays.

At time T=t1 (see FIG. 14A), the red light beam enters a reflecting surface 312R*a* of the rotating polygon mirror 311R, the green light beam enters a reflecting surface 312G*a* of the rotating polygon mirror 311G, and the blue light beam enters a reflecting surface 312B*a* of the rotating polygon mirror 311B. In this case, the phases of the reflecting surfaces 312R*a*, 312G*a* and 312B*a* are shifted in this order. Accordingly, the blue light beam is reflected at the largest angle in the direction in which the reflecting surface 312B*a* moves (the rotation direction 311*a*), the green light beam is reflected at a slightly smaller angle than the blue light beam, and the red light beam is reflected at a still smaller angle than the green light beam. Thus, the light beams of these colors enter the scanning lens of the scanning optical system 303 at different angles from each other. In the scanning optical system 303, a height of a light beam at an illumination position (the image display panel 304) is determined depending on the incident angle of the light beam with respect to the scanning direction. Therefore, the light beams of these colors form images of the light emitting portions 306R, 306G and 306B of the light source portion 301 at different positions on the image display panel 304 as indicated by the figure. In other words, the region illuminated by the blue light, the region illuminated by the green light and the region illuminated by the red light are formed on the image display panel 304 in this order from the right (the top in FIG. 14A).

At time T=t2 (see FIG. 14B), which is the time the rotating polygon mirror 311 has been rotated by a predetermined angle from the position at time T=t1, the red light beam and the green light beam respectively enter the same reflecting surfaces 312R*a* and 312G*a* as those at time T=t1, while the blue light beam enters a reflecting surface 312B*b* that has just arrived at this entering position. At this time, in particular, since the incident angle of the blue light beam into the reflecting surface 312B*b* is small, its reflection angle in the rotation direction 311*a* is the smallest among the three light beams. Accordingly, the green light beam is reflected at the largest angle in the rotation direction 311*a*, the red light beam is reflected at a slightly smaller angle than the green light beam, and the blue light beam is reflected at a still smaller angle than the red light beam. Therefore, the light beams of the respective colors form images of the light emitting portions 306R, 306G and 306B of the light source portion 301 at different positions on the image display panel 304 as indicated by the figure. In other words, the region illuminated by the green light, the region illuminated by the red light and the region illuminated by the blue light are formed on the image display panel 304 in this order from the right.

At time T=t3 (see FIG. 14C), which is the time the rotating polygon mirror 311 has been further rotated by a predetermined angle from the position at time T=t2, only the red light beam enters the same reflecting surface 312R*a* as that at time T=t1, t2, the green light beam enters a reflecting surface 312G*b* that has just arrived at this entering position, and the blue light beam enters the same reflecting surface 312B*b* as that at time T=t2. At this time, in particular, since the incident angle of the green light beam into the reflecting surface 312G*b* is small, its reflection angle in the rotation direction 311*a* is the smallest among the three light beams. Accordingly, the red light beam is reflected at the largest angle in the rotation direction 311*a*, the blue light beam is reflected at a slightly smaller angle than the red light beam, and the green light beam is reflected at a still smaller angle than the blue light beam. Therefore, the light beams of these colors form images of the light emitting portions 306R, 306G and 306B of the light source portion 301 at different positions on the image display panel 304 as indicated by the figure. In other words, the region illuminated by the red light, the region illuminated by the blue light and the region illuminated by the green light are formed on the image display panel 304 in this order from the right.

At time T=t4 (see FIG. 14D), which is the time the rotating polygon mirror 311 has been further rotated by a predetermined angle from the position at time T=t3, the red light beam enters a reflecting surface 312R*b* that has just arrived at this entering position, while the green light beam and the blue light beam respectively enter the same reflecting surfaces 312G*b* and 312B*b* as those at time T=t3. At this time, the positional relationship is the same as that at time T=t1 (see FIG. 14A), and the state of the image display panel 304 illuminated by the light beams of these colors also is the same.

At time T=t5 (see FIG. 14E), which is the time the rotating polygon mirror 311 has been further rotated by a predetermined angle, the red light beam and the green light beam respectively enter the same reflecting surfaces 312R*b* and 312G*b* as those at time T=t4, while the blue light beam enters a reflecting surface 312B*c* that has just arrived at this entering position. At this time, the positional relationship is the same as that at time T=t2 (see FIG. 14B), and the state of the image display panel 304 illuminated by the light beams of these colors also is the same.

At time T=t6 (see FIG. 14F), which is the time the rotating polygon mirror 311 has been further rotated by a predetermined angle, the red light beam enters the same reflecting surface 312R*b* as that at time T=t5, the green light beam enters a reflecting surface 312Gc that has just arrived at this entering position, and the blue light beam enters the same reflecting surface 312Bc as that at time T=t5. At this time, the positional relationship is the same as that at time T=t3 (see FIG. 14C), and the state of the image display panel 304 illuminated by the light beams of these colors also is the same.

As described above, the belt-like regions illuminated by the light beams of red, green and blue that are formed on the image display panel 304 move sequentially in a scanning direction 304a. Although FIGS. 14A to 14F showed only the specific points in time (time T=t1 to t6) in the above description, because of a continuous rotation of the rotating polygon mirror 311, each of the regions illuminated by the light beams of the individual colors moves (is scanned) on the image display panel 304 continuously rightward (in the scanning direction 304a). When the region illuminated by the light beam reaches the right end, it returns to the left end and moves rightward again. The times t1 to t6 described above are switched continuously at an even time interval, thereby allowing an illumination with enhanced color uniformity and brightness uniformity and reduced flicker.

The image display panel 304 has the same configuration as the image display panel 204 shown in FIG. 5. In other words, the image display panel 304 includes a transmission-type liquid crystal panel 313, an entrance-side polarizing plate 314 provided as a polarizer on the entrance side and an exit-side polarizing plate 315 provided as an analyzer on the exit side. Since the operation of the image display panel 304 is the same as that of the image display panel 204 shown in FIG. 5, the detailed description thereof is omitted here.

With the use of the image display panel 304 configured as above, an image is formed by driving each pixel of the liquid crystal panel 313 by a signal corresponding to the color of illuminating light and modulating the light at every pixel. The light transmitted by the image display panel 304 reaches an observer. Since the scannings of the light beams of the individual colors shown in FIGS. 14A to 14F are carried out at a high speed (it is preferable that one unit encompassing FIGS. 14A to 14F is carried out at least once within one field period), images of individual colors are synthesized so as to be perceived by a retina of the observer as a color image that does not appear separately.

Also in Embodiment 2, it becomes possible to display a color image even when using an image display panel that is not provided with a color selection member such as a color filter. In addition, since each pixel of the image display panel 304 displays the image according to the color of light illuminating this pixel, resolution is not deteriorated. Furthermore, since the light from the light source portion 301 always is led to the image display panel 304 effectively, it is possible to achieve a high efficiency of light utilization.

Moreover, as described in Embodiment 1-(1), since the light beams of respective colors are scanned also in Embodiment 2 by using the rotating polygon mirror 311, which is a polygonal mirror, it is possible to reduce the cross-section of an effective light beam entering the reflecting surfaces 312R, 312G and 312B, so that the reflecting surfaces 312R, 312G and 312B can be made smaller. Accordingly, it becomes possible to reduce the size of the rotating polygon mirror 311, allowing a smaller motor for rotating this rotating polygon mirror. As a result, it becomes possible to reduce the size, weight and cost of the entire apparatus.

Compared with Embodiments 1-(1) to 1-(4), Embodiment 2 has disadvantages in that a portion of the rotating polygon mirror becomes three times thicker and that the number of components increases. However, since the reflecting surface of the rotating polygon mirror of Embodiment 2 is appropriate as long as it is large enough to accommodate substantially a beam spot of one color, the reflecting surface can be made smaller to a minimum of one-third area (to have one-third length in the rotation direction) of the reflecting surface of Embodiments 1-(1) to 1-(4). Consequently, when the range of the scanning angle is the same, the rotating polygon mirror in Embodiment 2 can be made one-third the size (the size seen in the direction parallel with the rotation axis) of the rotating polygon mirror of Embodiments 1-(1) to 1-(4). Therefore, depending on the arrangement of various component parts in the apparatus, there is a case where the configuration of the present embodiment is more desirable.

Although a transmission-type liquid crystal system display device is used as the image display panel 304 in Embodiment 2, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 303, in particular) in accordance with the display device to be used.

Also in Embodiment 2, a projection optical system may be placed at a position to take in the light that has left the image display panel 304 as in Embodiment 1-(4), thus making it possible to constitute a projection-type image display apparatus for magnifying and projecting the image on the image display panel 304 so as to display large-screen images.

It is needless to say that Embodiment 2 also can achieve a function similar to that in Embodiments 1-(3) and 1-(4) by constituting the light source portion as a light source for emitting a white light beam containing red, green and blue light beams and a color separation optical system for separating this white light beam into the red, green and blue light beams. In addition, the use of the integrator optical system described in Embodiments 1-(3) and 1-(4) is effective for improving the image quality as described above.

Embodiment 3

Figure 15A:
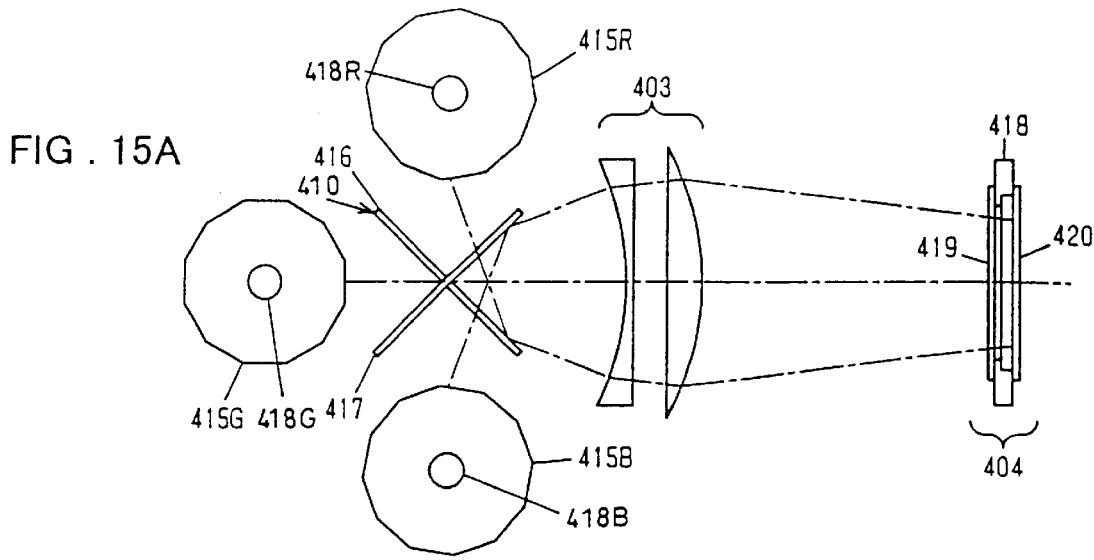
FIG. 15A is a plan view showing a configuration from a rotating polygon mirror to an image display panel of a color image display device according to Embodiment 3 of the present invention.
Figure 15B:
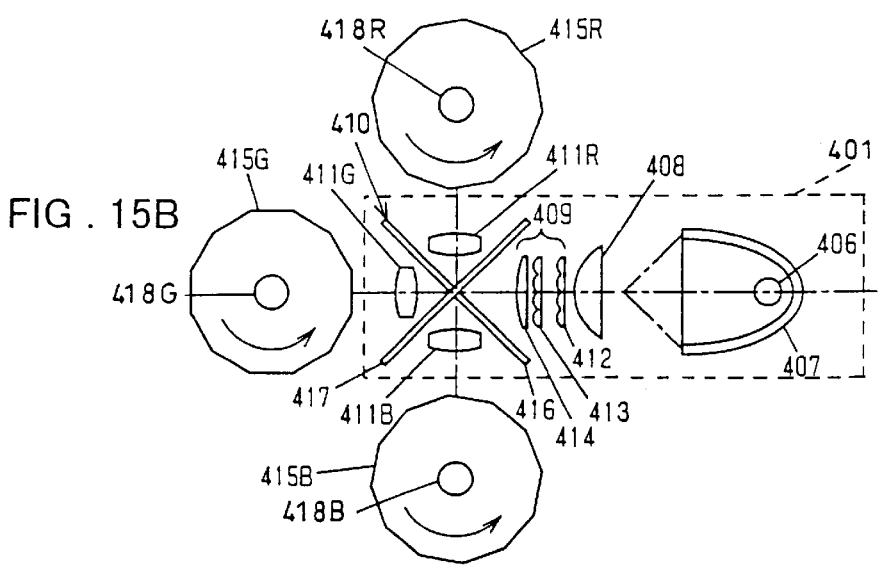
FIG. 15B is a plan view showing a configuration from a light source to the rotating polygon mirror thereof.
Figure 15C:
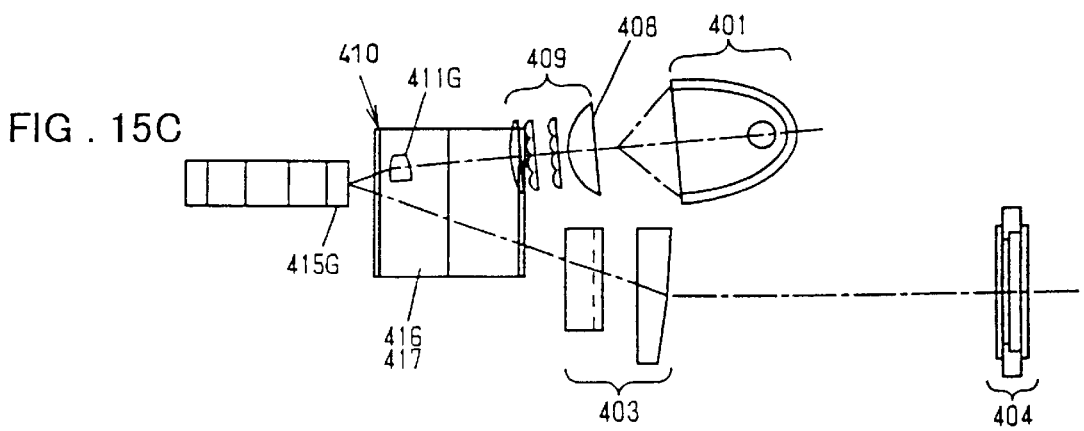
FIG. 15C is a side view thereof seen along a green optical path at the center.

FIGS. 15A to 15C show a schematic configuration of a color image display device of Embodiment 3, with FIG. 15A being a plan view showing the configuration from a rotating polygon mirror to an image display panel, FIG. 15B being a plan view showing the configuration from a light source to the rotating polygon mirror, and FIG. 15C being a side view seen along an optical path of green light at the center.

The color image display device of Embodiment 3 includes a light source portion 401, optical axis shifting systems provided for respective colors (a first optical system) 411R, 411G and 411B, rotating polygon mirrors 415R, 415G and 415B, a scanning optical system (a second optical system) 403, an image display panel 404 and an image display panel driving circuit, which is not shown in this figure.

The light source portion 401 is provided with a light source 406 for forming an arc by a discharge between electrodes, generating a white light beam and emitting it and a reflector 407 having an elliptical reflecting surface. The reflector 407 focuses the light beam from the light source 406 onto one point ahead on an opening side on an axis of rotational symmetry of the reflecting surface (a focal position).

The light source portion 401 further includes a collimator optical system 408, an integrator optical system 409 and a color separation/combination optical system 410.

The collimator optical system 408 includes a collimator lens for turning the light beam focused by the reflector 407 into a substantially parallel light beam (in other words, a collimator lens having a focal length that is equivalent to the distance to the focusing position).

The parallel light beam that has passed through the collimator optical system 408 enters the integrator optical system 409. The integrator optical system 409 includes a first lens array 412, which is a group of identically-shaped microlenses, a second lens array 413 that has the same shape as the first lens array 412, and a focusing lens 414. The integrator optical system 409 superimposes an image of the microlenses on the first lens array 412 onto the optical axis shifting systems 411R, 411G and 411B provided for respective colors, allowing a uniform illumination.

The white light beam from the integrator optical system 409 enters the color separation/combination optical system 410 before reaching the optical axis shifting systems provided for respective colors 411R, 411G and 411B. The color separation/combination optical system 410 includes a red-reflecting dichroic mirror 416 and a blue-reflecting dichroic mirror 417 that are arranged obliquely with respect to the incident light and cross each other. The white light beam that has entered the color separation/combination optical system 410 is separated into red, green and blue light beams as shown in FIG. 15B. These red, green and blue light beams respectively are subjected to changes in their optical axis directions by the optical axis shifting system for red light 411R, the optical axis shifting system for green light 411G and the optical axis shifting system for blue light 411B, and then focused onto the rotating polygon mirrors 415R, 415G and 415B.

The rotating polygon mirrors 415R, 415G and 415B all have the same shape and respectively are rotated about rotation axes 418R, 418G and 418B by a motor, which is not shown in this figure. The rotating polygon mirrors 415R, 415G and 415B rotate while maintaining their angle phases shifted from each other with respect to the respective incident light beams. When the angle at the rotation axis subtended by the width of one reflecting surface of each of the rotating polygon mirrors 415R, 415G and 415B along the rotation direction (a central angle) is expressed by $\theta_P$ ($\theta_P = 2\pi/n$, where n is the number of the reflecting surfaces provided in the rotating polygon mirror), the above-mentioned shifted amount of the phases is $\theta_P/3$.

The light beams of the respective colors that have entered the rotating polygon mirrors 415R, 415G and 415B are reflected by the reflecting surfaces thereof. After being reflected by the reflecting surface of the rotating polygon mirror 415R, the red light beam enters the color separation/combination optical system 410 again. This red light beam is reflected by the red-reflecting dichroic mirror 416 again, and then enters the scanning optical system 403. After being reflected by the reflecting surface of the rotating polygon mirror 415G, the green light beam enters the color separation/combination optical system 410 again. This green light beam is transmitted by the red-reflecting dichroic mirror 416 and the blue-reflecting dichroic mirror 417 again, and then enters the scanning optical system 403. After being reflected by the reflecting surface of the rotating polygon mirror 415B, the blue light beam enters the color separation/combination optical system 410 again. This blue light beam is reflected by the blue-reflecting dichroic mirror 417 again, and then enters the scanning optical system 403.

The scanning optical system 403 is provided with a function of the fθ lens for leading the light beams of the respective colors that have been scanned by the rotating polygon mirrors 415R, 415G and 415B onto the image display panel 404 and a function of changing the magnification for matching the scanning angle, the size of images on the rotating polygon mirrors and the size of an effective portion on the image display panel 404.

The rotating polygon mirrors 415R, 415G and 415B rotate while maintaining their phases shifted from each other, so that the light beams of respective colors enter the scanning optical system 403 at different angles from each other. Consequently, these light beams scan the image display panel 404 in a manner similar to that described in Embodiment 2 using FIGS. 14A to 14F.

The image display panel 404 has the same configuration as the image display panel 204 shown in FIG. 5. In other words, the image display panel 404 includes a transmission-type liquid crystal panel 418, an entrance-side polarizing plate 419 provided as a polarizer on the entrance side and an exit-side polarizing plate 420 provided as an analyzer on the exit side. Since the operation of the image display panel 404 is the same as that of the image display panel 204 shown in FIG. 5, the detailed description thereof is omitted here.

With the use of the image display panel 404 configured as above, as in Embodiment 2, an image is formed by driving each pixel of the liquid crystal panel 418 by a signal corresponding to the color of illuminating light and modulating the light at every pixel. The light transmitted by the image display panel 404 reaches an observer. Since the scannings of the light beams of the individual colors similar to that shown in FIGS. 14A to 14F are carried out at a high speed (it is preferable that one unit encompassing FIGS. 14A to 14F is carried out at least once within one field period), images of individual colors are synthesized so as to be perceived by a retina of the observer as a color image that does not appear separately.

Also in Embodiment 3, it becomes possible to display a color image even when using an image display panel that is not provided with a color selection member such as a color filter. In addition, since each pixel of the image display panel 404 displays the image according to the color of light illuminating this pixel, resolution is not deteriorated. Furthermore, since the light from the light source 406 always is led to the image display panel 404 effectively, it is possible to achieve a high efficiency of light utilization.

Moreover, as described in Embodiment 1-(1), since the light beams of respective colors are scanned also in Embodiment 3 by using the rotating polygon mirrors 415R, 415G and 415B, which are polygonal mirrors, it is possible to reduce the cross-section of an effective light beam entering the respective reflecting surfaces, so that the reflecting surfaces can be made smaller. Accordingly, it becomes possible to reduce the size of the rotating polygon mirrors 415R, 415G and 415B, allowing a smaller motor for rotating this rotating polygon mirror. As a result, it becomes possible to reduce the size, weight and cost of the entire apparatus.

Compared with Embodiments 1-(1) to 1-(4), Embodiment 3 has a disadvantage that providing three rotating polygon mirrors independently increases the number of components, causing a problem in that the entire apparatus becomes larger than those in Embodiments 1 and 2. However, since the color separation/combination optical system 410 can match the optical axes of the light beams of respective colors, an optical system for matching optical axes of the respective light beams becomes unnecessary. Also, when compared with Embodiment 1, the reflecting surface of the rotating polygon mirror can be made smaller for the reason described in Embodiment 2, bringing about a possibility of miniaturizing the rotating polygon mirror.

Although a transmission-type liquid crystal system display device is used as the image display panel 404 in Embodiment 3, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 403, in particular) in accordance with the display device to be used.

In the present embodiment, when the angle that a chief ray of the light beam entering the scanning optical system 403 from each of the secondary light source images formed on the rotating polygon mirrors 415R, 415G or 415B forms with a marginal ray thereof is expressed by a diverging angle $\theta_{OP1}$ (which is designed to be the same for each of the light beams), it is desirable that this satisfies the following relationship with the above-described angle $\theta_P$ subtended by the one of the reflecting surfaces of the rotating polygon mirror.

$$2 \times \theta_{OP1} \leq \theta_P/3$$

Needless to say, it is presumed here that the rotating angle phases of the rotating polygon mirrors 415R, 415G and 415B are shifted by $\theta_P/3$ each in the rotation direction.

Also in Embodiment 3, a projection optical system may be placed at a position to take in the light that has left the image display panel 404 as in Embodiment 1-(4), thus making it possible to constitute a projection-type image display apparatus for magnifying and projecting the image on the image display panel 404 so as to display large-screen images.

Embodiment 4

Figure 16:
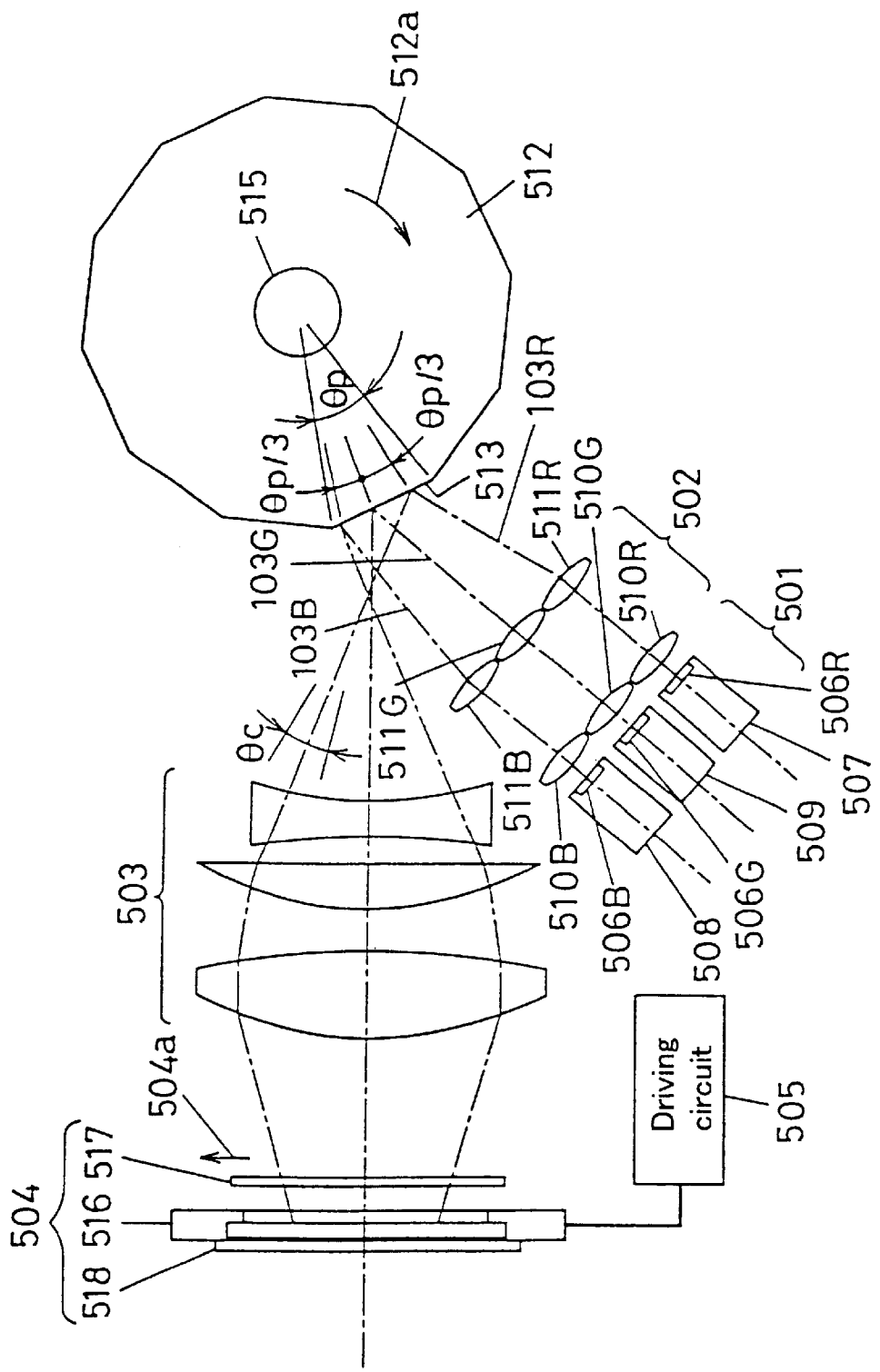
FIG. 16 is a plan view showing a schematic configuration of a color image display device according to Embodiment 4 of the present invention.

FIG. 16 is a plan view showing a schematic configuration of a color image display device of Embodiment 4 of the present invention. The color image display device of Embodiment 4 includes a light source portion 501, a focusing system (a first optical system) 502, a rotating polygon mirror 512, a scanning optical system (a second optical system) 503, an image display panel 504 and an image display panel driving circuit 505.

The light source portion 501 has a light source portion for red light 507, a light source portion for blue light 508 and a light source portion for green light 509 that emit red, blue and green light beams respectively. The light source portion for red light 507, the light source portion for blue light 508 and the light source portion for green light 509 respectively are provided with rectangular light emitting portions 506R, 506B and 506G on their light emitting side. Light beams of individual colors emitted from the light emitting portions 506R, 506G and 506B enter first focusing lenses 510R, 510G and 510B provided for the respective colors in the focusing system 502. These incident light beams are focused on second focusing lenses 511R, 511G and 511B provided for the respective colors by the first focusing lenses 510R, 510G and 510B provided for these colors. The second focusing lenses 511R, 511G and 511B are constituted so as to form images of the rectangular light emitting portions 506R, 506G and 506B on the image display panel 504 via a reflecting surface 513 of the rotating polygon mirror 512 and the scanning optical system 503.

Figure 17:
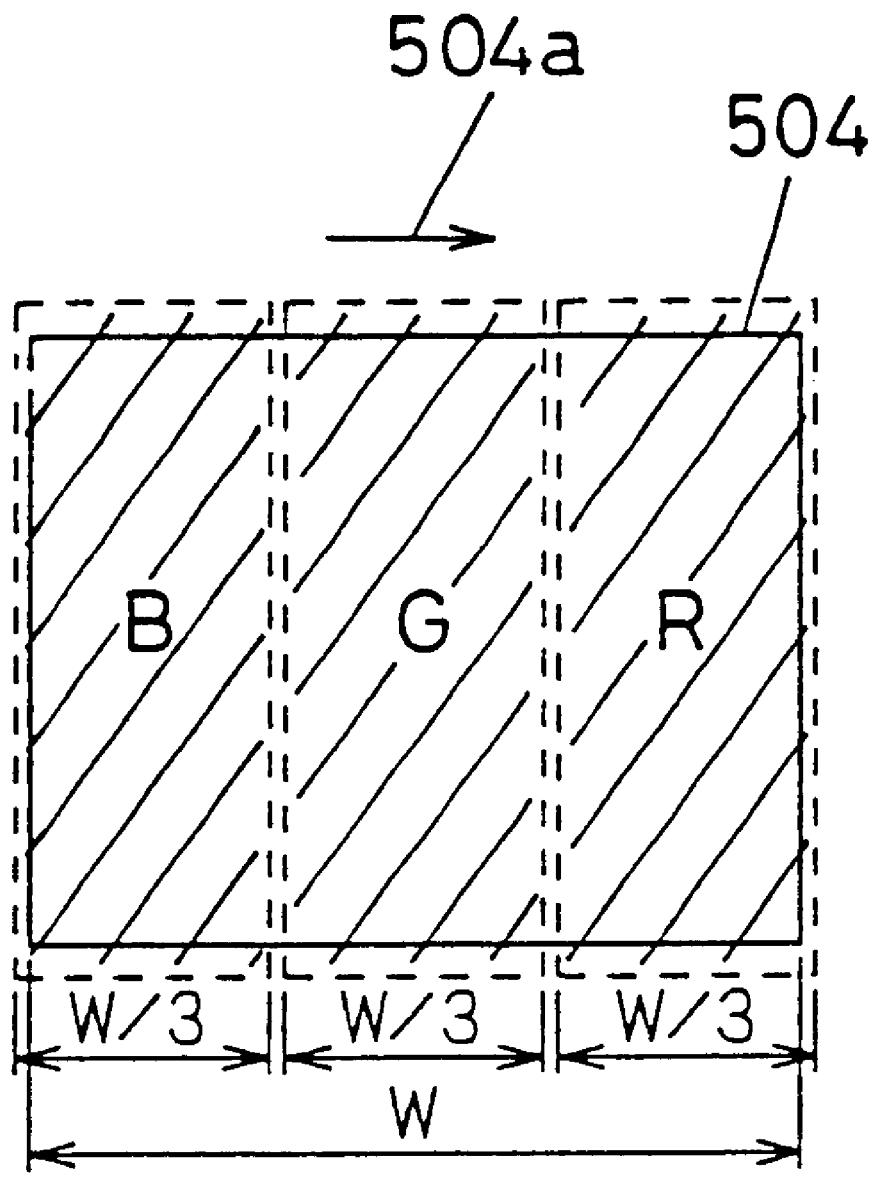
FIG. 17 is a front view showing an illumination state of an image display panel of the color image display device shown in FIG. 16.

FIG. 17 shows an example of an illumination state of the image display panel 504. The light beams of the respective colors emitted from the light source portion for red light 507, the light source portion for blue light 508 and the light source portion for green light 509 illuminate three belt-like regions with a width W/3 (the region surrounded by a dotted line) obtained by substantially trisecting the width W of an effective aperture region of the image display panel 504 along a scanning direction 504a. In other words, as shown in FIG. 17, the red, green and blue light beams form a region illuminated by red light (indicated by "R" in FIG. 17), a region illuminated by green light (indicated by "G" in FIG. 17) and a region illuminated by blue light (indicated by "B" in FIG. 17) on the image display panel 504.

Figure 18:
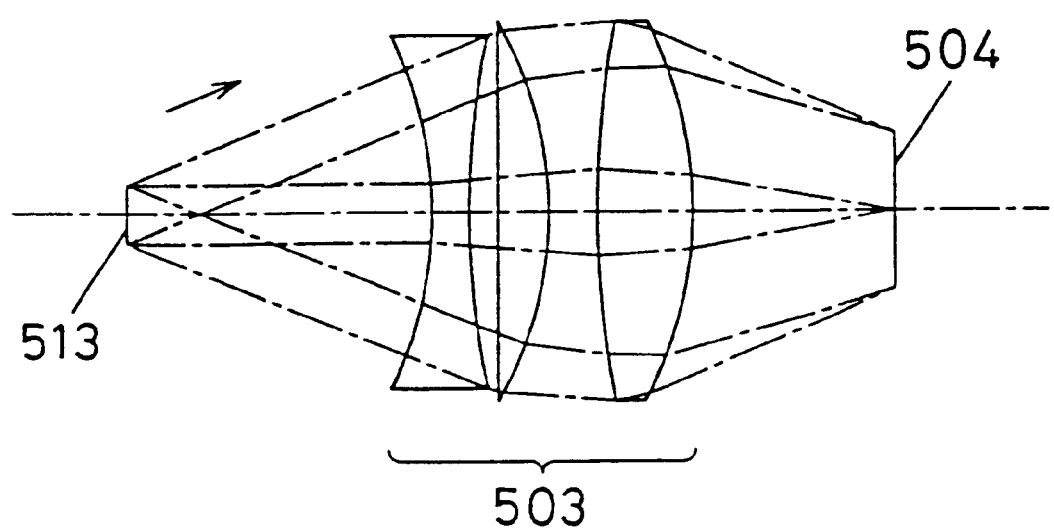
FIG. 18 is a view showing a scanning optical system of the color image display device shown in FIG. 16.

As shown in FIG. 18, the scanning optical system 503 has at least an incident light effective portion corresponding to a scanning range of the light reflected by the reflecting surface 513 of the rotating polygon mirror 512. The scanning optical system 503 is configured such that a height of an image forming position is determined in proportion to an incident angle of the light beam entering this optical system. More specifically, when the angle at the rotation axis subtended by the width of one reflecting surface 513 of the rotating polygon mirror 512 along a rotation direction 512a (a central angle) is expressed by $\theta_P$ ($\theta_P=2\pi/n$, where n is the number of the reflecting surfaces 513 provided in the rotating polygon mirror 512), the scanning optical system 503 is configured such that the light beam that has entered the scanning optical system 503 at the incident angle $\theta_P$ is focused at an end portion along the scanning direction (the portion in which the height of the light beam is greatest) of the effective aperture region of the image display panel 504 at the illumination position. Since the range of scanning angle by the rotating polygon mirror is $\pm\theta_P$, it is possible to illuminate the entire effective aperture region of the image display panel 504 with respect to the scanning direction.

As shown in FIG. 18, such a scanning optical system 503 is constituted by, for example, a plurality of scanning lenses having an aperture elongated in the scanning direction. In some of these scanning lenses, the radius of curvature R is different between the scanning direction and the direction orthogonal thereto. In this manner, the optical system that determines the height of the image forming position according to the incident angle of the light from the reflecting surface 513 of the rotating polygon mirror 512 is provided with respect to the scanning direction, whereas the optical system that magnifies the rectangular shapes of the light emitting portions 506R, 506G and 506B so as to substantially correspond to the height dimension of the image display panel 504 and projects them onto the image display panel 504 via the first focusing lenses 510R, 510G and 510B and the second focusing lenses 511R, 511G and 511B of the focusing system 502 is provided with respect to the direction orthogonal to the scanning direction.

Figure 19:
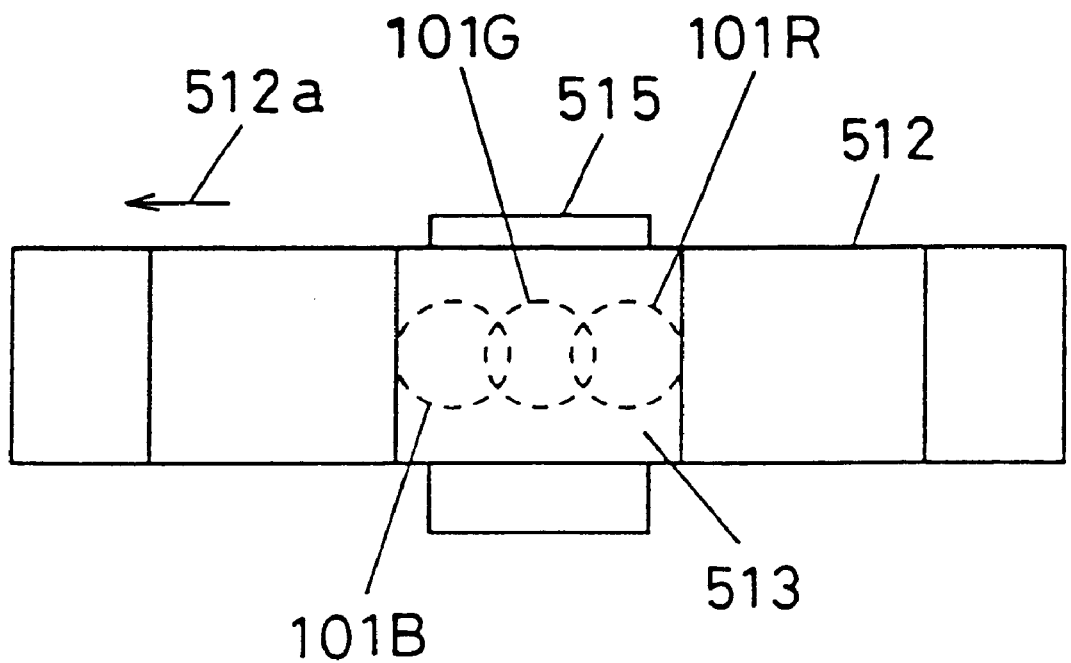
FIG. 19 is a side view showing how groups of red, green and blue lights are formed on a rotating polygon mirror of the color image display device shown in FIG. 16.
Figure 20A:
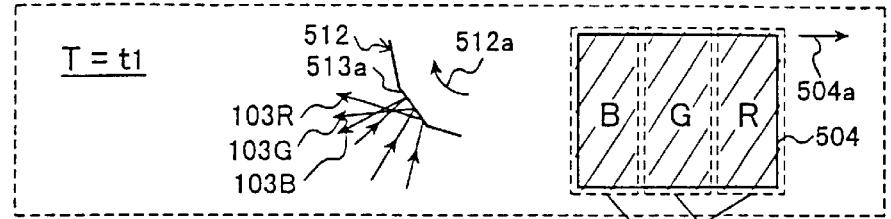
FIGS. 20A to 20F are drawings showing how light reflected by the rotating polygon mirror changes and how light beams of individual colors illuminating the image display panel are scanned in the color image display device shown in FIG. 16.
Figure 20B:
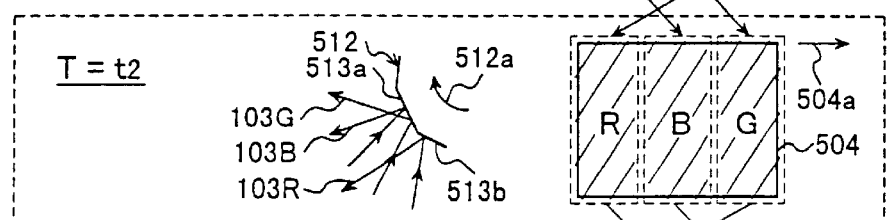
Figure 20C:
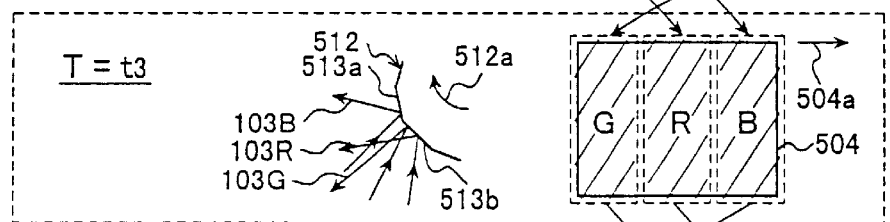
Figure 20D:
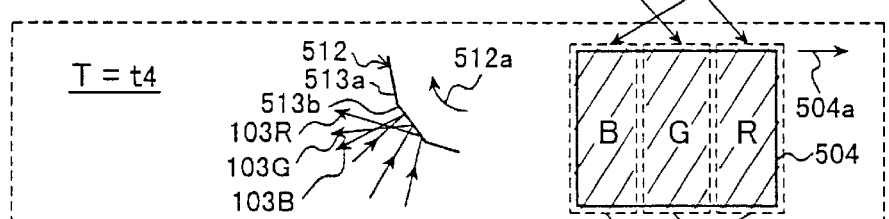
Figure 20E:
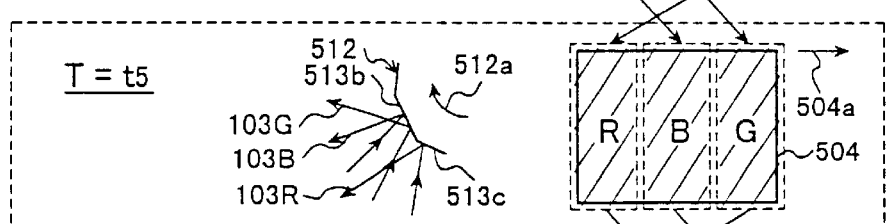
Figure 20F:
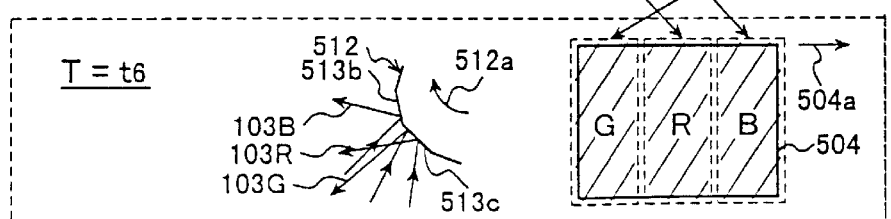

At a given point during the rotation of the rotating polygon mirror 512, as shown in FIG. 19, groups (spots) of red, green and blue lights 101R, 101G and 101B are formed on one reflecting surface 513 so as to be aligned along the rotation direction 512a such that their chief rays do not overlap each other. When incident positions of the chief rays of the light beams of respective colors are seen from an rotation axis of the rotating polygon mirror 512, the angle subtended by a line segment from the incident position of a red chief ray 103R to that of a green chief ray 103G and the angle subtended by a line segment from the incident position of the green chief ray 103G to that of a blue chief ray 103B are both about $\theta_P/3$ as shown in FIG. 16. The rotating polygon mirror 512 is rotated about a rotation axis 515 by a motor, which is not shown in this figure.

The following is a description of how the light reflected by the reflecting surface 513 changes and how the light beams of individual colors illuminating the image display panel 504 are scanned during the rotation of the rotating polygon mirror 512, with reference to FIGS. 20A to 20F.

FIGS. 20A to 20F show the rotation of the rotating polygon mirror 512 and an accompanying change in the state of the image display panel 504 illuminated by the light beams of individual colors at a fixed time interval. The illumination states of the image display panel 504 are shown on the right part of the figures, and R, G and B represent regions illuminated by the red light, the green light and the blue light respectively as in FIG. 17. The rotation of the rotating polygon mirror 512 and reflection states of the light beams of individual colors are shown on the left part of the figures, and 103R, 103G and 103B indicate chief rays of red light, green light and blue light respectively, and arrows indicate the traveling directions of these rays.

At time T=t1 (see FIG. 20A), the light beams of red, green and blue enter the same reflecting surface 513$a$ of the rotating polygon mirror 512. As shown in the figure, the red light beam is reflected at the largest angle in the direction in which the reflecting surface 513$a$ moves (the rotation direction 512$a$), the green light beam is reflected at a slightly smaller angle than the red light beam, and the blue light beam is reflected at a still smaller angle than the green light beam. Thus, the light beams of these colors enter the scanning optical system 503 at different angles from each other. Therefore, the light beams of the respective colors form images of the light emitting portions 506R, 506G and 506B at different positions on the image display panel 504 as indicated by the figure. In other words, the region illuminated by the red light, the region illuminated by the green light and the region illuminated by the blue light are formed on the image display panel 504 in this order from the right.

At time T=t2 (see FIG. 20B), which is the time the rotating polygon mirror 512 has been rotated by a predetermined angle from the position at time T=t1, the blue light beam and the green light beam enter the same reflecting surface 513$a$ of the rotating polygon mirror 512, while the red light beam enters a reflecting surface 513$b$ that has just arrived at this entering position. At this time, in particular, since the incident angle of the red light beam into the reflecting surface 513$b$ is small, its reflection angle in the rotation direction 512$a$ is the smallest among the three light beams. Accordingly, the green light beam is reflected at the largest angle in the rotation direction 512$a$, the blue light beam is reflected at a slightly smaller angle than the green light beam, and the red light beam is reflected at a still smaller angle than the blue light beam. Therefore, the light beams of the respective colors form images of the light emitting portions 506R, 506G and 506B at different positions on the image display panel 504 as indicated by the figure. In other words, the region illuminated by the green light, the region illuminated by the blue light and the region illuminated by the red light are formed on the image display panel 504 in this order from the right.

At time T=t3 (see FIG. 20C), which is the time the rotating polygon mirror 512 has been further rotated by a predetermined angle from the position at time T=t2, only the blue light beam enters the reflecting surface 513$a$, while the green light beam and the red light beam enter the same reflecting surface 513$b$. At this time, in particular, since the incident angle of the green light beam into the reflecting surface 513$b$ is small, its reflection angle in the rotation direction 512$a$ is the smallest among the three light beams. Accordingly, the blue light beam is reflected at the largest angle in the rotation direction 512$a$, the red light beam is reflected at a slightly smaller angle than the blue light beam, and the green light beam is reflected at a still smaller angle than the red light beam. Therefore, the light beams of the respective colors form images of the light emitting portions 506R, 506G and 506B at different positions on the image display panel 504 as indicated by the figure. In other words, the region illuminated by the blue light, the region illuminated by the red light and the region illuminated by the green light are formed on the image display panel 504 in this order from the right.

At time T=t4 (see FIG. 20D), which is the time the rotating polygon mirror 512 has been further rotated by a predetermined angle from the position at time T=t3, the light beams of red, green and blue enter the same reflecting surface 513$b$. At this time, the positional relationship is the same as that at time T=t1 (see FIG. 20A), and the state of the image display panel 504 illuminated by the light beams of these colors also is the same.

At time T=t5 (see FIG. 20E), which is the time the rotating polygon mirror 512 has been further rotated by a predetermined angle, the blue light beam and the green light beam enter the same reflecting surface 513$b$, while the red light beam enters a reflecting surface 513$c$ that has just arrived at this entering position. At this time, the positional relationship is the same as that at time T=t2 (see FIG. 20B), and the state of the image display panel 504 illuminated by the light beams of these colors also is the same.

At time T=t6 (see FIG. 20F), which is the time the rotating polygon mirror 512 has been further rotated by a predetermined angle, the blue light beam enters the reflecting surface 513$b$, while the green light beam and the red light beam enter the same reflecting surface 513$c$. At this time, the positional relationship is the same as that at time T=t3 (see FIG. 20C), and the state of the image display panel 504 illuminated by the light beams of these colors also is the same.

As described above, the belt-like regions illuminated by the light beams of red, green and blue that are formed on the image display panel 504 move sequentially in the scanning direction 504$a$. Although FIGS. 20A to 20F showed only the specific points in time (time T=t1 to t6) in the above description, because of a continuous rotation of the rotating polygon mirror 512, each of the regions illuminated by the light beams of the individual colors moves (is scanned) on the image display panel 504 continuously rightward (in the scanning direction 504$a$). When the region illuminated by the light beam reaches the right end, it returns to the left end and moves rightward again. At this time, since the chief rays of adjacent light beams enter the rotating polygon mirror 512 while keeping a space corresponding to the angle of about $\theta_P/3$ from each other with respect to the rotation axis of the rotating polygon mirror 512 as described above, the chief rays of these colors meet an edge between the reflecting surfaces 513 (a border of adjacent reflecting surfaces) of the rotating polygon mirror 512 at an even time interval. Thus, the times t1 to t6 described above are switched continuously at an even time interval, thereby allowing an illumination with enhanced color uniformity and brightness uniformity and reduced flicker.

Furthermore, among the chief rays of the light beams of the respective colors entering the reflecting surface 513 of the rotating polygon mirror 512 from the focusing system 502, the angle that the red chief ray 103R forms with the green chief ray 103G and the angle that the green chief ray 103G forms with the blue chief ray 103B are both designed to be about $2\times\theta_P/3$. Accordingly, throughout the times t1 to t6, the chief rays of these colors enter the scanning optical system 503 at different angles from each other, and the difference in their incident angles always is about $2\times\theta_P/3$. Therefore, the chief rays of these colors enter the image display panel 504 at the interval trisecting the scanning direction, and illuminate the image display panel 504.

The image display panel 504 has the same configuration as the image display panel 204 shown in FIG. 5. In other words, the image display panel 504 includes a transmission-type liquid crystal panel 516, an entrance-side polarizing plate 517 provided as a polarizer on the entrance side and an exit-side polarizing plate 518 provided as an analyzer on the exit side. Since the operation of the image display panel 504 is the same as that of the image display panel 204 shown in FIG. 5, the detailed description thereof is omitted here.

With the use of the image display panel 504 configured as above, an image is formed by driving each pixel of the liquid crystal panel 516 by a signal corresponding to the color of illuminating light and modulating the light at every pixel. The light transmitted by the image display panel 504 reaches an observer. Since the scannings of the light beams of the individual colors shown in FIGS. 20A to 20F are carried out at a high speed (it is preferable that one unit encompassing FIGS. 20A to 20F is carried out at least once within one field period), images of individual colors are synthesized so as to be perceived by a retina of the observer as a color image that does not appear separately.

With the above configuration, it becomes possible to display a color image even when using an image display panel that is not provided with a color selection member such as a color filter. In addition, since each pixel of the image display panel 504 displays the image according to the color of light illuminating this pixel, resolution is not deteriorated. Furthermore, since the light from the light source portion 501 always is led to the image display panel 504 effectively, it is possible to achieve a high efficiency of light utilization.

Moreover, as described in Embodiment 1-(1), since the light beams of respective colors are scanned also in Embodiment 4 by using the rotating polygon mirror 512, which is a polygonal mirror, it is possible to reduce the cross-section of an effective light beam entering the reflecting surface 513, so that the reflecting surface 513 can be made smaller. Accordingly, it becomes possible to reduce the size of the rotating polygon mirror 512, allowing a smaller motor for rotating this rotating polygon mirror. As a result, it becomes possible to reduce the size, weight and cost of the entire apparatus.

Although a transmission-type liquid crystal system display device is used as the image display panel 504 in Embodiment 4, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 503, in particular) in accordance with the display device to be used.

Although the embodiment shown in FIG. 16 has a configuration in which all the light beams from the light source portion 501 always enter the reflecting surface 513 of the rotating polygon mirror 512 obliquely, a similar function also can be achieved by a configuration in which the central light beam out of the three light beams entering the rotating polygon mirror from the light source portion enters the rotating polygon mirror so that its chief ray crosses the rotation axis of the rotating polygon mirror obliquely as in FIGS. 6A and 6B described in Embodiment 1-(2). In this configuration, the height of the optical system (the dimension in a direction substantially parallel with the rotation axis of the rotating polygon mirror) becomes larger than that of the configuration shown in FIG. 16. However, since a projecting area of the entire apparatus in this direction becomes smaller, there may be some advantages for the miniaturization of the entire apparatus. In terms of performance, since the distance from the second focusing lenses 511R, 511G and 511B to the reflecting surface 513 of the rotating polygon mirror 512 varies depending on the respective light beams in the configuration of FIG. 16, the size of the spots formed on the reflecting surface 513 also varies depending on these light beams. In the configuration of Embodiment 1-(2), on the other hand, since the difference in the optical paths of the respective light beams can be suppressed to a small amount, it is possible to minimize the difference in size of the spots formed on the reflecting surface 513, thus maintaining a high focusing efficiency.

Also in Embodiment 4, a projection optical system may be placed at a position to take in the light that has left the image display panel 504 as in Embodiment 1-(4), thus making it possible to constitute a projection-type image display apparatus for magnifying and projecting the image on the image display panel 504 so as to display large-screen images.

Embodiment 5

Figure 21:
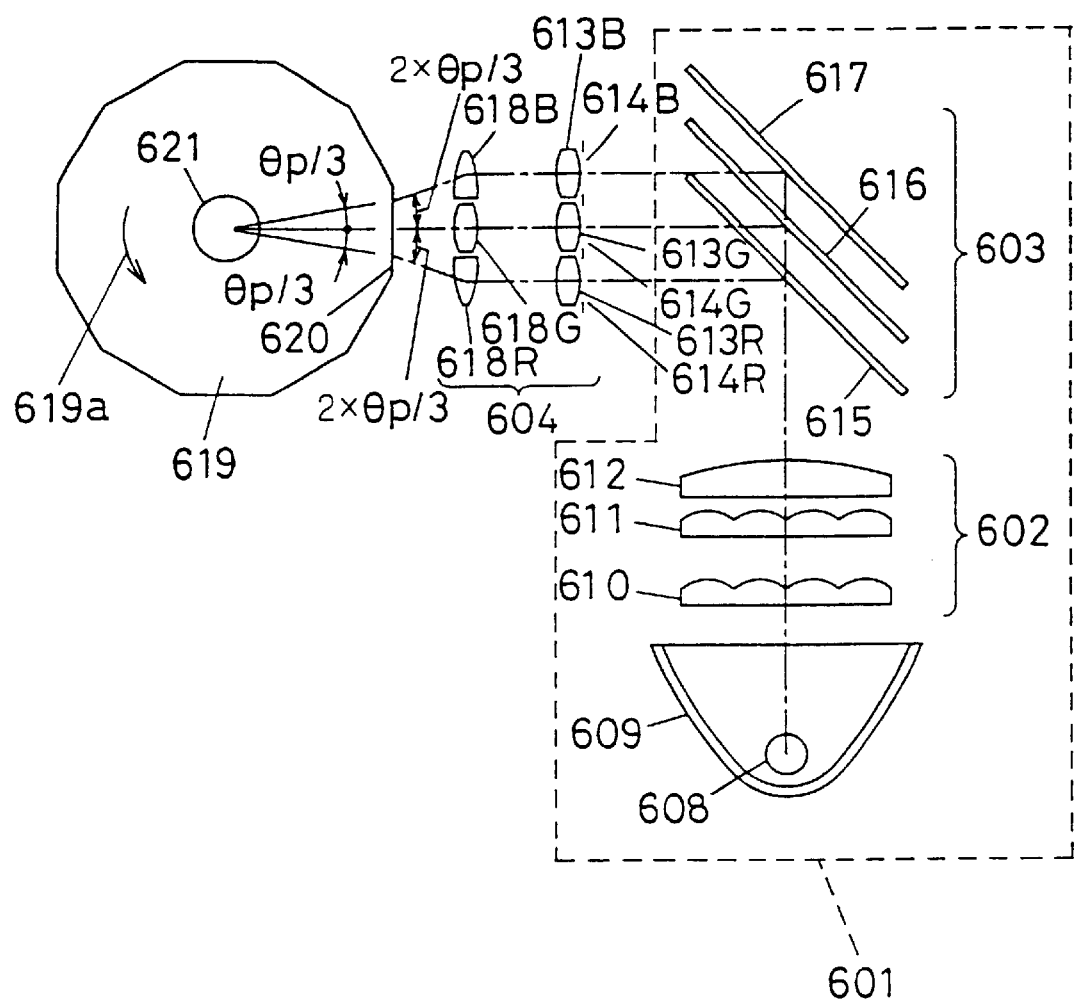
FIG. 21 is a plan view showing a configuration from a light source to a rotating polygon mirror of a color image display device according to Embodiment 5 of the present invention.
Figure 22:
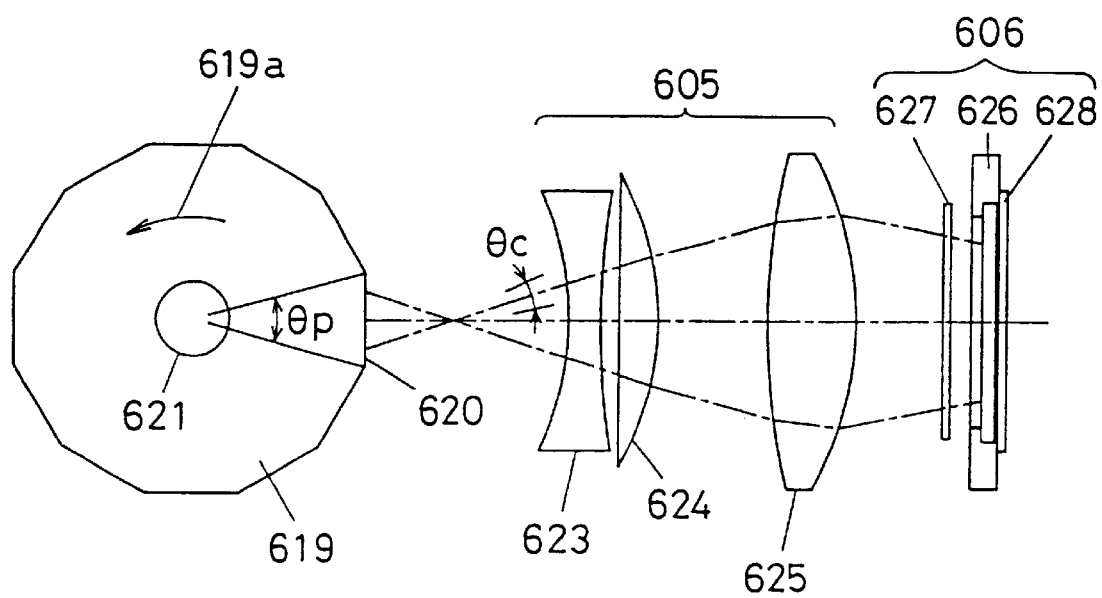
FIG. 22 is a plan view showing a configuration from the rotating polygon mirror to an image display panel of the color image display device according to Embodiment 5 of the present invention.
Figure 23:
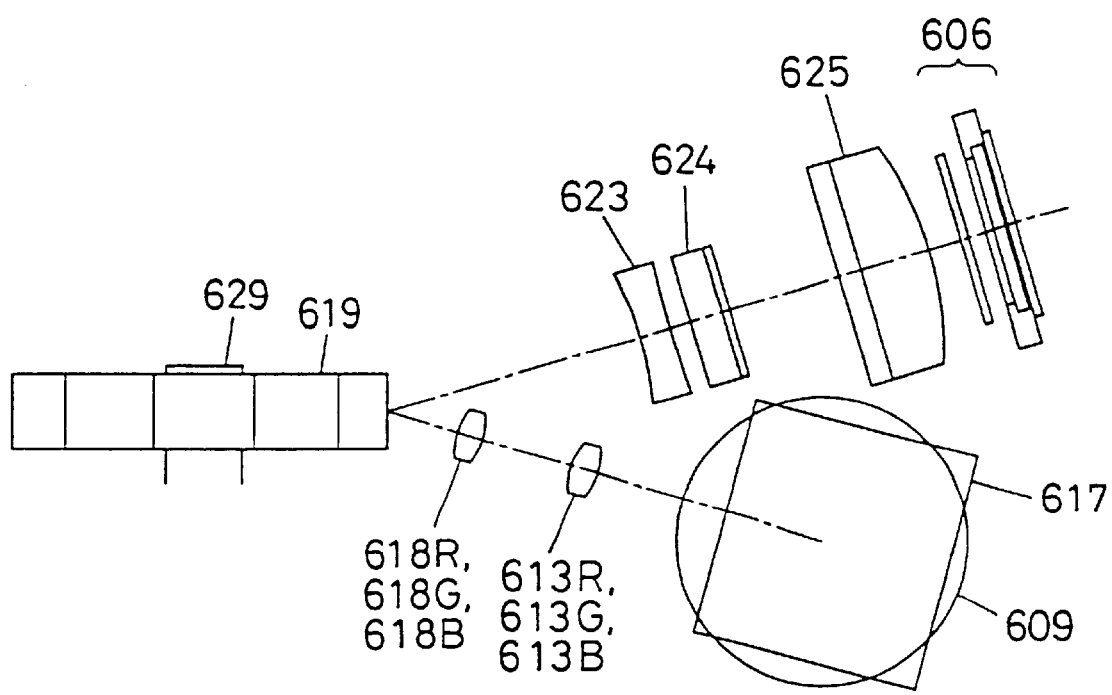
FIG. 23 is a side view seen in a direction facing an emitted light from the light source of the color image display device according to Embodiment 5 of the present invention.
Figure 24A:
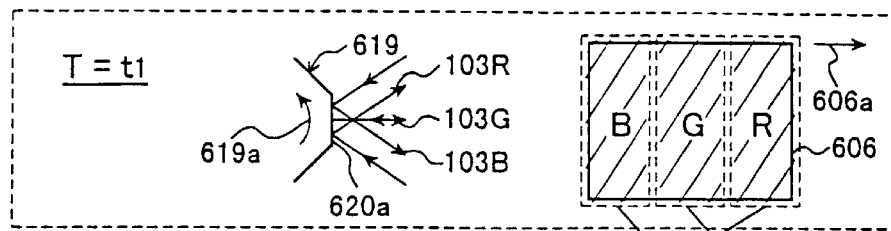
FIGS. 24A to 24F are drawings showing how light reflected by the rotating polygon mirror changes and how light beams of individual colors illuminating the image display panel are scanned in the color image display device shown in FIGS. 21 to 23.
Figure 24B:
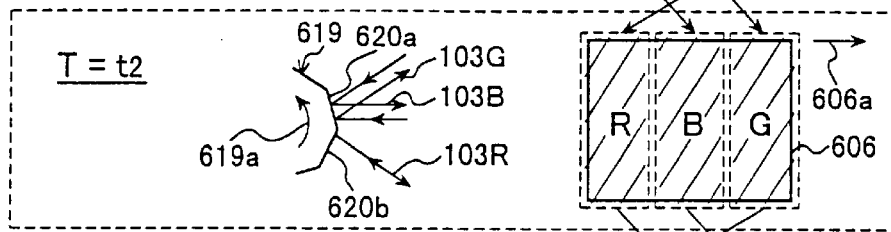
Figure 24C:
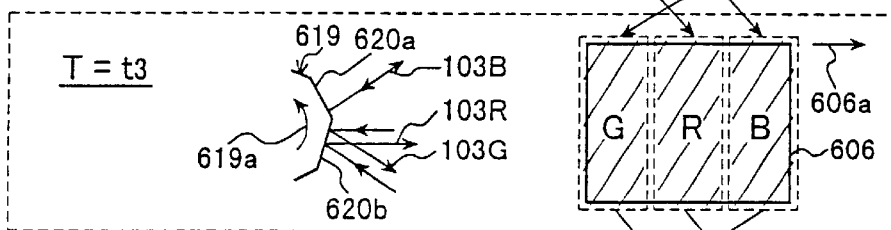
Figure 24D:
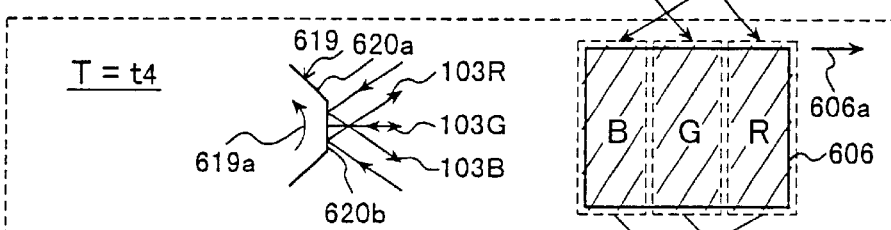
Figure 24E:
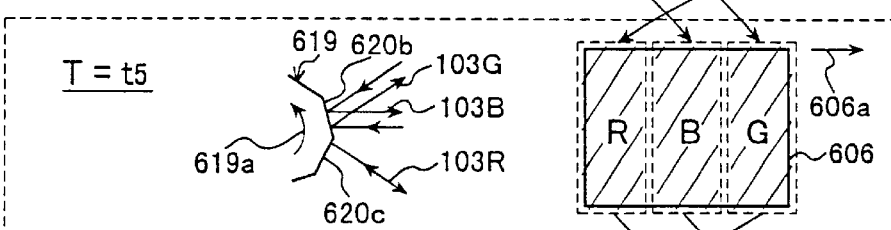
Figure 24F:
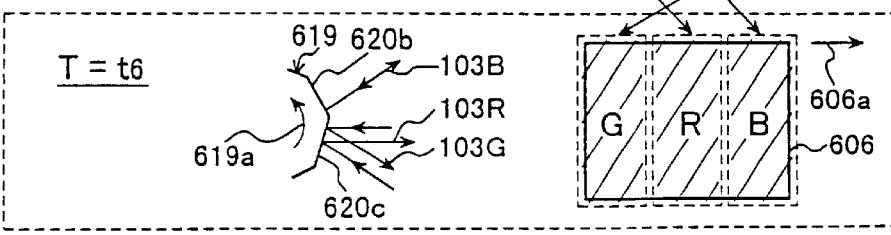

FIGS. 21, 22 and 23 show a schematic configuration of a color image display device of Embodiment 5, with FIG. 21 being a plan view showing the configuration from a light source to a rotating polygon mirror, FIG. 22 being a plan view showing the configuration from the rotating polygon mirror to an image display panel, and FIG. 23 being a side view seen in a direction facing an emitted light from the light source.

The color image display device of Embodiment 5 includes a light source portion 601, a focusing system (a first optical system) 604, a rotating polygon mirror 619, a scanning optical system (a second optical system) 605, an image display panel 606 and an image display panel driving circuit, which is not shown in this figure.

The light source portion 601 is provided with a light source 608 for forming an arc by a discharge between electrodes, generating a white light beam and emitting it and a reflector 609 for reflecting the light beam from the light source 608 toward one side on an axis of rotational symmetry thereof. The light source portion 601 further includes an integrator optical system 602 and a color separation optical system 603, and the light beam from the light source 608 passes through the integrator optical system 602 and the color separation optical system 603 sequentially and enters the focusing system 604.

The integrator optical system 602 includes a first lens array 610, which is a group of identically-shaped microlenses provided with a rectangular effective aperture portion, a second lens array 611, which is a group of microlenses provided with a rectangular effective aperture portion that is the same as that in the first lens array 610, and an integrator focusing lens 612, which is a single convex lens arranged near the exit side of the second lens array 611. The integrator focusing lens 612 superimposes images of the microlenses of the first lens array 610 onto a first focusing lens on a red optical path 613R, a first focusing lens on a green optical path 613G and a first focusing lens on a blue optical path 613B in the focusing system 604 via the color separation optical system 603, performing a rectangular illumination uniformly. At this time, the rectangular images formed by the light beams of the respective colors have sizes slightly different from each other because of an optical path difference in each color generated in the color separation optical system 603. Thus, the entrance sides of the first focusing lens on the red optical path 613R, the first focusing lens on the green optical path 613G and the first focusing lens on the blue optical path 613B are provided with aperture stops 614R, 614G and 614B having identical aperture shapes.

The color separation optical system 603 includes a red-reflecting dichroic mirror 615, a green-reflecting dichroic mirror 616 and a total reflection mirror 617 that are arranged in this order obliquely with respect to the incident light. The light with wavelengths corresponding to red among the white incident light is reflected by the red-reflecting dichroic mirror 615 and led to the first focusing lens on the red optical path 613R. The light with wavelengths corresponding to green among the white incident light is transmitted by the red-reflecting dichroic mirror 615, reflected by the green-reflecting dichroic mirror 616, transmitted by the red-reflecting dichroic mirror 615 again, and then led to the first focusing lens on the green optical path 613G. The light with wavelengths corresponding to blue among the white incident light is transmitted by the red-reflecting dichroic mirror 615 and the green-reflecting dichroic mirror 616, reflected by the total reflection mirror 617, transmitted by the green-reflecting dichroic mirror 616 and the red-reflecting dichroic mirror 615 again, and then led to the first focusing lens on the blue optical path 613B. At this time, although the cost may increase, a blue-reflecting dichroic mirror can be used instead of the total reflection mirror 617, thus making it easier to remove unwanted light between green and red lights.

The first focusing lens on the red optical path 613R, the first focusing lens on the green optical path 613G and the first focusing lens on the blue optical path 613B in the focusing system 604 form images of the second lens array 611 on a reflecting surface 620 of the rotating polygon mirror 619 via the second focusing lenses 618R, 618G and 618B provided for the respective colors. This makes it possible to form a small light source image on the reflecting surface 620, thus contributing to the miniaturization of the entire apparatus. However, when the size of the apparatus is not a priority, it also may be possible to adopt a configuration in which the image of the second lens array 611 is not formed on the reflecting surface 620 of the rotating polygon mirror 619 but formed on the second focusing lenses 618R, 618G and 618B provided for the respective colors. In this case, if the space between the reflecting surface 620 of the rotating polygon mirror 619 and the second focusing lenses 618R, 618G and 618B provided for these colors is reduced, even this configuration can achieve a miniaturization to a certain extent.

The second focusing lenses 618R, 618G and 618B provided for the respective colors form rectangular illuminated images, which have been formed on the first focusing lens on the red optical path 613R, the first focusing lens on the green optical path 613G and the first focusing lens on the blue optical path 613B in the focusing system 604, on the image display panel 606 via the scanning optical system (the second optical system) 605. This forms the rectangular illuminated regions by the light beams of the respective colors on the image display panel 606. These rectangular illuminated regions have a belt-like shape with a size obtained by trisecting substantially the effective aperture region of the image display panel 606 in the scanning direction, as described in FIG. 17.

As shown in FIG. 22, the scanning optical system 605 has at least an incident light effective portion corresponding to a scanning range of the light reflected by the reflecting surface 620 of the rotating polygon mirror 619. The scanning optical system 605 is configured such that a height of an image forming position is determined in proportion to an incident angle of the light beam entering this optical system. More specifically, when the angle at the rotation axis subtended by the width of one reflecting surface 620 of the rotating polygon mirror 619 along a rotation direction 619a (a central angle) is expressed by $\theta_P$ ($\theta_P=2\pi/n$, where n is the number of the reflecting surfaces 620 provided in the rotating polygon mirror 619), the scanning optical system 605 is configured such that the light beam that has entered the scanning optical system 605 at the incident angle $\theta_P$ is focused at an end portion along the scanning direction (the portion in which the height of the light beam is greatest) of the effective aperture region of the image display panel 606 at the illumination position.

At a given point during the rotation of the rotating polygon mirror 619, as shown in FIG. 19, groups (spots) of red, green and blue lights are formed on one reflecting surface 620 so as to be aligned along the rotation direction 619a such that their chief rays do not overlap each other. When incident positions of the chief rays of the light beams of respective colors are seen from an rotation axis of the rotating polygon mirror 619, the angle subtended by a line segment from the incident position of a red chief ray to that of a green chief ray and the angle subtended by a line segment from the incident position of the green chief ray to that of a blue chief ray are both about $\theta_P/3$ as shown in FIG. 21. The rotating polygon mirror 619 is rotated about a rotation axis 621 by a motor, which is not shown in this figure.

The following is a description of how the light beams of individual colors illuminating the image display panel 606 are scanned, with reference to FIGS. 24A to 24F.

FIGS. 24A to 24F show the rotation of the rotating polygon mirror 619 and an accompanying change in the state of the image display panel 606 illuminated by the light beams of individual colors at a fixed time interval. The illumination states of the image display panel 606 are shown on the right part of the figures, and R, G and B represent regions illuminated by the red light, the green light and the blue light respectively. The rotation of the rotating polygon mirror 619 and reflection states of the light beams of individual colors are shown on the left part of the figures, and 103R, 103G and 103B indicate chief rays of red light, green light and blue light respectively, and arrows indicate the traveling directions of these rays.

At time T=t1 (see FIG. 24A), the light beams of red, green and blue enter the same reflecting surface 620a of the rotating polygon mirror 619. As shown in the figure, the blue light beam is reflected in a direction opposite to the direction in which the reflecting surface 620a moves (the rotation direction 619a), the green light beam is reflected in a front direction of the scanning optical system 605, and the red light beam is reflected in the rotation direction 619a. Thus, the light beams of these colors enter the scanning optical system 605 at different angles from each other. Therefore, the rectangular illuminated images formed on the first focusing lens on the red optical path 613R, the first focusing lens on the green optical path 613G and the first focusing lens on the blue optical path 613B in the focusing system 604 are formed at different positions on the image display panel 606 as indicated by the figure. In other words, the region illuminated by the blue light, the region illuminated by the green light and the region illuminated by the red light are formed on the image display panel 606 in this order from the left.

At time T=t2 (see FIG. 24B), which is the time the rotating polygon mirror 619 has been rotated by a predetermined angle from the position at time T=t1, the blue light beam and the green light beam enter the same reflecting surface 620*a* of the rotating polygon mirror 619, while the red light beam enters a reflecting surface 620*b* that has just arrived at this entering position. At this time, the blue light beam is reflected in the front direction of the scanning optical system 605, the green light beam is reflected in the rotation direction 619*a*, and the red light beam is reflected in the direction opposite to the rotation direction 619*a*. Therefore, the rectangular illuminated images of the first focusing lens on the red optical path 613R, the first focusing lens on the green optical path 613G and the first focusing lens on the blue optical path 613B in the focusing system 604 are formed at different positions on the image display panel 606 as indicated by the figure. In other words, the region illuminated by the red light, the region illuminated by the blue light and the region illuminated by the green light are formed on the image display panel 606 in this order from the left.

At time T=t3 (see FIG. 24C), which is the time the rotating polygon mirror 619 has been further rotated by a predetermined angle from the position at time T=t2, only the blue light beam enters the reflecting surface 620*a*, while the green light beam and the red light beam enter the same reflecting surface 620*b*. At this time, the blue light beam is reflected in the rotation direction 619*a*, the green light beam is reflected in the direction opposite to the rotation direction 619*a*, and the red light beam is reflected in the front direction of the scanning optical system 605. Therefore, the rectangular illuminated images of the first focusing lens on the red optical path 613R, the first focusing lens on the green optical path 613G and the first focusing lens on the blue optical path 613B in the focusing system 604 are formed at different positions on the image display panel 606 as indicated by the figure. In other words, the region illuminated by the green light, the region illuminated by the red light and the region illuminated by the blue light are formed on the image display panel 606 in this order from the left.

At time T=t4 (see FIG. 24D), which is the time the rotating polygon mirror 619 has been further rotated by a predetermined angle from the position at time T=t3, the light beams of red, green and blue enter the same reflecting surface 620*b*. At this time, the positional relationship is the same as that at time T=t1 (see FIG. 24A), and the state of the image display panel 606 illuminated by the light beams of these colors also is the same.

At time T=t5 (see FIG. 24E), which is the time the rotating polygon mirror 619 has been further rotated by a predetermined angle, the blue light beam and the green light beam enter the same reflecting surface 620*b*, while the red light beam enters a reflecting surface 620*c* that has just arrived at this entering position. At this time, the positional relationship is the same as that at time T=t2 (see FIG. 24B), and the state of the image display panel 606 illuminated by the light beams of these colors also is the same.

At time T=t6 (see FIG. 24F), which is the time the rotating polygon mirror 619 has been further rotated by a predetermined angle, the blue light beam enters the reflecting surface 620*b*, while the green light beam and the red light beam enter the same reflecting surface 620*c*. At this time, the positional relationship is the same as that at time T=t3 (see FIG. 24C), and the state of the image display panel 606 illuminated by the light beams of these colors also is the same.

As described above, the belt-like regions illuminated by the light beams of red, green and blue that are formed on the image display panel 606 move sequentially in a scanning direction 606*a*. Although FIGS. 24A to 24F showed only the specific points in time (time T=t1 to t6) in the above description, because of a continuous rotation of the rotating polygon mirror 619, each of the regions illuminated by the light beams of the individual colors moves (is scanned) on the image display panel 606 continuously rightward (in the scanning direction 606*a*). When the region illuminated by the light beam reaches the right end, it returns to the left end and moves rightward again. At this time, since the chief rays of adjacent light beams enter the rotating polygon mirror 619 with keeping a space corresponding to the angle of about $\theta_P/3$ from each other with respect to the rotation axis of the rotating polygon mirror 619 as described above, the chief rays of these colors meet an edge between the reflecting surfaces 620 (a border of adjacent reflecting surfaces) of the rotating polygon mirror 619 at an even time interval. Thus, the times t1 to t6 described above are switched continuously at an even time interval, thereby allowing an illumination with enhanced color uniformity and brightness uniformity and reduced flicker.

Furthermore, among the chief rays of the light beams of the respective colors entering the reflecting surface 620 of the rotating polygon mirror 619 from the focusing system 604, the angle that the red chief ray forms with the green chief ray and the angle that the green chief ray forms with the blue chief ray are both designed to be about $2 \times \theta_P/3$. Accordingly, throughout the times t1 to t6, the chief rays of these colors enter the scanning optical system 605 at different angles from each other, and the difference in their incident angles always is about $2 \times \theta_P/3$. Therefore, the chief rays of these colors enter the image display panel 606 at the interval trisecting the scanning direction, and illuminate the image display panel 606.

At this time, the scanning angle by the rotating polygon mirror is $\pm\theta_P$, and this scanning makes it possible to illuminate the entire effective region of the image display panel 606. The chief rays of the light beams of respective colors trisect the above-mentioned scanning angle ($2 \times \theta_P$). The light beams of these colors are spread to a certain degree from their chief rays, and this diverging angle (which is designed to be the same for each of the light beams) is expressed by $\theta_C$ as shown in FIG. 22. When $2 \times \theta_C < 2 \times \theta_P/3$, an angular gap generated between adjacent light beams forms a gap between the belt-like illuminated regions on the image display panel 606, so that there is no interference between colors, thus achieving a design with priority placed on chromaticity. When $2 \times \theta_C = 2 \times \theta_P/3$, since no angular gap is generated between the adjacent light beams, no gap is formed between the belt-like illuminated regions on the image display panel 606. In this case, the largest illuminated regions can be formed without causing any color mixture. When $2 \times \theta_C > 2 \times \theta_P/3$, since the adjacent light beams angularly overlap each other, an overlapping portion is formed between the belt-like illuminated regions on the image display panel 606. In this case, although the overlapping portion has a reduced chromaticity due to the color mixture, the large illuminated regions can be formed, which is advantageous in terms of an illumination efficiency. Thus, the above-described relationship between $\theta_C$ and $\theta_P$ can be designed optimally according to the marketability of apparatus and the conditions of a light source and an area of the illuminated regions. It is needless to say that this relationship applies not only to Embodiment 5 but also to other embodiments.

As shown in FIG. 22, the scanning optical system 605 is constituted by, for example, scanning lenses 623, 624 and 625 having an aperture elongated in the scanning direction. In some of these scanning lenses 623, 624 and 625, the radius of curvature R is different between the scanning direction and the direction orthogonal thereto. In this manner, the optical system that determines the height of the image forming position according to the incident angle of the light from the reflecting surface 620 of the rotating polygon mirror 619 is provided with respect to the scanning direction, whereas the optical system that magnifies the rectangular illuminated images formed on the first focusing lens on the red optical path 613R, the first focusing lens on the green optical path 613G and the first focusing lens on the blue optical path 613B in the focusing system 604 so as to substantially correspond to the height dimension of the image display panel 606 and projects them onto the image display panel 606 via the second focusing lenses 618R, 618G and 618B provided for the respective colors is provided with respect to the direction orthogonal to the scanning direction.

The image display panel 606 has the same configuration as the image display panel 204 shown in FIG. 5. In other words, the image display panel 606 includes a transmission-type liquid crystal panel 626, an entrance-side polarizing plate 627 provided as a polarizer on the entrance side and an exit-side polarizing plate 628 provided as an analyzer on the exit side. Since the operation of the image display panel 606 is the same as that of the image display panel 204 shown in FIG. 5, the detailed description thereof is omitted here.

With the above configuration, it becomes possible to display a color image by using an image display panel that is not provided with a color selection member such as a color filter, even when using a discharge-tube-type light source such as a metal halide lamp or a high-pressure mercury lamp emitting white light. In addition, since each pixel of the image display panel 606 displays the image according to the color of light illuminating this pixel, resolution is not deteriorated. Furthermore, since the light from the light source 608 always is led to the image display panel 606 effectively, it is possible to achieve a high efficiency of light utilization.

Moreover, when the discharge-tube-type light source is used, a light beam having a distribution in which the center is bright and the periphery is dark is emitted from the reflector. Accordingly, when this light source is used in the optical system of Embodiment 4, the periphery becomes darker than the center in the direction orthogonal to the scanning direction of the image display panel. In the present embodiment, on the other hand, an image having uniform brightness is formed using the integrator optical system 602 and then projected, so it is possible to produce an excellent image without any brightness decrease in the periphery even in the direction orthogonal to the scanning direction of the image display panel 606.

As described in Embodiment 1-(1), since the light beams of respective colors are scanned also in Embodiment 5 by using the rotating polygon mirror 619, which is a polygonal mirror, it is possible to reduce the cross-section of an effective light beam entering the reflecting surface 620, so that the reflecting surface 620 can be made smaller. Accordingly, it becomes possible to reduce the size of the rotating polygon mirror 619, allowing a smaller motor for rotating this rotating polygon mirror. As a result, it becomes possible to reduce the size, weight and cost of the entire apparatus.

Although a transmission-type liquid crystal system display device is used as the image display panel 606 in Embodiment 5, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 605, in particular) in accordance with the display device to be used.

In Embodiment 5, the relationship between the rotating polygon mirror and the incident light also may be arranged similarly to that of FIG. 16 in Embodiment 4. This makes it possible to suppress the height of the optical system (the dimension of the rotating polygon mirror in the rotation axis direction). However, compared with the arrangement shown in FIGS. 21 to 23 in Embodiment 5, since all the light in this arrangement enters the rotating polygon mirror 619 obliquely with respect to the scanning direction, the space between the second focusing lenses 618R, 618G and 618B provided for the respective colors and the rotating polygon mirror 619 is expanded, thus increasing the size of the reflecting surface 620 of the rotating polygon mirror 619, leading to an increase in the size of the entire apparatus. Therefore, it is preferable that the optical system is configured considering the shape and dimension of the entire apparatus.

In Embodiment 5, it is clear that the color arrangement when the white light is separated according to colors can be changed by changing the configuration of the color separation optical system 603. Also, it is needless to say that the configuration of the color separation optical system 603 can be changed into other configurations as long as they can separate an optical path of the white light according to colors.

Although the scanning direction of the illuminating light on the image display panel 606 is the horizontal direction in the above example, it is needless to say that the scanning direction can be changed into the vertical direction by changing the arrangement design of the image display panel 606 and the illuminating optical system. At this time, the method for driving the image display panel 606 is designed optimally according to the scanning direction.

Figure 25:
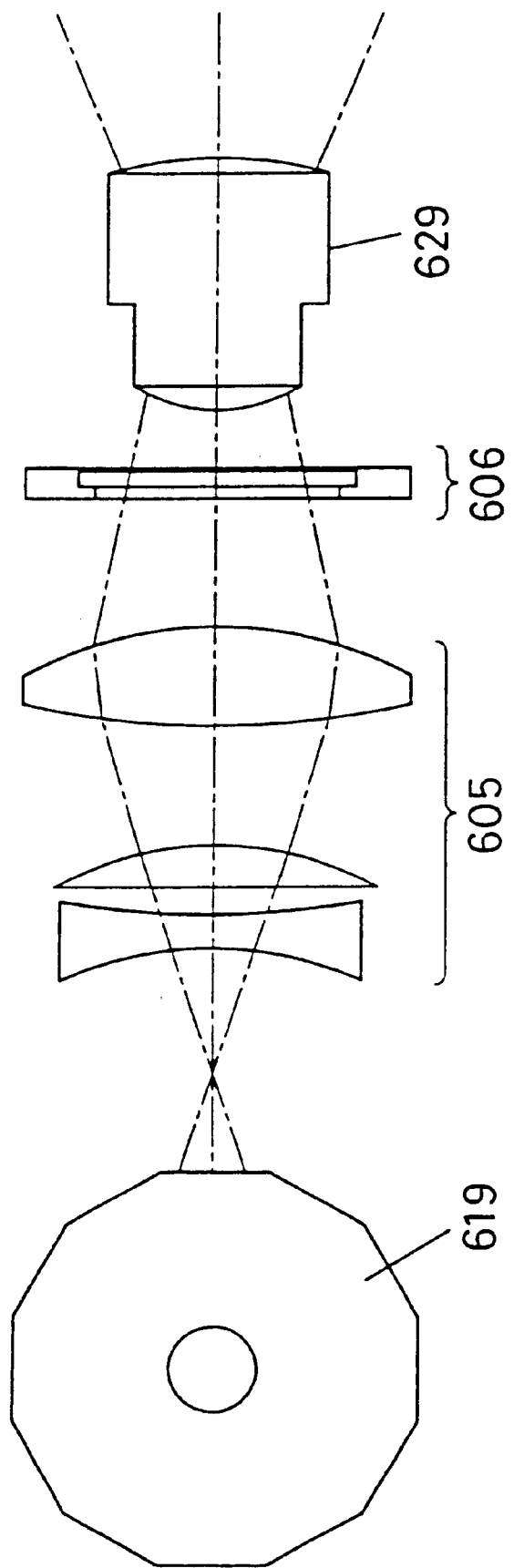
FIG. 25 is a schematic view showing a configuration of a projection-type image display apparatus using the color image display device shown in FIGS. 21 to 23.

Furthermore, as shown in FIG. 25, by providing the configuration of Embodiment 5 in an image display portion and providing a projection lens 629 such that the image on the image display panel 606 can be magnified and projected onto a screen, which is not shown in this figure, it is possible to provide a projection-type image display apparatus. The image display panel 606 here does not necessarily have the transmission-type liquid crystal system described in Embodiment 5 but may have a display device with above-mentioned other systems. In such cases, it is needless to say that the characteristics and arrangement of the projection lens 629 can be changed and designed optimally according to the display device by applying known technologies.

Embodiment 6

Figure 26:
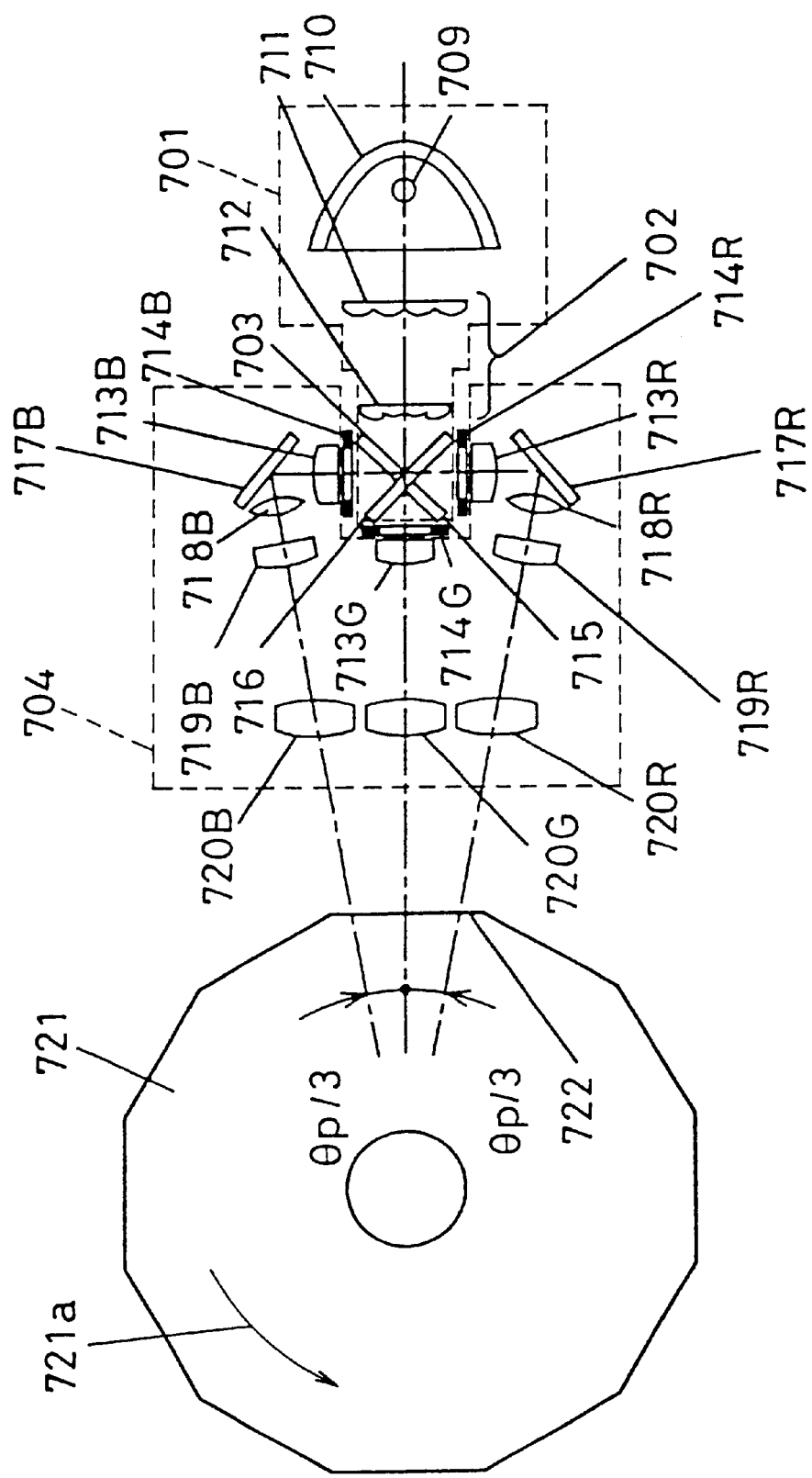
FIG. 26 is a plan view showing a configuration from a light source to a rotating polygon mirror of a projection-type image display apparatus according to Embodiment 6 of the present invention.
Figure 27:
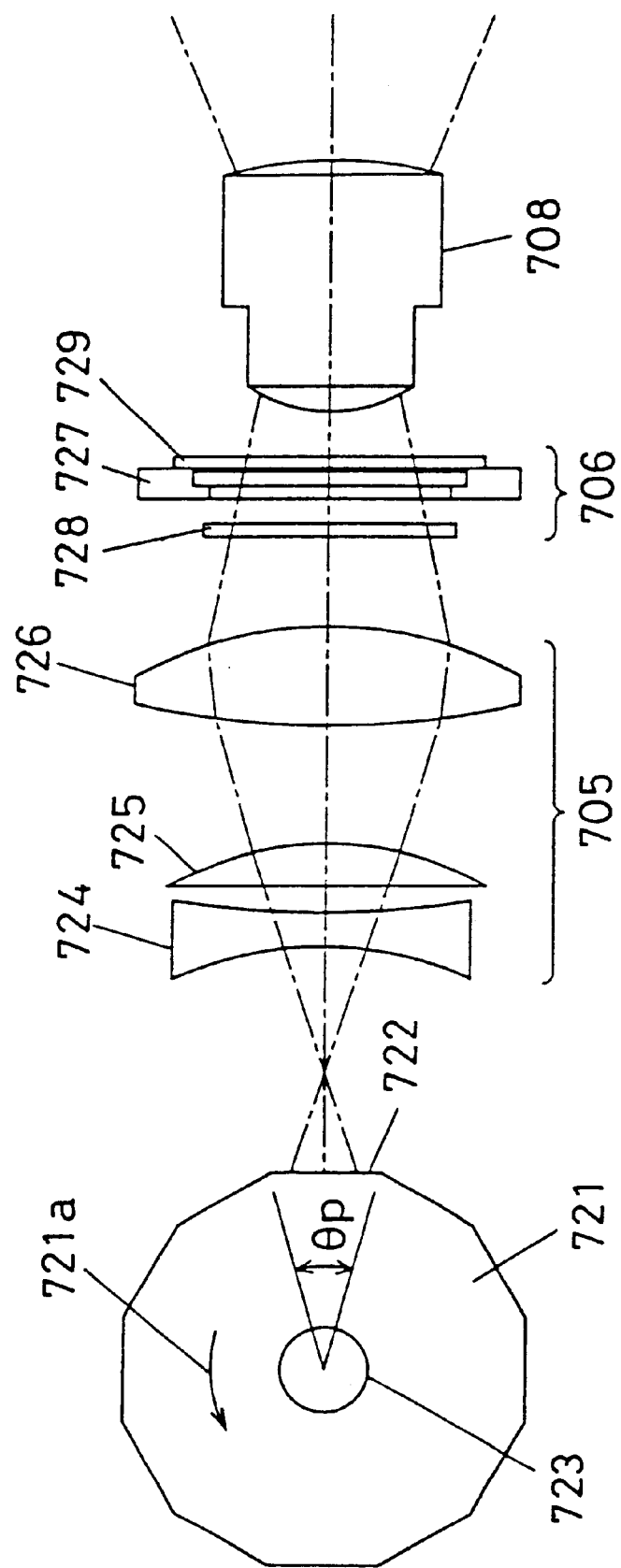
FIG. 27 is a plan view showing a configuration from the rotating polygon mirror to a projection lens of the projection-type image display apparatus according to Embodiment 6 of the present invention.
Figure 28:
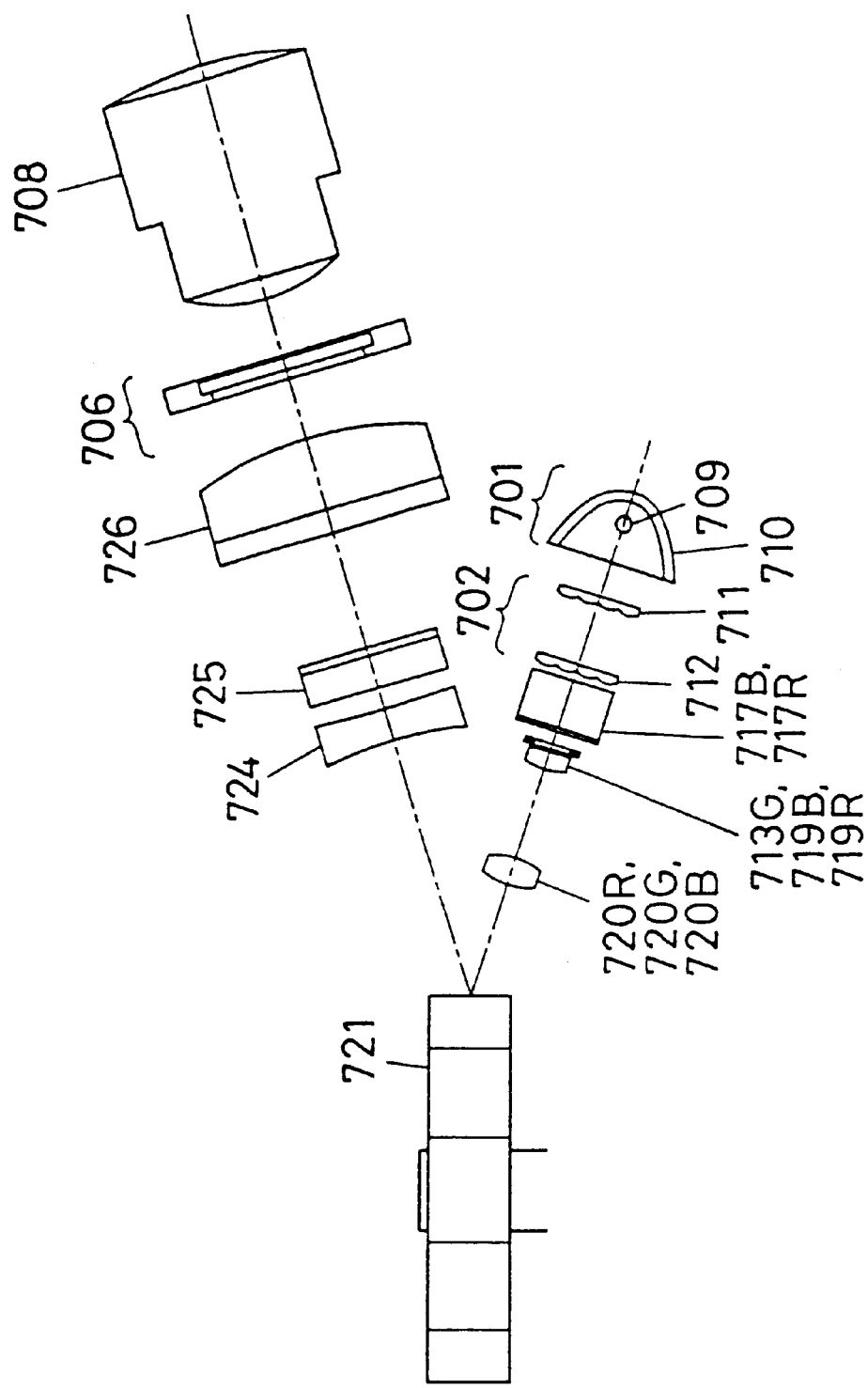
FIG. 28 is a side view showing the projection-type image display apparatus according to Embodiment 6 of the present invention.

FIGS. 26, 27 and 28 show a schematic configuration of a projection-type image display apparatus of Embodiment 6, with FIG. 26 being a plan view showing the configuration from a light source to a rotating polygon mirror, FIG. 27 being a plan view showing the configuration from the rotating polygon mirror to a projection lens, and FIG. 28 being a side view thereof The projection-type image display apparatus of Embodiment 6 includes a light source portion 701, a focusing system (a first optical system) 704, a rotating polygon mirror 721, a scanning optical system (a second optical system) 705, an image display panel 706, an image display panel driving circuit, which is not shown in this figure, and a projection lens 708.

The light source portion 701 is provided with a light source 709 for forming an arc by a discharge between electrodes, generating a white light beam and emitting it and a reflector 710 for reflecting the light beam from the light source 709 toward one side on an axis of rotational symmetry thereof. The light source portion 701 further includes an integrator optical system 702 and a color separation optical system 703.

The light beam from the light source portion 701 enters the integrator optical system 702. The integrator optical system 702 includes a first lens array 711, which is a group of identically-shaped microlenses provided with a rectangular effective aperture portion, and a second lens array 712, which is a group of microlenses corresponding to the microlenses of the first lens array 711 on a one-to-one basis. Each of the microlenses constituting the second lens array 712 has an aperture that matches the size of a light source image formed on the second lens array 712 by the microlenses of the first lens array 711. Furthermore, the positions of the center of curvature of the microlenses constituting the second lens array 712 are designed such that the rectangular aperture shapes of the microlenses of the first lens array 711 are superimposed on first focusing lenses 713R, 713G and 713B provided for the respective colors in the focusing system 704 via the color separation optical system 703, performing a rectangular illumination uniformly. Since excess light that cannot be focused during the formation of the rectangular images on the respective optical paths leaks out to the periphery so as to cause a deterioration in image quality, the entrance sides of the first focusing lenses 713R, 713G and 713B provided for the respective colors are provided with aperture stops 714R, 714G and 714B having identical aperture shapes.

The color separation optical system 703 includes a red-reflecting dichroic mirror 715 and a blue-reflecting dichroic mirror 716 that are crossed, and is arranged such that incident light enters these mirrors 715 and 716 obliquely. The light with wavelengths corresponding to red among the white incident light is reflected by the red-reflecting dichroic mirror 715 and led to the first focusing lens on the red optical path 713R. The light with wavelengths corresponding to green among the white incident light is transmitted by the red-reflecting dichroic mirror 715 and the blue-reflecting dichroic mirror 716, and then led to the first focusing lens on the green optical path 713G. The light with wavelengths corresponding to blue among the white incident light is reflected by the blue-reflecting dichroic mirror 716 and then led to the first focusing lens on the blue optical path 713B. The red light that has left the first focusing lens on the red optical path 713R and the blue light that has left the first focusing lens on the blue optical path 713B are reflected by total reflection mirrors 717R and 717B, focused onto intermediate relay lenses 718R and 718B respectively and then both form the images of the second lens array 712. The intermediate relay lenses 718R and 718B are provided so as to form the rectangular illuminated images of the first focusing lens on the red optical path 713R and the first focusing lens on the blue optical path 713B on emitting relay lenses 719R and 719B.

The emitting relay lenses 719R and 719B form the images of the second lens array 712, which have been formed on the intermediate relay lenses 718R and 718B, on a reflecting surface 722 of the rotating polygon mirror 721 via the second focusing lenses 720R and 720B provided for the respective colors. The first focusing lens on the green optical path 713G forms the image of the second lens array 712 on the reflecting surface 722 of the rotating polygon mirror 721 via the second focusing lens for the green light 720G. This makes it possible to form a small light source image on the reflecting surface 722, thus contributing to the miniaturization of the entire apparatus. However, when the size of the apparatus is not a priority, it also may be possible to adopt a configuration in which the image of the second lens array 712 is not formed on the reflecting surface 722 of the rotating polygon mirror 721 but formed on the second focusing lenses 720R, 720G and 720B provided for the respective colors. In this case, if the space between the reflecting surface 722 of the rotating polygon mirror 721 and the second focusing lenses 720R, 720G and 720B provided for these colors is reduced, even this configuration can achieve a miniaturization to a certain extent.

The second focusing lenses 720R, 720G and 720B provided for the respective colors form rectangular illuminated images, which have been formed on the first focusing lens for the green light 713G and the emitting relay lenses 719R and 719B in the focusing system 704, on the image display panel 706 via the scanning optical system (the second optical system) 705. This forms the rectangular illuminated regions by the light beams of the respective colors on the image display panel 706. These rectangular illuminated regions have a belt-like shape with a size obtained by trisecting substantially the effective aperture region of the image display panel 706 in the scanning direction, as described in FIG. 17.

As shown in FIG. 27, the scanning optical system 705 has at least an incident light effective portion corresponding to a scanning range of the light reflected by the reflecting surface 722 of the rotating polygon mirror 721. The scanning optical system 705 is configured such that a height of an image forming position is determined in proportion to an incident angle of the light beam entering this optical system. More specifically, when the angle at the rotation axis subtended by the width of one reflecting surface 722 of the rotating polygon mirror 721 along a rotation direction 721a (a central angle) is expressed by $\theta_P$ ($\theta_P = 2\pi/n$, where n is the number of the reflecting surfaces 722 provided in the rotating polygon mirror 721), the scanning optical system 705 is configured such that the light beam that has entered the scanning optical system 705 at the incident angle $\theta_P$ is focused at an end portion along the scanning direction (the portion in which the height of the light beam is greatest) of the effective aperture region of the image display panel 706 at the illumination position.

At a given point during the rotation of the rotating polygon mirror 721, groups (spots) of red, green and blue lights are formed on one reflecting surface 722 so as to be aligned in the rotation direction 721a such that their chief rays do not overlap each other, as shown in FIG. 19. When incident positions of the chief rays of the light beams of respective colors are seen from an rotation axis of the rotating polygon mirror 722, the angle subtended by a line segment from the incident position of a red chief ray to that of a green chief ray and the angle subtended by a line segment from the incident position of the green chief ray to that of a blue chief ray are both about $\theta_P/3$ as shown in FIG. 26.

Figure 29:
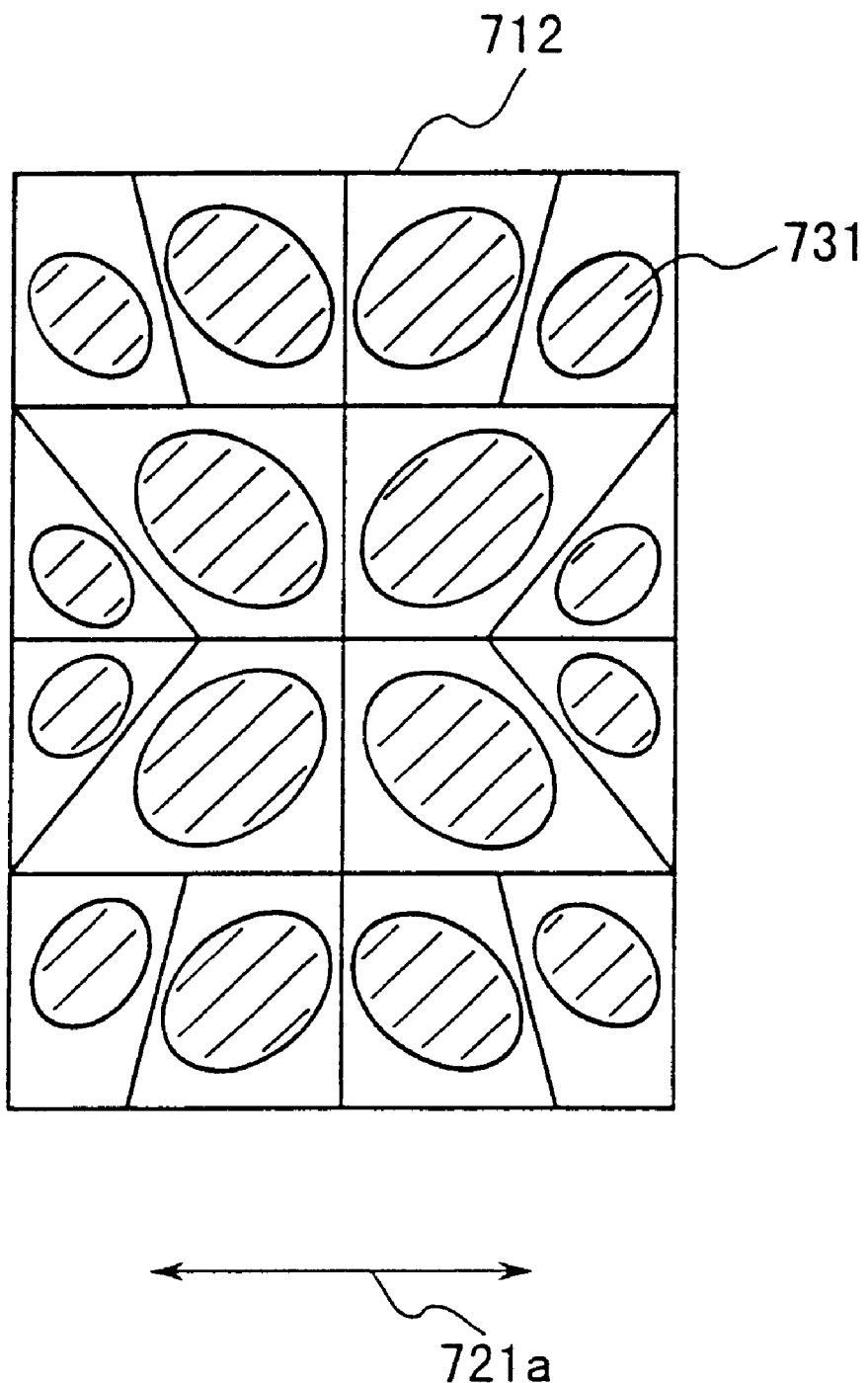
FIG. 29 is a front view showing a second lens array used in the projection-type image display apparatus shown in FIGS. 26 to 28.
Figure 30:
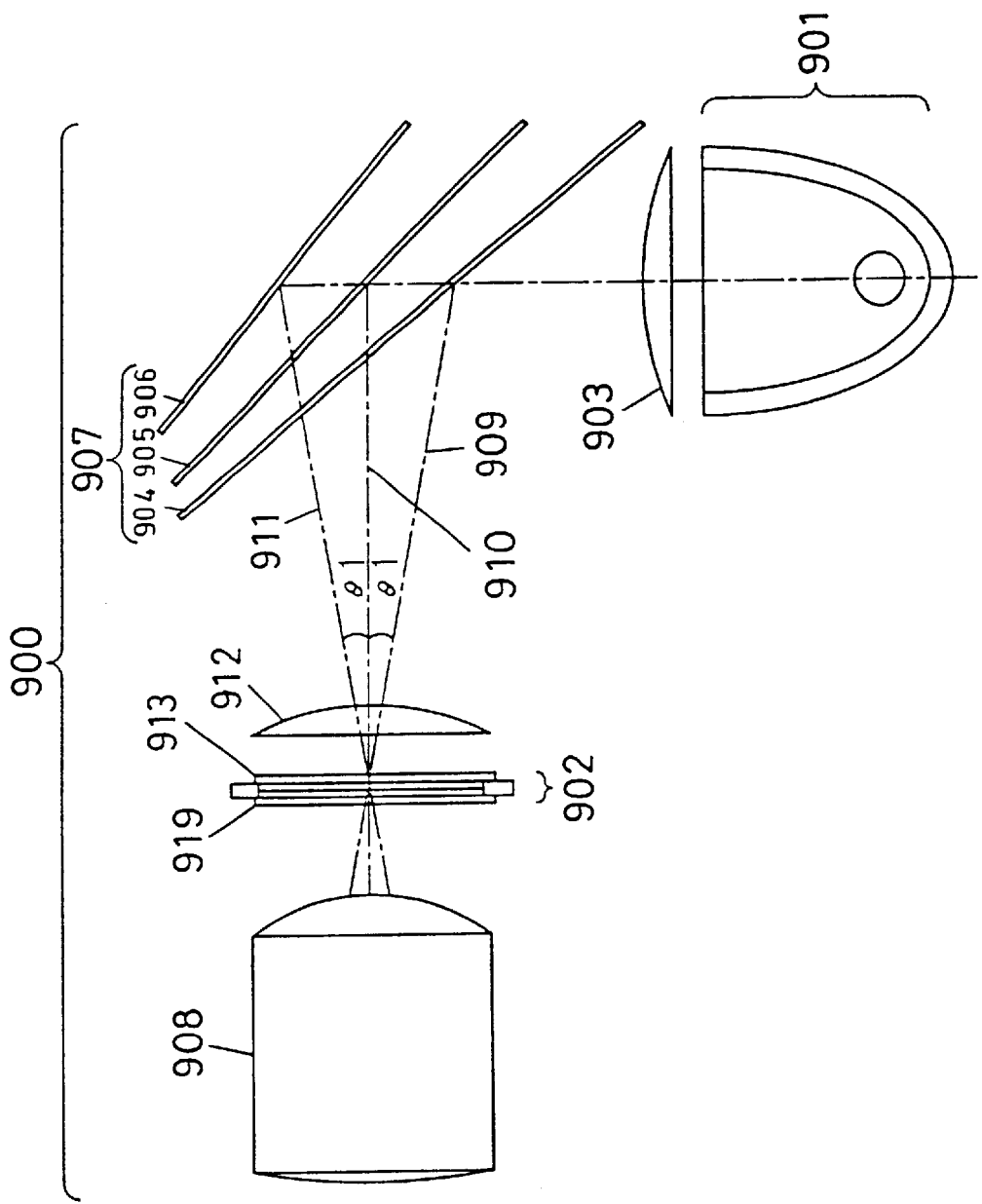
FIG. 30 is a schematic view showing a configuration of a conventional single-plate projection-type image display apparatus using dichroic mirrors and a microlens array.
Figure 31:
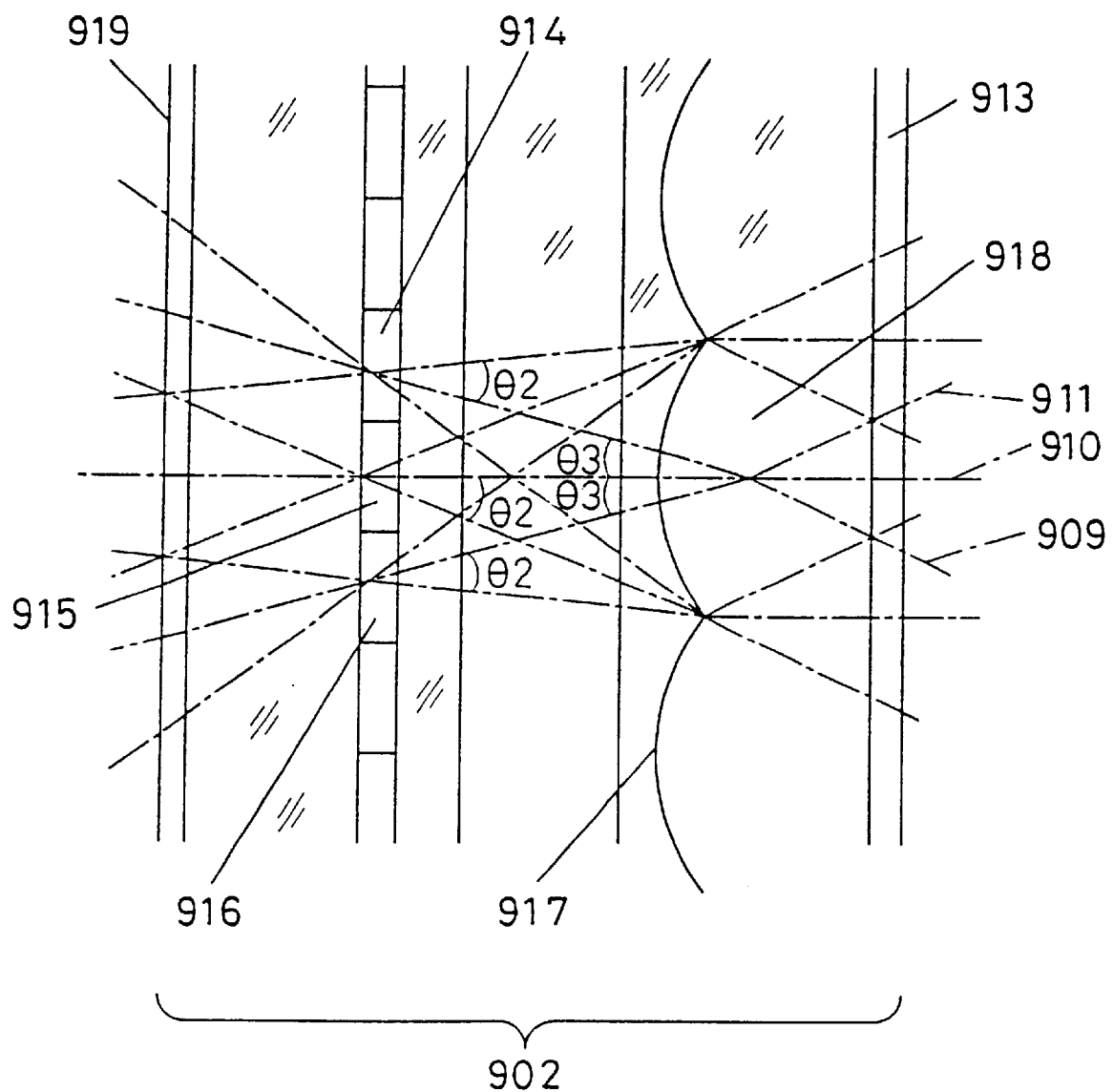
FIG. 31 is a sectional view showing a detail of a light valve used in the image display apparatus shown in FIG. 30.

The size of the rotating polygon mirror 721 is determined by a scanning angle ($2\times\theta_P$) and the size of one reflecting surface 722. This scanning angle is determined substantially by the design of the scanning optical system 705, the size of the image display panel 706 and a focusing f-number. On the other hand, the size of one reflecting surface 722 is determined by the size of light source images (images of the second lens array 712) because the light source images are aligned on the reflecting surface 722. Accordingly, in Embodiment 6, for the purpose of reducing the sizes of the reflecting surface 722 and the rotating polygon mirror 721, the microlenses on the second lens array 712 are arranged such that the images of the second lens array 712, when being formed on the reflecting surface 722, have a dimension in the rotation direction 721a (the scanning direction) of the rotating polygon mirror 721 shorter than that in the direction orthogonal thereto as shown in FIG. 29. Of course, the positions of the center of curvature of the microlenses of the first lens array 711 are designed such that each light source image 731 is formed within an aperture of each of the microlenses. In this manner, the size of the reflecting surface 722 (the dimension in the rotation direction, in particular) can be suppressed by elongating the second lens array 712 while maintaining brightness, thereby achieving a miniaturization of the rotating polygon mirror 721.

The rotating polygon mirror 721 is rotated about a rotation axis 723 by a motor, which is not shown in this figure. Since the state of emitted light beams during the rotation is similar to that in FIG. 24 described in Embodiment 5, the description thereof is omitted here.

As shown in FIG. 27, the scanning optical system 705 is constituted by, for example, scanning lenses 724, 725 and 726 having an aperture elongated in the scanning direction. In some of these scanning lenses 724, 725 and 726, the radius of curvature R is different between the scanning direction and the direction orthogonal thereto. In this manner, the optical system that determines the height of the image forming position according to the incident angle of the light from the reflecting surface 722 of the rotating polygon mirror 721 is provided with respect to the scanning direction, whereas the optical system that magnifies the rectangular illuminated images of the first focusing lens for the green light 713G, the emitting relay lenses 719R and 719B in the focusing system 704 so as to substantially correspond to the height dimension of the image display panel 706 and projects them onto the image display panel 706 via the second focusing lenses 720R, 720G and 720B provided for the respective colors is provided with respect to the direction orthogonal to the scanning direction.

The optical system in Embodiment 6 is configured so as to focus a light beam on the image display panel 706 with a smaller f-number in the scanning direction than in the direction orthogonal thereto. Although it is advantageous in terms of a focusing efficiency that the f-number is smaller also in the direction orthogonal to the scanning direction, this is detrimental to the miniaturization of the entire apparatus. In Embodiment 6, since end portions on longer sides of the belt-like illuminated region provided for the individual colors (end portions toward sides of adjacent belt-like illuminated regions provided for the individual colors) formed on the image display panel 706 have to achieve a certain focusing accuracy (an inaccurate focus causes a color mixture), the f-number in the scanning direction is made smaller. On the other hand, the f-number in the direction orthogonal thereto is made relatively large, thereby achieving a miniaturization of the entire apparatus.

The image display panel 706 has the same configuration as the image display panel 204 shown in FIG. 5. In other words, the image display panel 706 includes a transmission-type liquid crystal panel 727, an entrance-side polarizing plate 728 provided as a polarizer on the entrance side and an exit-side polarizing plate 729 provided as an analyzer on the exit side. Since the operation of the image display panel 706 is the same as that of the image display panel 204 shown in FIG. 5, the detailed description thereof is omitted here.

A projection lens 708 further is provided so that it can magnify the image on the image display panel 706 and project it onto a screen, which is not shown in this figure, making it possible to obtain a large-screen image. This projection lens 708 has a pupil large enough to take in the light emitted from the image display panel 706 without any loss.

With the above configuration, as in Embodiment 5, it becomes possible to display a color image by using an image display panel that is not provided with a color selection member such as a color filter, even when using a discharge-tube-type light source such as a metal halide lamp or a high-pressure mercury lamp emitting white light. In addition, since each pixel of the image display panel 706 displays the image according to the color of light illuminating this pixel, resolution is not deteriorated. Furthermore, since the light from the light source 709 always is led to the image display panel 706 effectively, it is possible to achieve a high efficiency of light utilization.

Moreover, when the discharge-tube-type light source is used, a light beam having a distribution in which the center is bright and the periphery is dark is emitted from the reflector. Accordingly, when this light source is used in the optical system of Embodiment 4, the periphery becomes darker than the center in the direction orthogonal to the scanning direction of the image display panel. In the present embodiment, on the other hand, an image having uniform brightness is formed using the integrator optical system 702 and then projected, so it is possible to produce an excellent image without any brightness decrease in the periphery even in the direction orthogonal to the scanning direction of the image display panel 706.

It also is possible to achieve a miniaturization of the rotating polygon mirror with substantially no deterioration in the performance, thus providing a small projection-type image display apparatus.

Although a transmission-type liquid crystal system display device is used as the image display panel 706 in Embodiment 6, any device is appropriate as long as it is a display device that displays an image by modulating an incident light. Thus, it is possible to use a reflection-type liquid crystal system or a reflection-type mirror device. Needless to say, it has to be a display device capable of fast response. Moreover, it is necessary to optimize optical systems (the scanning optical system 705, in particular) in accordance with the display device to be used.

In Embodiment 6, the relationship between the rotating polygon mirror and the incident light also may be similar to that of FIG. 16 in Embodiment 4. This makes it possible to suppress the height of the optical system (the dimension of the rotating polygon mirror in the rotation axis direction). However, compared with the arrangement shown in FIGS. 26 to 28 in Embodiment 6, since all the light in this arrangement enters the rotating polygon mirror 721 obliquely with respect to the scanning direction, the space between the second focusing lenses 720R, 720G and 720B provided for the respective colors and the rotating polygon mirror 721 is expanded, thus increasing the size of the reflecting surface 722 of the rotating polygon mirror 721, leading to an increase in the size of the entire apparatus. Therefore, it is preferable that the optical system is configured considering the shape and dimension of the entire apparatus.

In Embodiment 6, it is clear that the color arrangement when the white light is separated according to colors can be changed by changing the configuration of the color separation optical system 703. Also, it is needless to say that the configuration of the color separation optical system 703 can be changed into other configurations as long as they can separate an optical path of the white light according to colors.

Although the scanning direction of the illuminating light on the image display panel 706 is the horizontal direction in the above example, it is needless to say that the scanning direction can be changed into the vertical direction by changing the arrangement design of the image display panel 706 and the illuminating optical system. At this time, the method for driving the image display panel 706 is designed optimally according to the scanning direction.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A color image display device comprising:
   a light source portion for emitting respective light beams of red, green and blue;
   a first optical system that the respective light beams from the light source portion enter;
   a rotating polygon mirror that the respective light beams having left the first optical system enter and that makes the respective light beams perform a scanning while reflecting the respective light beams;
   a second optical system for leading the respective light beams from the rotating polygon mirror to an illumination position;
   an image display panel that is arranged at the illumination position and provided with a plurality of pixels for modulating an incident light according to a color signal of red, green or blue; and
   an image display panel driving circuit for driving each of the pixels of the image display panel by a signal corresponding to a color of light entering this pixel;
   wherein belt-like regions illuminated by the respective light beams are formed substantially in parallel with each other on the image display panel and moved continuously by the scanning, thereby displaying a color image,
   chief rays of the respective light beams enter a reflecting surface of the rotating polygon mirror so as not to overlap each other and at different angles from each other with respect to a rotation direction of the rotating polygon mirror, and
   the chief rays of the respective light beams that have been reflected by the rotating polygon mirror enter the second optical system at different angles from each other and then enter different positions of the image display panel.

2. A color image display device comprising:
   a light source portion for emitting respective light beams of red, green and blue;
   a first optical system that the respective light beams- from the light source portion enter;
   three rotating polygon mirrors that the respective light beams having left the first optical system respectively enter and that make the respective light beams perform a scanning while reflecting the respective light beams;
   a second optical system for leading the respective light beams from the rotating polygon mirrors to an illumination position;
   an image display panel that is arranged at the illumination position and provided with a plurality of pixels for modulating an incident light according to a color signal of red, green or blue; and
   an image display panel driving circuit for driving each of the pixels of the image display panel by a signal corresponding to a color of light entering this pixel;
   wherein belt-like regions illuminated by the respective light beams are formed substantially in parallel with each other on the image display panel and moved continuously by the scanning, thereby displaying a color image,
   the three rotating polygon mirrors are formed as one piece so as to match their rotation axes and have their phases in a rotation direction shifted from each other, and
   chief rays of the respective light beams that respectively have been reflected by the three rotating polygon mirrors enter the second optical system at different angles from each other and then enter different positions of the image display panel.

3. A color image display device comprising:
   a light source portion for emitting respective light beams of red, green and blue;
   a first optical system that the respective light beams from the light source portion enter;
   three rotating polygon mirrors that the respective light beams having left the first optical system respectively enter and that make the respective light beams perform a scanning while reflecting the respective light beams;
   a second optical system for leading the respective light beams from the rotating polygon mirrors to an illumination position;
   an image display panel that is arranged at the illumination position and provided with a plurality of pixels for modulating an incident light according to a color signal of red, green or blue; and
   an image display panel driving circuit for driving each of the pixels of the image display panel by a signal corresponding to a color of light entering this pixel;
   wherein belt-like regions illuminated by the respective light beams are formed substantially in parallel with each other on the image display panel and moved continuously by the scanning, thereby displaying a color image,
   the three rotating polygon mirrors respectively are rotated about rotation axes different from each other, and
   chief rays of the respective light beams that respectively have been reflected by the three rotating polygon mirrors enter the second optical system at different angles from each other and then enter different positions of the image display panel.

4. The color image display device according to any of claims 1 to 3, wherein the second optical system is an optical system in which a height of the light beams at the illumination position changes in proportion to an incident angle of the light beams.

5. The color image display device according to any of claims 1 to 3, wherein, when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror), the light beams that have entered the second optical system at an incident angle $\theta_P$ are focused at a position in which a height of the light beams is greatest in the scanning direction on the image display panel.

6. The color image display device according to claim 1, wherein, when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror) and the chief rays of the respective light beams entering the rotating polygon mirror respectively are called a first chief ray, a second chief ray and a third chief ray in an order of the rotation direction of the rotating polygon mirror, an angle at the rotation axis subtended by a line segment from an incident position of the first chief ray into the reflecting surface of the rotating polygon mirror to that of the second chief ray into the reflecting surface of the rotating polygon mirror and an angle at the rotation axis subtended by a line segment from the incident position of the second chief ray into the reflecting surface of the rotating polygon mirror to that of the third chief ray into the reflecting surface of the rotating polygon mirror are both about $\theta_P/3$.

7. The color image display device according to claim 1, wherein, when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror), the chief rays of the respective light beams entering the rotating polygon mirror respectively are called a first chief ray, a second chief ray and a third chief ray in an order of the rotation direction of the rotating polygon mirror, and an angle that the first chief ray forms with the second chief ray is expressed by $\theta_{C1}$ and an angle that the second chief ray forms with the third chief ray is expressed by $\theta_{C2}$, the following relationship is satisfied:

$$(\theta_{C1}+\theta_{C2})\times 3/2 \leq 2\times\theta_P.$$

8. The color image display device according to claim 1, wherein, when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror), the chief rays of the respective light beams entering the rotating polygon mirror respectively are called a first chief ray, a second chief ray and a third chief ray in an order of the rotation direction of the rotating polygon mirror, and an angle that the first chief ray forms with the second chief ray is expressed by $\theta_{C1}$ and an angle that the second chief ray forms with the third chief ray is expressed by $\theta_{C2}$, the angle $\theta_{C1}$ and the angle $\theta_{C2}$ are both about $2\times\theta_P/3$.

9. A color image display device comprising:
a light source portion for emitting respective light beams of red, green and blue;
a first optical system that the respective light beams from the light source portion enter;
a rotating polygon mirror that the respective light beams having left the first optical system enter and that makes the respective light beams perform a scanning while reflecting the respective light beams;
a second optical system for leading the respective light beams from the rotating polygon mirror to an illumination position;
an image display panel that is arranged at the illumination position and provided with a plurality of pixels for modulating an incident light according to a color signal of red, green or blue; and
an image display panel driving circuit for driving each of the pixels of the image display panel by a signal corresponding to a color of light entering this pixel;
wherein belt-like regions illuminated by the respective light beams are formed substantially in parallel with each other on the image display panel and moved continuously by the scanning, thereby displaying a color image,
an area of each of the belt-like regions illuminated by the respective light beams is substantially equivalent to one-third of an effective region of the image display panel,
the second optical system is an optical system in which a height of the light beams at the illumination position changes in proportion to an incident angle of the light beams,
when an angle at a rotation axis subtended by one reflecting surface of the rotating polygon mirror is expressed by $\theta_P$ ($\theta_P=2\pi/n$, where n is the number of the reflecting surfaces provided in the rotating polygon mirror), the light beams that have entered the second optical system at an incident angle $\theta_P$ are focused at a position in which the height of the light beams is greatest in the scanning direction on the image display panel,
when chief rays of the respective light beams entering the rotating polygon mirror respectively are called a first chief ray, a second chief ray and a third chief ray in an order of the rotation direction of the rotating polygon mirror, an angle at the rotation axis subtended by a line segment from an incident position of the first chief ray into the reflecting surface of the rotating polygon mirror to that of the second chief ray into the reflecting surface of the rotating polygon mirror and an angle at the rotation axis subtended by a line segment from the incident position of the second chief ray into the reflecting surface of the rotating polygon mirror to that of the third chief ray into the reflecting surface of the rotating polygon mirror are both about $\theta_P/3$, and
when an angle that the first chief ray forms with the second chief ray is expressed by $\theta_{C1}$ and an angle that the second chief ray forms with the third chief ray is expressed by $\theta_{C2}$, the angle $\theta_{C1}$ and the angle $\theta_{C2}$ are both about $2\times\theta_P/3$.

10. The color image display device according to claim 1, 2, 3 or 9, wherein the light source portion comprises a light source for emitting a white light beam including red, green and blue light beams and a color separation optical system for separating the white light beam into the red, green and blue light beams.

11. The color image display device according to claim 10, wherein an optical distance from an incident portion to an emitting portion in the color separation optical system is substantially the same for each color of the light beams.

12. The color image display device according to claim 1, 2, 3 or 9, wherein the second optical system comprises an f$\theta$ lens.

13. The color image display device according to claim 1, 2, 3 or 9, wherein the image display panel is a transmission-type light valve.

14. The color image display device according to claim 1, 2, 3 or 9, wherein the image display panel is a reflection-type light valve.

15. The color image display device according to claim 1, 2, 3 or 9, wherein an illuminating f-number in the scanning direction is smaller than that in the direction orthogonal thereto in optical systems from the first optical system to the image display panel.

16. The color image display device according to claim 1, 2, 3 or 9, wherein the first optical system is provided with a stop having a rectangular aperture.

17. The color image display device according to claim 1, 2, 3 or 9, wherein the light source portion comprises an integrator optical system.

18. The color image display device according to claim 17, wherein the integrator optical system comprises a first lens array and a second lens array, with the first lens array being a group of microlenses having identically-shaped rectangular apertures, and the second lens array being a group of microlenses corresponding to the microlenses of the first lens array on a one-to-one basis, the first optical system comprises a first lens and a second lens, incident light beams into the microlenses of the first lens array are focused on the corresponding microlenses of the second lens array, aperture shapes of the microlenses of the first lens array are superimposed on the first lens, and images of the aperture shapes of the microlenses of the first lens array that have been superimposed on the first lens are formed on the image display panel via the second optical system, thus forming the belt-like illuminated regions.

19. The color image display device according to claim 18, wherein the first lens forms an image of the second lens array on the reflecting surface of the rotating polygon mirror via the second lens.

20. The color image display device according to claim 19, wherein an overall shape of the group of the microlenses of the second lens array is formed such that its image, when being formed on the reflecting surface of the rotating polygon mirror, has a dimension in a direction corresponding to the rotation direction smaller than that in a direction orthogonal thereto.

21. The color image display device according to claim 18, wherein the first lens array comprises a plurality of microlenses that are formed to have different centers of curvature with respect to an aperture center, so that the incident light beams into the microlenses of the first lens array are focused on the corresponding microlenses of the second lens array, and each size of apertures of the microlenses of the second lens array is designed according to a size of the corresponding images formed by the first lens array.

22. The color image display device according to claim 17, wherein the light source portion further comprises a light source for emitting a white light beam including red, green and blue light beams and a color separation optical system for separating the white light beam into the red, green and blue light beams, and the integrator optical system is provided between the light source and the color separation optical system.

23. The color image display device according to claim 22, wherein an optical distance from an incident portion to an emitting portion in the color separation optical system is substantially the same for each color of the light beams.

24. A projection-type image display apparatus comprising the color image display device according to claim 1, 2, 3 or 9 and a projection optical system for magnifying and projecting an image formed on the image display panel.

* * * * *